United States Patent [19]
Konno et al.

[11] Patent Number: 6,154,286
[45] Date of Patent: Nov. 28, 2000

[54] IMAGE FORMING APPARATUS

[75] Inventors: Miki Konno; Toshiharu Takahashi; Yoji Matsuda; Masako Shibaki, all of Kawasaki, Japan

[73] Assignee: Kabushiki Kaisha Toshiba, Kawasaki, Japan

[21] Appl. No.: 08/978,744

[22] Filed: Nov. 26, 1997

[30] Foreign Application Priority Data

Nov. 29, 1996 [JP] Japan ..................... 8-320529

[51] Int. Cl.$^7$ .................................. G06F 15/00
[52] U.S. Cl. ................ 358/1.13; 358/1.14; 358/1.15; 358/401; 358/403; 358/448; 358/452
[58] Field of Search .................. 395/111, 112, 395/113, 114, 116; 358/401, 448, 452, 296, 444, 1.1, 1.6, 1.12, 1.13, 1.14, 1.15, 1.17, 400, 403, 453

[56] References Cited

U.S. PATENT DOCUMENTS

| | | | |
|---|---|---|---|
| 5,119,472 | 6/1992 | Ogawa ..................... | 395/111 |
| 5,396,341 | 3/1995 | Takahashi et al. ........ | 358/400 |
| 5,398,289 | 3/1995 | Rourke et al. ............ | 395/111 |
| 5,502,576 | 3/1996 | Ramsay et al. ........... | 358/444 |
| 5,565,964 | 10/1996 | Tashiro et al. ............ | 355/210 |
| 5,649,033 | 7/1997 | Morikawa et al. ........ | 358/448 |
| 5,722,031 | 2/1998 | Fujii et al. ................. | 358/296 |
| 5,731,879 | 3/1998 | Maniwa et al. ............ | 358/296 |
| 5,774,232 | 6/1998 | Tabata et al. .............. | 358/448 |

FOREIGN PATENT DOCUMENTS

| | | |
|---|---|---|
| 0 175 385 | 3/1986 | European Pat. Off. . |
| 0 589 476 | 3/1994 | European Pat. Off. . |
| 0 782 049 | 12/1996 | European Pat. Off. . |

*Primary Examiner*—Edward L. Coles
*Assistant Examiner*—Mark Wallerson
*Attorney, Agent, or Firm*—Foley & Lardner

[57] ABSTRACT

An image forming apparatus having at least one of a copying and printer functions, and a facsimile function, comprising means for inputting image data and size information of an image forming medium on which an image based on the image data is to be formed, means for accommodating image forming media having different sizes, respectively, means for forming an image, based on the image data input from the input means, on each of the image forming media accommodated in the accommodation means, means for detecting sizes of image forming media stored in the accommodation means, and means for switching, on the basis of a detection result of the detection means, between an image forming operation of the image forming means in the facsimile function and an image forming operation of the image forming means in the copying or printer function.

25 Claims, 38 Drawing Sheets

FIG. 19

| | COPYING FUNCTION (PORTRAIT) | FACSIMILE FUNCTION (PORTRAIT) | PRINTER FUNCTION | |
|---|---|---|---|---|
| | | | PORTRAIT | LANDSCAPE |
| WHEN DOCUMENT IS SET ON ADF | FEED DIRECTION P (ST1-1) | FEED DIRECTION P (ST2-1) | | |
| WHEN DOCUMENT IS SET ON PLATEN (IMAGE DATA BEFORE TRANSFER) | (ST1-2) | (ST2-2) | P (ST3-2) | P (ST4-2) |
| TRANSFER DIRECTION OF IMAGE DATA | (ST1-3) | (ST2-3) | (ST3-3) | (ST4-3) |
| MAPPING STATE OF IMAGE DATA ON MEMORY | P (ST1-4) | P (ST2-4) | P (ST3-4) | P (ST4-4) | x:MAIN SCANNING DIRECTION y:SUB-SCANNING DIRECTION

ASCENDING ORDER PRINT
(FACE DOWN)

DESCENDING ORDER PRINT
(FACE UP)

|  | BINDING MARGIN DISABLED | LEADING END IN MAIN SCANNING DIRECTION | TRAILING END IN MAIN SCANNING DIRECTION | LEADING END IN SUB-SCANNING DIRECTION | TRAILING END IN SUB-SCANNING DIRECTION |
|---|---|---|---|---|---|
| CENTERING, CORNERING DISABLED/UPPER RIGHT CORNERING | UPPER RIGHT CORNERING |  | UPPER LEFT CORNERING | UPPER RIGHT CORNERING | LOWER RIGHT CORNERING |
| LOWER RIGHT CORNERING | LOWER RIGHT CORNERING | LOWER RIGHT CORNERING | LOWER LEFT CORNERING | UPPER RIGHT CORNERING | LOWER RIGHT CORNERING |
| UPPER LEFT CORNERING | UPPER LEFT CORNERING | UPPER RIGHT CORNERING | UPPER LEFT CORNERING | UPPER LEFT CORNERING | LOWER LEFT CORNERING |
| LOWER LEFT CORNERING | LOWER LEFT CORNERING | LOWER RIGHT CORNERING | LOWER LEFT CORNERING | UPPER LEFT CORNERING | LOWER LEFT CORNERING |

FIG. 27

| MEMORY COPYING | FAX | PRINTER LANDSCAPE | PRINTER PORTRAIT |
|---|---|---|---|
| CENTERING | CENTERING | CENTERING | CENTERING |
| UPPER RIGHT CORNERING | LOWER RIGHT CORNERING | UPPER RIGHT CORNERING | LOWER RIGHT CORNERING |
| LOWER RIGHT CORNERING | LOWER LEFT CORNERING | LOWER RIGHT CORNERING | LOWER LEFT CORNERING |
| UPPER LEFT CORNERING | UPPER RIGHT CORNERING | UPPER LEFT CORNERING | UPPER RIGHT CORNERING |
| LOWER LEFT CORNERING | UPPER LEFT CORNERING | LOWER LEFT CORNERING | UPPER LEFT CORNERING |

FIG. 28

|  | MEMORY COPYING | FAX |
|---|---|---|
| LONGITUDINAL LEFT BINDING | TRAILING END IN MAIN SCANNING DIRECTION | TRAILING END IN MAIN SCANNING DIRECTION |
| LONGITUDINAL RIGHT BINDING | LEADING END IN MAIN SCANNING DIRECTION | LEADING END IN MAIN SCANNING DIRECTION |
| WIDTHWISE LEFT BINDING | LEADING END IN SUB-SCANNING DIRECTION | LEADING END IN SUB-SCANNING DIRECTION |
| WIDTHWISE RIGHT BINDING | TRAILING END IN SUB-SCANNING DIRECTION | TRAILING END IN SUB-SCANNING DIRECTION |

FIG. 29

|  | MEMORY COPYING | FAX | PRINTER LANDSCAPE | PRINTER PORTRAIT |
|---|---|---|---|---|
| LONGITUDINAL LEFT BINDING | TRAILING END IN SUB-SCANNING DIRECTION | LEADING END IN SUB-SCANNING DIRECTION | TRAILING END IN SUB-SCANNING DIRECTION | LEADING END IN SUB-SCANNING DIRECTION |
| LONGITUDINAL RIGHT BINDING | LEADING END IN SUB-SCANNING DIRECTION | TRAILING END IN SUB-SCANNING DIRECTION | LEADING END IN SUB-SCANNING DIRECTION | TRAILING END IN SUB-SCANNING DIRECTION |
| WIDTHWISE LEFT BINDING | TRAILING END IN MAIN SCANNING DIRECTION | TRAILING END IN MAIN SCANNING DIRECTION | TRAILING END IN MAIN SCANNING DIRECTION | TRAILING END IN MAIN SCANNING DIRECTION |
| WIDTHWISE RIGHT BINDING | LEADING END IN MAIN SCANNING DIRECTION | LEADING END IN MAIN SCANNING DIRECTION | LEADING END IN MAIN SCANNING DIRECTION | LEADING END IN MAIN SCANNING DIRECTION |

FIG. 30

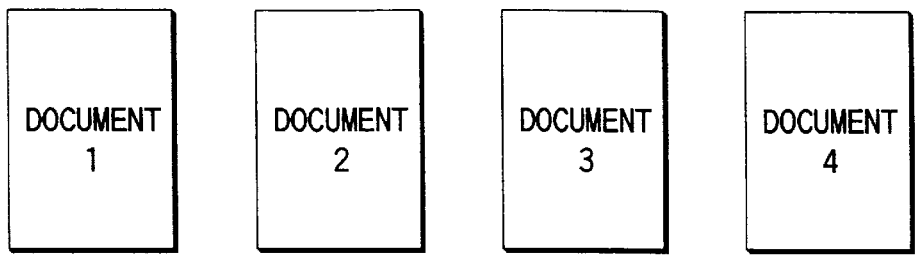
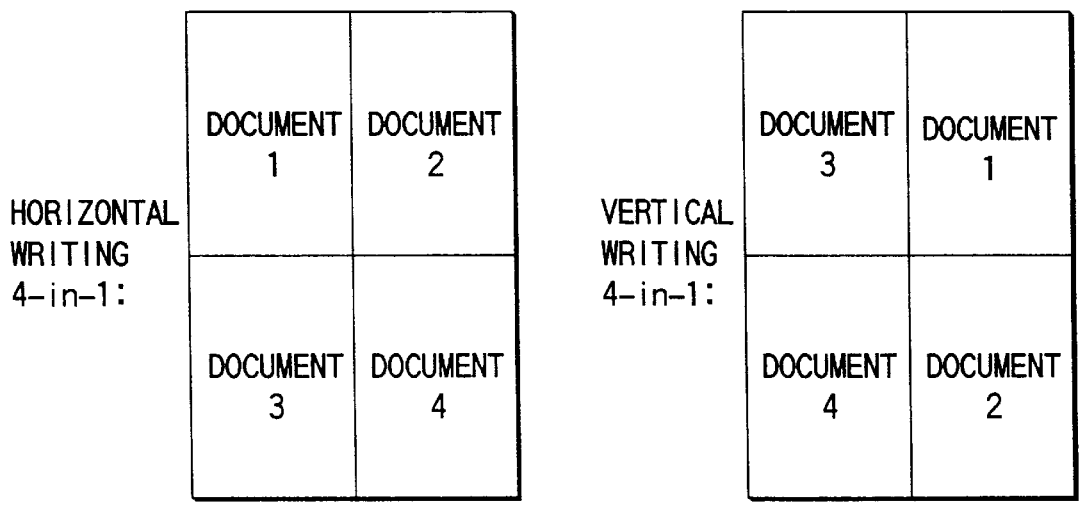
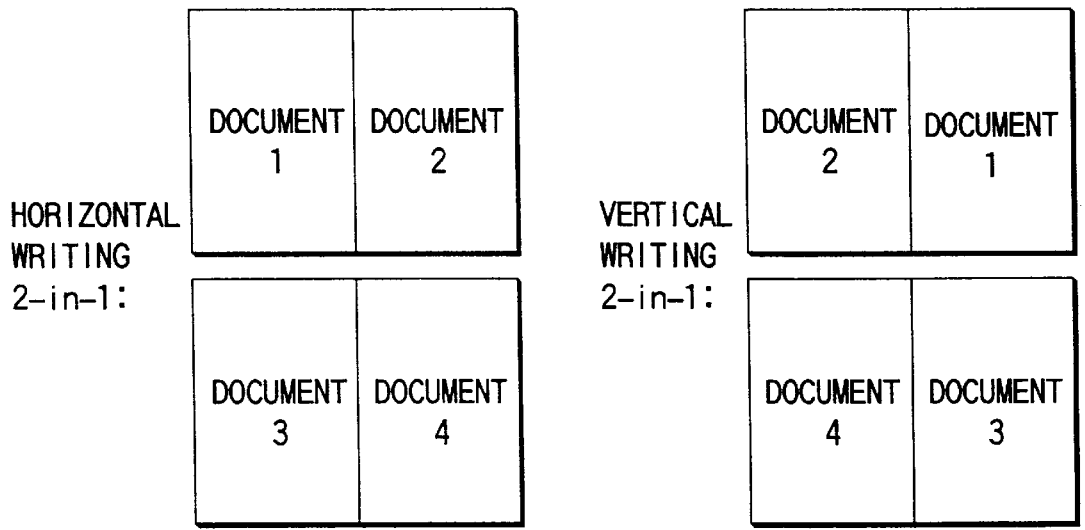
FIG. 35

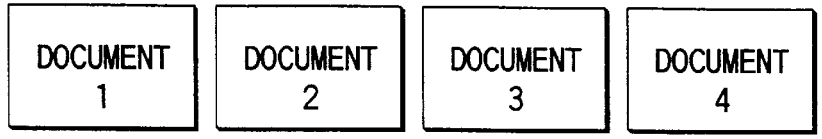
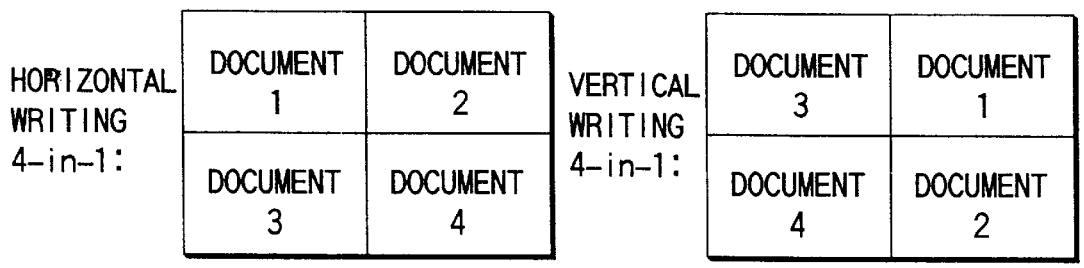
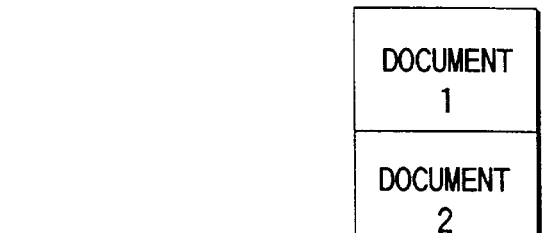
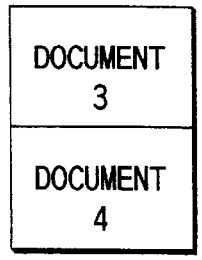
FIG. 36

HORIZONTAL WRITING 4-in-1
(HORIZONTAL WRITING 1-out-4)

| COUNTER | MEMORY COPY | FAX | PRINTER LANDSCAPE | PRINTER PORTRAIT |
|---|---|---|---|---|
| 0 | (0,1) | (0,0) | (0,1) | (0,0) |
| 1 | (0,0) | (1,0) | (0,0) | (1,0) |
| 2 | (1,1) | (0,1) | (1,1) | (0,1) |
| 3 | (1,0) | (1,1) | (1,0) | (1,1) |

FIG. 37

VERTICAL WRITING 4-in-1
(HORIZONTAL WRITING 1-out-4)

| COUNTER | MEMORY COPY | FAX | PRINTER LANDSCAPE | PRINTER PORTRAIT |
|---|---|---|---|---|
| 0 | (0,0) | (1,0) | (0,0) | (1,0) |
| 1 | (1,0) | (1,1) | (1,0) | (1,1) |
| 2 | (1,1) | (0,0) | (0,1) | (0,0) |
| 3 | (1,1) | (0,1) | (1,1) | (0,1) |

FIG. 38

HORIZONTAL WRITING 2-in-1 (HORIZONTAL WRITING 1-out-2)
MAIN SCANNING DIRECTION=LONGITUDINAL DIRECTION OF PAGE BUFFER
(MAIN SCANNING DIRECTION=WIDTHWISE DIRECTION OF DOCUMENT)

| COUNTER | MEMORY COPY | FAX | PRINTER LANDSCAPE | PRINTER PORTRAIT |
|---|---|---|---|---|
| 0 | (0,0) | (0,0) | (0,0) | (0,0) |
| 1 | (1,0) | (1,0) | (1,0) | (1,0) |

FIG. 39

HORIZONTAL WRITING 2-in-1 (HORIZONTAL WRITING 1-out-2)
MAIN SCANNING DIRECTION=WIDTHWISE DIRECTION OF PAGE BUFFER
(MAIN SCANNING DIRECTION=LONGITUDINAL DIRECTION OF DOCUMENT)

| COUNTER | MEMORY COPY | FAX | PRINTER LANDSCAPE | PRINTER PORTRAIT |
|---|---|---|---|---|
| 0 | (0,1) | (0,0) | (0,1) | (0,0) |
| 1 | (0,0) | (0,1) | (0,0) | (0,1) |

FIG. 40

VERTICAL WRITING 2-in-1 (VERTICAL WRITING 1-out-2)
MAIN SCANNING DIRECTION=LONGITUDINAL DIRECTION OF PAGE BUFFER
(MAIN SCANNING DIRECTION=WIDTHWISE DIRECTION OF DOCUMENT)

| COUNTER | MEMORY COPY | FAX | PRINTER LANDSCAPE | PRINTER PORTRAIT |
|---|---|---|---|---|
| 0 | (0,0) | (1,0) | (0,0) | (1,0) |
| 1 | (1,0) | (0,0) | (1,0) | (0,0) |

FIG. 41

VERTICAL WRITING 2-in-1 (VERTICAL WRITING 1-out-2)
MAIN SCANNING DIRECTION=WIDTHWISE DIRECTION OF PAGE BUFFER
(MAIN SCANNING DIRECTION=LONGITUDINAL DIRECTION OF DOCUMENT)

| COUNTER | MEMORY COPY | FAX | PRINTER LANDSCAPE | PRINTER PORTRAIT |
|---|---|---|---|---|
| 0 | (0,0) | (0,0) | (0,0) | (0,0) |
| 1 | (0,1) | (0,1) | (0,1) | (0,1) |

FIG. 42

OUTPUT RESULT IMAGE

DOUBLE-SIDED PRINTING HAVING MAIN
SCANNING DIRECTION AS COUPLING AXIS

OUTPUT RESULT IMAGE

DOUBLE-SIDED PRINTING HAVING SUB-SCANNING
DIRECTION AS COUPLING AXIS

WHEN PAPER DIRECTION CAN BE CHANGED

|  | MEMORY COPYING | | FAX | | PRINTER LANDSCAPE | | PRINTER PORTRAIT | |
|---|---|---|---|---|---|---|---|---|
|  | ROTATION | STAPLE | ROTATION | STAPLE | ROTATION | STAPLE | ROTATION | STAPLE |
| LEADING END IN MAIN SCANNING DIRECTION | 180° 270° | BACK FRONT | 180° 270° | BACK FRONT | 180° 270° | BACK FRONT | 180° 270° | BACK FRONT |
| TRAILING END IN MAIN SCANNING DIRECTION | 0° | FRONT | 0° | FRONT | 0° | FRONT | 0° | FRONT |
| LEADING END IN SUB-SCANNING DIRECTION | 270° 0° | BACK FRONT | 270° | FRONT | 270° 0° | BACK FRONT | 270° | FRONT |
| TRAILING END IN SUB-SCANNING DIRECTION | 90° | FRONT | 90° 180° | BACK FRONT | 90° | FRONT | 90° 180° | BACK FRONT |
| NONE | 0° | FRONT | 180° | BACK | 0° | FRONT | 180° | BACK |

FIG. 52

WHEN PAPER DIRECTION CANNOT BE CHANGED

|  | MEMORY COPYING | | FAX | | PRINTER LANDSCAPE | | PRINTER PORTRAIT | |
| --- | --- | --- | --- | --- | --- | --- | --- | --- |
|  | ROTATION | STAPLE | ROTATION | STAPLE | ROTATION | STAPLE | ROTATION | STAPLE |
| LEADING END IN MAIN SCANNING DIRECTION | 180°<br>0° | BACK<br>FRONT | 180°<br>0° | BACK<br>FRONT | 180°<br>0° | BACK<br>FRONT | 180°<br>0° | BACK<br>FRONT |
| TRAILING END IN MAIN SCANNING DIRECTION | 0° | FRONT | 0° | FRONT | 0° | FRONT | 0° | FRONT |
| LEADING END IN SUB-SCANNING DIRECTION | 0° | FRONT | 180°<br>0° | BACK<br>FRONT | 0° | FRONT | 180°<br>0° | BACK<br>FRONT |
| TRAILING END IN SUB-SCANNING DIRECTION | 0°<br>180° | BACK<br>FRONT | 180° | FRONT | 0°<br>180° | BACK<br>FRONT | 180° | FRONT |
| NONE | 0° | FRONT | 0° | FRONT | 0° | BACK | 0° | FRONT |

FIG.53

| RESOLUTION | ALLOWABLE MAGNIFICATION |
|---|---|
| STANDARD | 85%~100% |
| FINE | 71%~100% |
| VERY FINE | 65%~100% |

IMAGE FORMING APPARATUS

BACKGROUND OF THE INVENTION

The present invention relates to an image forming apparatus having a plurality of functions such as a copying function, facsimile function, printer function, and the like.

In recent years, an image forming apparatus having a plurality of functions such as a copying function, facsimile function, printer function, and the like, i.e., a so-called multi-function image forming apparatus, has been developed extensively. Such image forming apparatus can play a plurality of roles, i.e., a copying machine, facsimile apparatus, printer, and the like by itself.

Although such image forming apparatus can play a plurality of roles by itself, individual functions are not easy to use. For example, the print order will be explained below. The print order includes two different orders, i.e., the ascending order for printing images in turn from the first page to the last page, and the descending order for printing images in turn from the last page to the first page. In general, when the copying function is executed, the print order is the descending order. On the other hand, when the facsimile function and printer function are executed, the print order is the ascending order. When paper sheets are discharged with their printed surface facing up or down independently of the print order, the page relationship of documents does not match that of the print results.

In this manner, the image forming apparatus with a plurality of functions suffers problems posed since it has the plurality of functions.

BRIEF SUMMARY OF THE INVENTION

It is an object of the present invention to provide an image forming apparatus which can solve problems that arise due to the presence of a plurality of functions, and can fully use the individual functions.

According to the present invention, an image forming apparatus having at least one of a copying and printer functions, and a facsimile function, comprising: means for inputting image data and size information of an image forming medium on which an image based on the image data is to be formed; means for accommodating image forming media having different sizes, respectively; means for forming an image, based on the image data input from the input means, on each of the image forming media accommodated in the accommodation means; means for detecting sizes of image forming media stored in the accommodation means; and means for switching, on the basis of a detection result of the detection means, between an image forming operation of the image forming means in the facsimile function and an image forming operation of the image forming means in the copying or printer function.

Also, according to the present invention, an image forming apparatus having at least one of a copying function of acquiring image data to be copied and forming an image based on the image data to be copied, a facsimile function of acquiring facsimile image data via a communication channel and forming an image on the basis of the facsimile image data, and a printer function of acquiring image data to be printed via a communication channel and forming an image on the basis of the image data to be printed, comprising: means for acquiring image data to provide the acquired image data; means for storing the image data; means for processing the image data stored in the storage means on the basis of a feature upon acquiring image data, which feature differs depending on the functions, to provide processed image data; and means for forming an image on the basis of the processed image data.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 19 is a view for explaining the transfer directions and mapping states of image data;

FIG. 27 shows an example of a cornering processing position conversion table;

FIG. 28 shows another example of the cornering processing position conversion table;

FIG. 29 shows still another example of the binding margin processing position conversion table;

FIG. 30 shows yet another example of the binding margin processing position conversion table;

FIG. 35 is a view for explaining the premise of the reduction coupling processing;

FIG. 36 is a view for explaining the premise of the reduction coupling processing;

FIG. 37 shows an example of a reduction coupling processing/standard-size division processing table;

FIG. 38 shows another example of the reduction coupling processing/standard-size division processing table;

FIG. 39 shows still another example of the reduction coupling processing/standard-size division processing table;

FIG. 40 shows yet another example of the reduction coupling processing/standard-size division processing table;

FIG. 41 shows still another example of the reduction coupling processing/standard-size division processing table;

FIG. 42 shows still another example of the reduction coupling processing/standard-size division processing table;

FIG. 52 shows an example of an image rotation angle table required in the stapling processing;

FIG. 53 shows another example of the image rotation angle table required in the stapling processing;

DETAILED DESCRIPTION OF THE INVENTION

The first to eighth embodiments of the present invention will be described hereinafter with reference to the accompanying drawings.

Features common to the first to eighth embodiments will be explained below.

Figure 1:
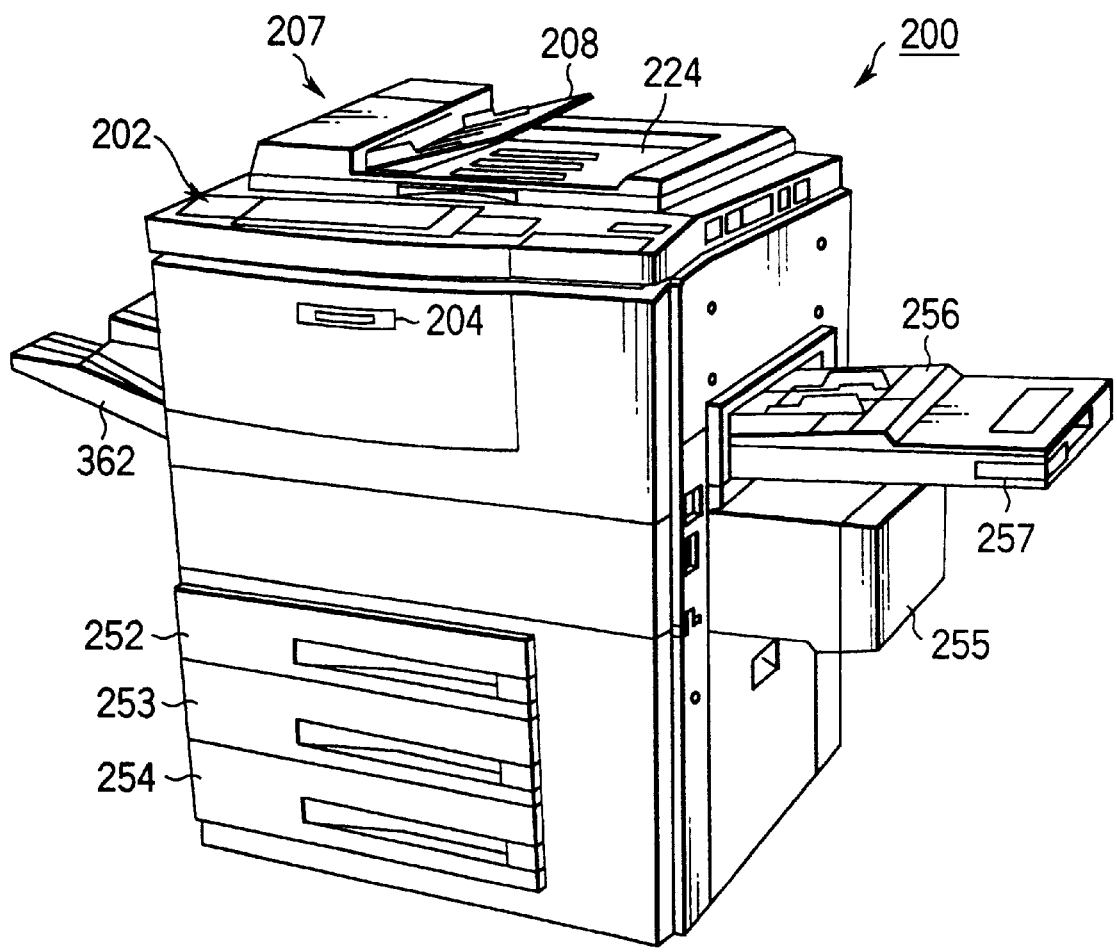
FIG. 1 is a perspective view showing the outer appearance of an image forming apparatus according to an embodiment of the present invention.
Figure 2:
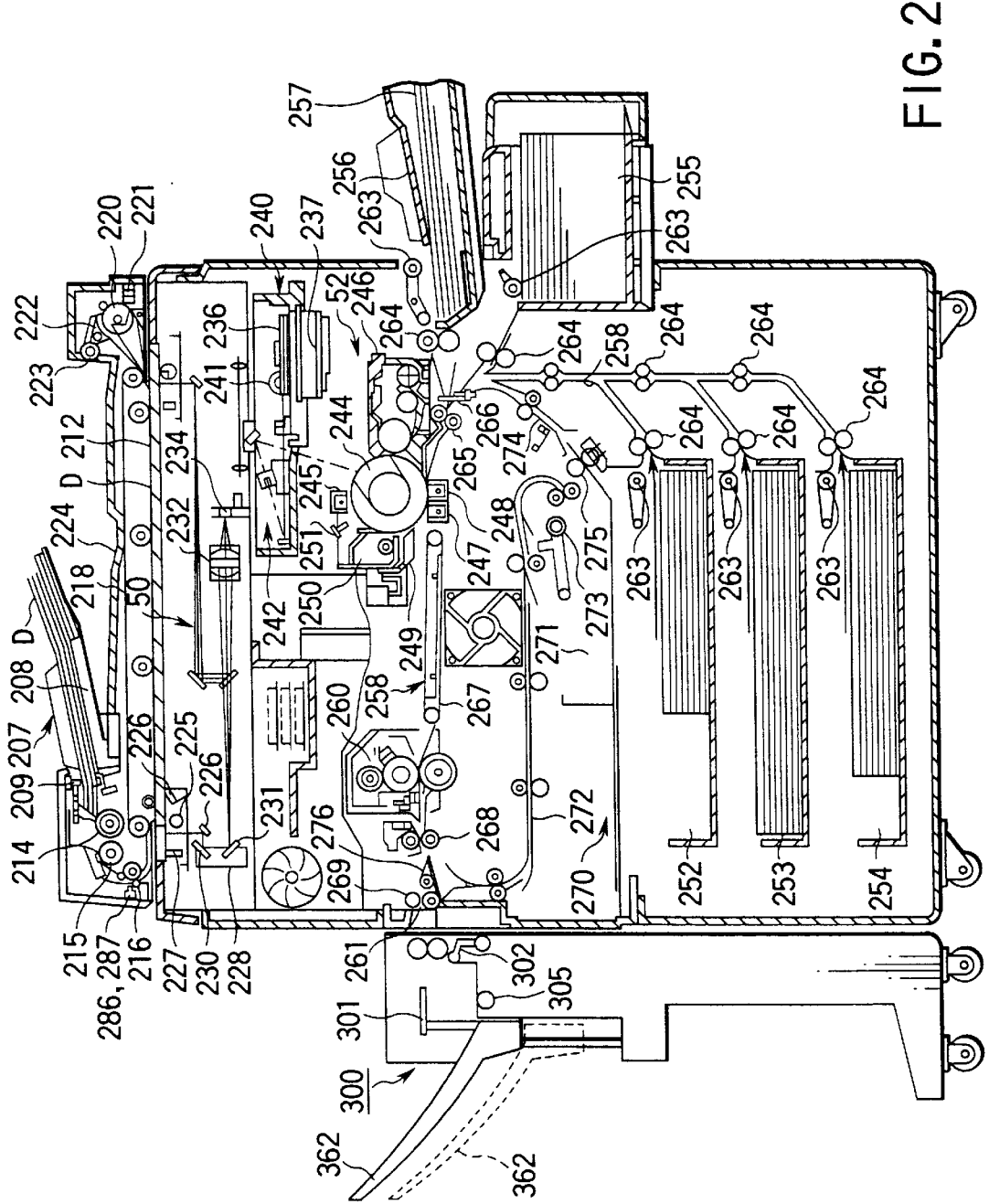
FIG. 2 is a schematic sectional view showing the internal structure of the image forming apparatus.

An image forming apparatus according to the first to eighth embodiments of the present invention will first be described with reference to FIGS. 1 and 2. FIG. 1 is a perspective view showing the outer appearance of an image forming apparatus according to the first to eighth embodiments of the present invention. FIG. 2 is a schematic sectional view showing the internal arrangement of the image forming apparatus according to the first to eighth embodiments of the present invention.

As shown in FIGS. 1 and 2, an auto document feeder (to be abbreviated as an ADF hereinafter) 207 is arranged on an image forming apparatus 200 to be free to open/close. The ADF 207 feeds sheet-like documents one by one to a platen 212. The ADF 207 also serves as a document cover that presses a document placed on the platen 212.

A control panel 202 is arranged on the front portion of the upper surface of the image forming apparatus 200. The control panel 202 is provided with a plurality of operation keys and a display with a touch panel. The operation keys accept inputs of the copying conditions and copying start instruction. The display with the touch panel displays various kinds of information, and accepts inputs of the copying conditions.

A paper feed cassette 257 and a large-capacity paper feed cassette 255 are detachably inserted into the right side portion of the image forming apparatus 200. The paper feed cassette 257 can store paper sheets in small quantities. The paper feed cassette 257 has a manual insertion tray 256 for manually feeding a paper sheet. The large-capacity paper feed cassette 255 can store paper sheets in large quantities, e.g., about 3,000 sheets. That is, the large-capacity paper feed cassette 255 stores copy paper sheets of the size that is frequently used.

Paper feed cassettes 252, 253, and 254 are detachably arranged in the lower portion of the image forming apparatus 200. These paper feed cassettes 252, 253, and 254 store paper sheets of predetermined sizes in the landscape and portrait directions. These paper feed cassettes 252, 253, and 254 are selectively used as needed.

Figure 3:
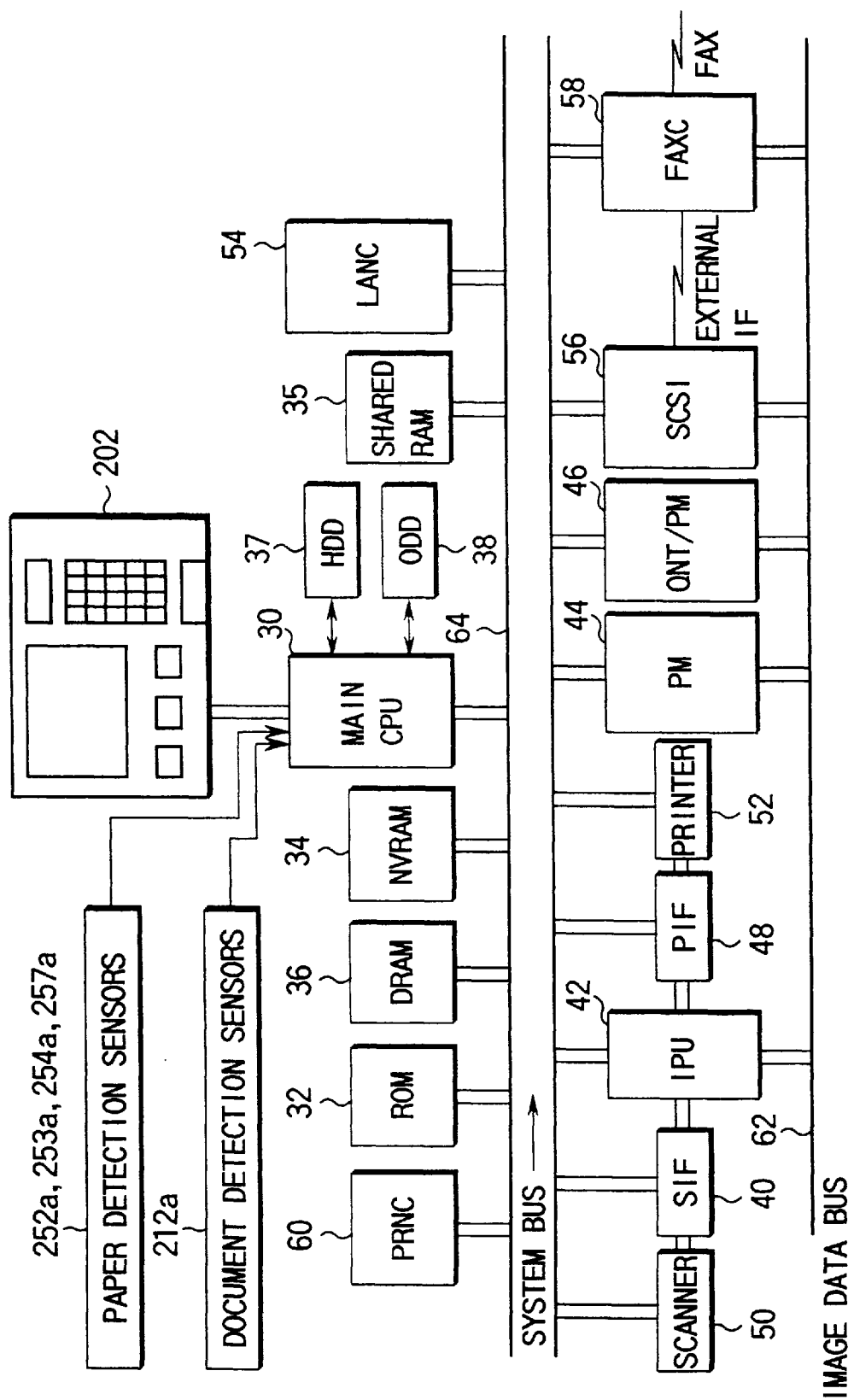
FIG. 3 is a schematic block diagram of a control system of the image forming apparatus.

A paper detection sensor 255a (FIG. 3) for detecting a paper sheet stored in the large-capacity paper feed cassette 255 is arranged for the large-capacity paper feed cassette 255. Similarly, paper detection sensors 252a, 253a, 254a, and 257a (FIG. 3) for detecting paper sheets stored in the paper feed cassettes 252, 253, 254, and 257 are arranged for the paper feed cassettes 252, 253, 254, and 257. Paper detection signals output from the paper detection sensors 252a, 253a, 254a, 255a, and 257a are supplied to a main CPU 30 (FIG. 3). The large-capacity paper feed cassette 255 can store only paper sheets having a predetermined size. Similarly, the paper feed cassettes 252, 253, 254, and 257 can store only paper sheets having predetermined sizes, respectively. That is, the main CPU 30 detects whether the paper sheets are stored in the cassettes and the sizes of the paper sheets stored in the cassettes.

A discharged paper tray 363 for receiving paper sheets on which images have been formed is arranged on the left side portion of the image forming apparatus 200.

A disk insertion slot 204 is formed below the control panel 202 of the image forming apparatus 200. A magnetooptical disk inserted from the disk insertion slot 204 is loaded into a magnetooptical disk device (not shown) arranged inside the image forming apparatus 200. The magnetooptical disk device stores image data on the magnetooptical disk or reproduces image data recorded on the magnetooptical disk.

A parallel port (not shown), serial port (not shown), small computer system interface (SCSI), and the like are arranged on the back surface of the image forming apparatus 200. The parallel port connects this apparatus and an external apparatus such as a personal computer when the image forming apparatus 200 operates as a printer. The serial port connects this apparatus and an external apparatus such as a personal computer to read out internal information of the apparatus and to set the functions of the apparatus upon maintenance of the apparatus. The SCSI makes command/data communications between this apparatus and an external controller.

The internal arrangement of the image forming apparatus will be described below with reference to FIG. 2.

The image forming apparatus 200 has a scanner unit 50 as an acquisition means for acquiring image data, and a printer unit 52 as an image forming means.

The platen 212 consisting of transparent glass on which the object to be read, i.e., a document D, is placed, and the ADF 207 for automatically feeding the document D onto the platen 212 are arranged on the upper surface of the image forming apparatus 200. The ADF 207 is free to open/close with respect to the platen 212, and also serves as a document pressing plate for bringing the document D placed on the platen 212 into tight contact with the platen 212.

A plurality of document detection sensors 212a (FIG. 3) are arranged on the platen 212. The document placed on the platen 212 is detected by these document detection sensors 212a. Document detection signals from the document detection sensors 212a are supplied to the main CPU 30 (FIG. 3). The main CPU 30 detects the size of the document on the basis of the document detection signals. That is, information about the size of the document can be obtained by the main CPU 30.

The ADF 207 comprises a document tray 208, an empty sensor 209, a pickup roller 214, a paper feed roller 215, a pair of aligning rollers 216, an aligning sensor 286, a size sensor 287, and a conveyor belt 218. The document tray 208 places documents D thereon. The empty sensor 209 detects the presence/absence of documents D placed on the document tray 208. The pickup roller 214 picks up the documents D set on the document tray 208 one by one. The paper feed roller 215 feeds the document D picked up by the pickup roller 214 toward the platen 212. The pair of aligning rollers 216 align the leading end of the document D. The aligning sensor 286 is located on the upstream side of the pair of aligning rollers 216 and detects the arrival of the document D. The size sensor 287 detects the paper size of the document D. The conveyor belt 218 conveys the document D to a predetermined position on the platen 212.

On the end portion opposite to the pair of aligning rollers 216 to sandwich the conveyor belt 218 therebetween, a reversing roller 220, a non-reversing sensor 221, a flapper 222, and a discharge roller 223 are arranged. A document D, the image of which has been read, is fed from the surface of the platen 212 by the conveyor belt 218, and is discharged onto a document discharge portion 224 on the upper surface of the ADF 207 via the reversing roller 220, flapper 222, and discharge roller 223.

The above description is processing for reading the first surface (front surface) of the document D. When the second surface (back surface) of the document D is to be read after its first surface, the flapper 222 is switched, and the document D conveyed by the conveyor belt 218 is reversed by the reversing roller 220. The reversed document is then fed to the predetermined position on the platen 212 again by the conveyor belt 218.

The ADF 207 also comprises a paper feed motor and convey motor (neither are shown). The paper feed motor drives the pickup roller 214, paper feed roller 215, and the pair of aligning rollers 216. The convey motor drives the conveyor belt 218, reversing roller 220, and discharge roller 223.

The scanner unit 50 arranged inside the image forming apparatus 200 comprises a light source 225 and a first mirror 226. The light source 255 comprises a fluorescent lamp or the like for irradiating light onto the document D placed on the platen 212. The first mirror 226 deflects light reflected by the document D in a predetermined direction. The light source 225 and the first mirror 226 are attached to a first carriage 227 arranged below the platen 212. The first carriage 227 is movable in a direction parallel to the platen 212. The first carriage 227 is reciprocally moved below the platen 212 by a driving motor via a toothed belt and the like (not shown).

A second carriage 228 is arranged below the platen 212, and is movable in a direction parallel to the platen 212. Second and third mirrors 230 and 231 are attached to the second carriage 228 at right angles. The second and third mirrors 230 and 231 deflect, in turn, the light reflected by the document D and deflected by the first mirror 226. The second carriage 228 is driven with respect to the first carriage 227 by the toothed belt and the like for driving the first carriage 227, and is translated along the platen 212 at a speed ½ that of the first carriage.

An imaging lens 232 and a CCD sensor 234 are arranged below the platen 212. The imaging lens 232 focuses the light reflected by the third mirror 231. The CCD sensor 234 receives the reflected light focused by the imaging lens 232, and converts it into an electrical signal. The imaging lens 232 is movably arranged in a plane including the optical axis of the light deflected by the third mirror 231 via a driving mechanism. Upon movement of the imaging lens 232, the reflected light coming from the third mirror can be imaged at a desired magnification.

On the other hand, the printer unit 52 comprises a laser exposure device 240. The laser exposure device 240 is fixed to and supported by a support frame of the image forming apparatus 200. The laser exposure device 240 comprises a semiconductor laser 241, a polygonal mirror 236, a polygon motor 237, and an optical system 242. The semiconductor laser 242 is ON/OFF-controlled in accordance with image information on the document D read by the scanner unit 50. That is, the semiconductor laser 242 emits a laser beam corresponding to the image information on the document D read by the scanner unit 50. The polygonal mirror 236 continuously deflects the laser beam emitted by the semiconductor laser 241. The polygon motor 237 rotates the polygonal mirror 236 at a predetermined rotational speed. The optical system 242 deflects the laser beam deflected by the polygonal mirror 236 and guides it toward a photosensitive drum 244. That is, a laser beam emitted by the semiconductor laser 242 is directed toward the photosensitive drum 244 via the polygonal mirror 236 and the optical system 244. When the laser beam scans the circumferential surface of the photosensitive drum 244, an electrostatic latent image is formed on the circumferential surface of the photosensitive drum 244.

Around the photosensitive drum 244, a charger 245, a developer 246, a peeling charger 247, a peeling pawl 249, a cleaning device 250, and a charge remover 251 are arranged in turn. The charger 245 charges the drum circumferential surface with a predetermined charge. The developer 246 supplies toner as a developing agent to the electrostatic latent image formed on the circumferential surface of the photosensitive drum 244 and develops it. That is, the developer 246 forms a toner image on the circumferential surface of the photosensitive drum 244. The peeling charger 247 separates an image forming medium, i.e., a copy paper sheet from the photosensitive drum 244. The transfer charger 248 transfers the toner image formed on the photosensitive drum 244 onto a paper sheet P. The peeling pawl 249 peels the copy paper sheet from the circumferential surface of the photosensitive drum 244. The cleaning device 250 cleans any residual toner on the circumferential surface of the photosensitive drum 244. The charger remover 251 removes any residual charge on the circumferential surface of the photosensitive drum 244.

Inside the image forming apparatus 200, a convey path 258 is formed to extend from paper feed cassettes 252, 253, 254, and 257, and a large-capacity paper feed cassette 255 via a transfer portion formed between the photosensitive drum 244 and the transfer charger 248. A fixing device 260 is disposed at the end of the convey path 258. A discharge port 261 is formed on the side wall of the image forming apparatus 200, which wall faces the fixing device 260. A finisher 300 is attached to the discharge port 261.

Pickup rollers 263 each for picking up copy paper sheets one by one from the corresponding cassette are arranged in the vicinity of the paper feed cassettes 252, 253, 254, and 257, and the large-capacity paper feed cassette 255. Also, a large number of pairs of paper feed rollers 264 and a pair of registration rollers 265 are arranged along the convey path 258. The pairs of paper feed rollers 264 convey a copy paper sheet P picked up by one pickup roller 263 along the convey path 258. The pair of registration rollers 265 correct any skew of the copy paper sheet P, adjust the leading end of the copy paper sheet P to match with that of the toner image on the photosensitive drum 244, and feed the copy paper sheet P to the transfer portion at the same speed as the moving speed of the circumferential surface of the photosensitive drum. An aligning sensor 266 for detecting the arrival of the copy paper sheet P is arranged on the downstream side of the pair of registration rollers 265, i.e., on the side of the paper feed rollers 264.

A copy paper sheet P picked up one by one from a given cassette by the corresponding pickup roller 263 is fed to the pair of registration rollers 265 by the pair of paper feed rollers 264. The leading end of the copy paper sheet P is registered by the pair of registration rollers 265, and thereafter, the sheet P is fed to the transfer portion.

In the transfer portion, the toner image formed on the photosensitive drum 244 is transferred onto the paper sheet P by the transfer charger 248. The copy paper sheet P on which the toner image has been transferred is peeled from the circumferential surface of the photosensitive drum 244 by the peeling charger 247 and the peeling pawl 249, and is conveyed to the fixing device 260 via a conveyor belt 267 that partially defines the convey path 252. Thereafter, the copy paper sheet is discharged onto a discharge tray 362 of the finisher 300 via the discharge port 261 by a pair of paper feed rollers 268 and a pair of discharge rollers 269.

An automatic double-siding device (ADD) 270 is arranged below the convey path 258. The ADD reverses the copy paper sheet P that has passed the fixing device 60, and feeds it to the pair of registration rollers 265 again. The ADD 270 comprises a temporary stacker 271, a reversing path 272, a pickup roller 273, a convey path 274, and a paper feed roller 275. The temporary stacker 271 temporarily stacks copy paper sheets P that have passed the fixing device 260. The reversing path 272 branches from the convey path 258. The path 272 reverses the copy paper sheet P that has passed the fixing device 260 and guides it to the temporary stacker 271. The pickup roller 273 picks up copy paper sheets P stacked on the temporary stacker 271 one by one. The paper feed roller 275 feeds the copy paper sheet P picked up by the pickup roller 273 to the pair of registration rollers 265 via the convey path 274. A selector gate 276 is arranged at the branching portion between the convey path 258 and the reversing path 272. The selector gate 276 selectively guides the copy paper sheet P to the discharge port 261 or the reversing path 272.

In a double-sided copying mode, a copy paper sheet P that has passed the fixing device 260, i.e., a copy paper sheet P on which an image has been formed on its first surface (front surface), is guided to the reversing path 272 by the selector gate 276. The copy paper sheet P guided to the reversing path 272 is temporarily stacked on the temporary stacker 271 after being reversed. Then, the copy paper sheet P is fed to the pair of registration rollers 265 via the convey path 274 by the pickup roller 273 and paper feed roller 275. The copy paper sheet P is registered by the pair of registration rollers 265, and is then fed to the transfer portion. At this time, a toner image is transferred onto the second surface (back surface) of the copy paper sheet P. Thereafter, the copy paper sheet P is discharged onto the discharge tray 362 via the convey path 258, fixing device 260, and discharge roller 269.

The ADD 270 is also used in modes other than the double-sided copy mode. Such modes will be described in detail later.

The control system of the image forming apparatus will be described below with the aid of FIG. 3.

As shown in FIG. 3, the image forming apparatus comprises a main CPU 30, a ROM 32, an NVRAM 34, a shared RAM 35, a DRAM 36, a hard disk drive (HDD) 37, an optical disk drive (ODD) 38, and the control panel 202. The main CPU 30 controls the overall image forming apparatus 200. The hard disk drive (HDD) 37 and the optical disk drive (ODD) 38 serve as storage means for storing image data.

Furthermore, the image forming apparatus 200 comprises a scanner interface (to be abbreviated as an SIF hereinafter) 40, an image processing unit (to be abbreviated as an IPU hereinafter) 42, a page memory (to be abbreviated as a PM hereinafter) 44, a quantizer/page memory (to be abbreviated as a QNT/PM hereinafter) 46, a printer interface (to be abbreviated as a PIF hereinafter) 48, the scanner unit 50, the printer unit 52, a local area network controller (to be abbreviated as a LANC hereinafter) 54, a SCSI 56, a facsimile controller (to be abbreviated as an FAXC hereinafter) 58, a printer controller (to be abbreviated as a PRNC hereinafter) 60, an image data bus 62, and a system bus 64.

The SIF 40 receives image data supplied from the scanner unit 50. The IPU 42 executes various kinds of image processing such as image quality improvement, enlargement/reduction, pixel decimation, image inversion, and the like. The PM 44 is a multi-valued page memory that stores multi-valued level image data in units of pages. The QNT/PM 46 comprises a binary page memory, a compression/expansion circuit, and an image processing ASIC. The binary page memory converts multi-valued level image data into binary data and stores the binary data. The PIF 48 transfers image data to the printer unit 52. The LANC 54 serves as a connection interface with the Ethernet, and a network control circuit including a CPU for controlling a predetermined network protocol. One end of a cable of the LANC 54 is connected a device (not shown) such as a router/repeater or the like that builds the network.

Figure 11:
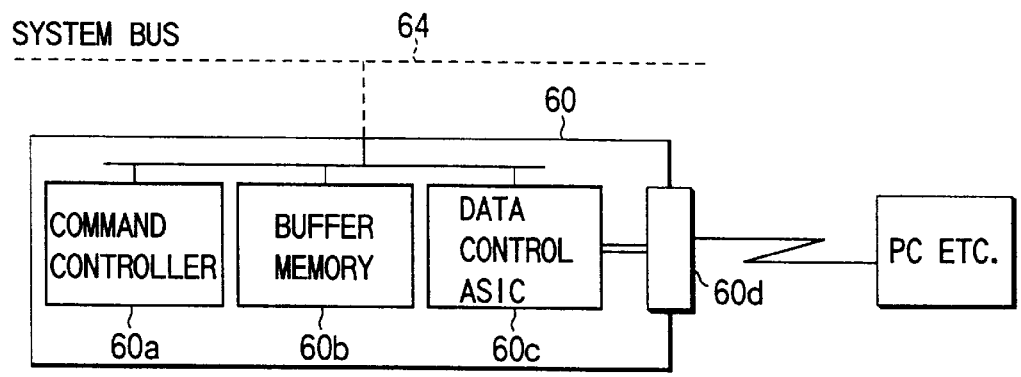
FIG. 11 is a schematic block diagram of a PRNC.

The SCSI 56 controls communication commands between the image forming apparatus 200 and an external apparatus such as a personal computer or the like. Upon receiving a control command supplied from the main CPU 30, the SCSI 56 interprets the received control command and sends a predetermined command to the external apparatus as a target. On the contrary, upon receiving a control command supplied from the external apparatus, the SCSI 56 transmits the received control command to the main CPU 30. The main CPU 30 interprets the control command transmitted from the SCSI 56, sends back a response to the SCSI 56, and controls the overall apparatus. The PRNC 60 performs protocol control and data transfer/compression/expansion control for receiving print data from an external apparatus such as a PC or the like. The PRNC 60 comprises a command controller 60a, buffer memory 60b, data control ASIC 60c, and parallel port 60d, as shown in FIG. 11.

The IPU 42, PM 44, QNT/PM 46, SCSI 56, and FAXC 58 are connected to each other via the image data bus 62. The SIF 40, IPU 42, PM 44, QNT/PM 46, PIF 48, scanner unit 50, printer unit 52, LANC 54, SCSI 56, FAXC 58, and PRNC 60 are connected to each other via the system bus 64.

The QNT/PM 46 and the FAXC 58 will be described below with reference to FIG. 4.

Figure 4:
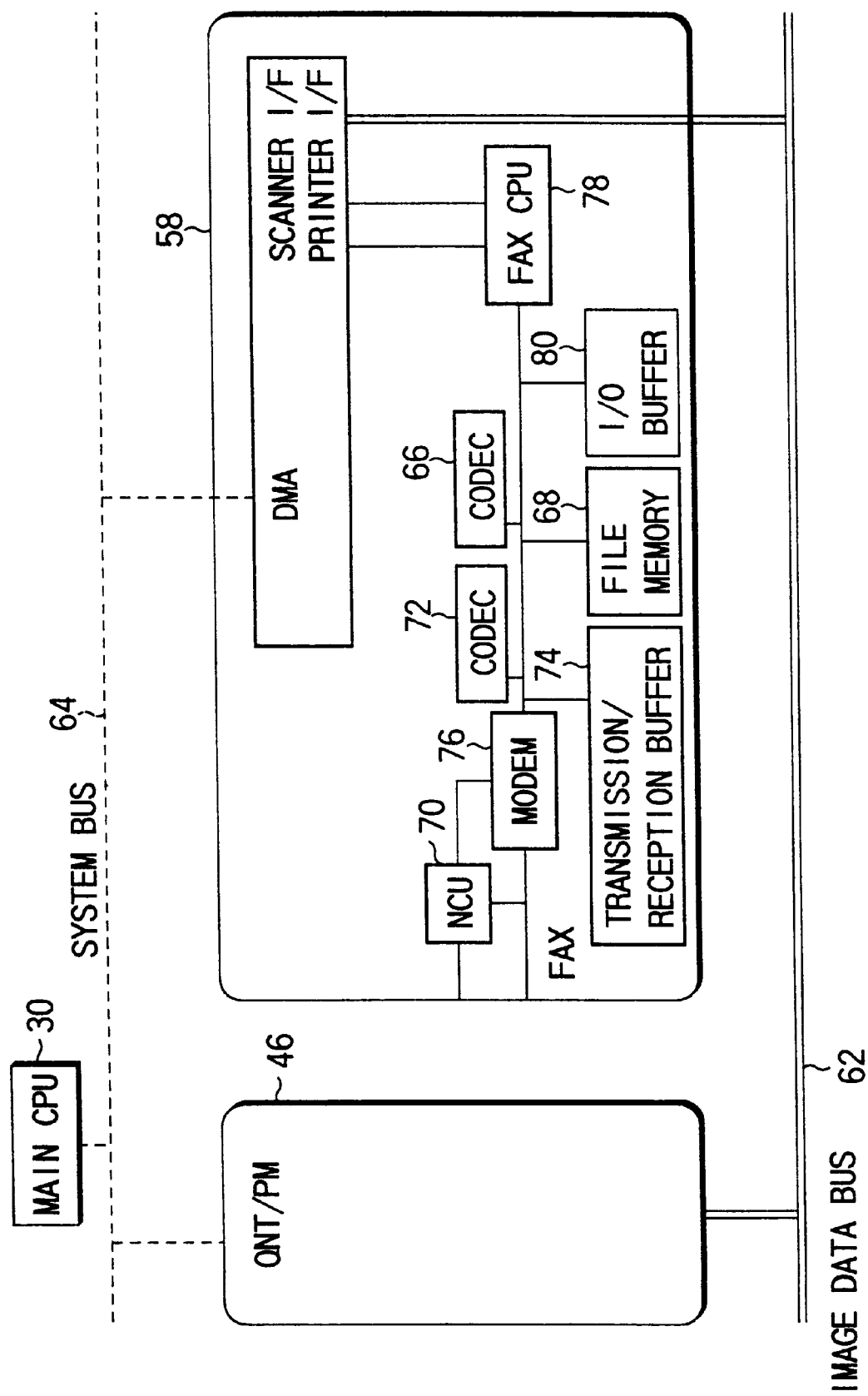
FIG. 4 is a schematic block diagram showing a FAXC.

As shown in FIG. 4, the FAXC 58 that implements the facsimile function comprises a file memory 68, transmission/reception buffer 74, modem 76, coder/decoder (to be abbreviated as a CODEC hereinafter) 66, network control unit (to be abbreviated as an NCU hereinafter) 70, coder/decoder (to be abbreviated as a CODEC hereinafter) 72, FAX CPU 78, and I/O buffer 80.

The file memory 68 stores a file consisting of a plurality of image data. The transmission/reception buffer 74 connects the image forming apparatus 200 to a public network. The CODECs 66 and 72 execute coding, decoding, resolution conversion, and the like of image data. The FAX CPU 78 controls the entire FAXC 58, and communicates with the main CPU 30.

The processing for transmitting image data by the facsimile function will be briefly described below. Image data for facsimile transmission is acquired by the scanner unit 50. The acquired image data is stored in the I/O buffer 80 via the image data bus 62. The stored image data is coded and compressed by the CODEC 66, and is then stored in the file memory 68. After the NCU 70 has selected a channel, the image data stored in the file memory 68 is converted by the CODEC 72 to a coding method and resolution corresponding to the performance of the station on the other end. The converted image data is externally transmitted from the modem 76 via the transmission/reception buffer 74. A facsimile transmission header is added by the CODEC 66.

A FAX communication control command is sent from the main CPU 30 to the FAXC 58 by direct memory access (to be abbreviated as DMA hereinafter) transfer. The FAX CPU 78 of the FAXC 58 executes the contents of this FAX communication control command, and transmits status data or a request to the main CPU 30 by DMA transfer. The FAX CPU 78 outputs a control signal complying with a standard protocol onto a communication channel via the modem 76 on the basis of the FAX communication control command. The main CPU 30 sends the next instruction in accordance with the contents of the status data or request.

The processing for receiving image data by the facsimile function will be briefly described below. Received data is stored in the transmission/reception buffer 74, and is subjected to error checking and the like. Thereafter, the received data is converted into a designated coding method or the like by the CODEC 66, and the converted data is stored in the file memory 68. When image data stored in the file memory 68 is stored in the HDD 37, the image data is subjected to coding conversion, resolution conversion, and the like by the CODEC 72, and thereafter, the converted data is DMA-transferred to the HDD 37.

When image data stored in the file memory 68 is printed, the stored image data is expanded by the CODEC 66. The expanded image data is mapped on the I/O buffer 80. Thereafter, the expanded image data is transmitted to the PIF 48 via the image data bus 62. When image data stored in the HDD 37 is printed, the image data is mapped on the QNT/PM 46, and the mapped image data is transmitted to the PIF 48 via the image data bus 62.

The I/O buffer 80 can rotate the image data. For example, when image data corresponding to A4 size is received, and is rotated 90°, A4-size paper sheets stored in different directions can be used. The A4-size paper sheets stored in the different directions are so-called A4 portrait (A4R) and landscape (A4) paper sheets. With this rotation, documents can be input in the portrait and landscape directions.

The schematic arrangement of the control panel 202 will be described below with reference to FIG. 5.

Figure 5:
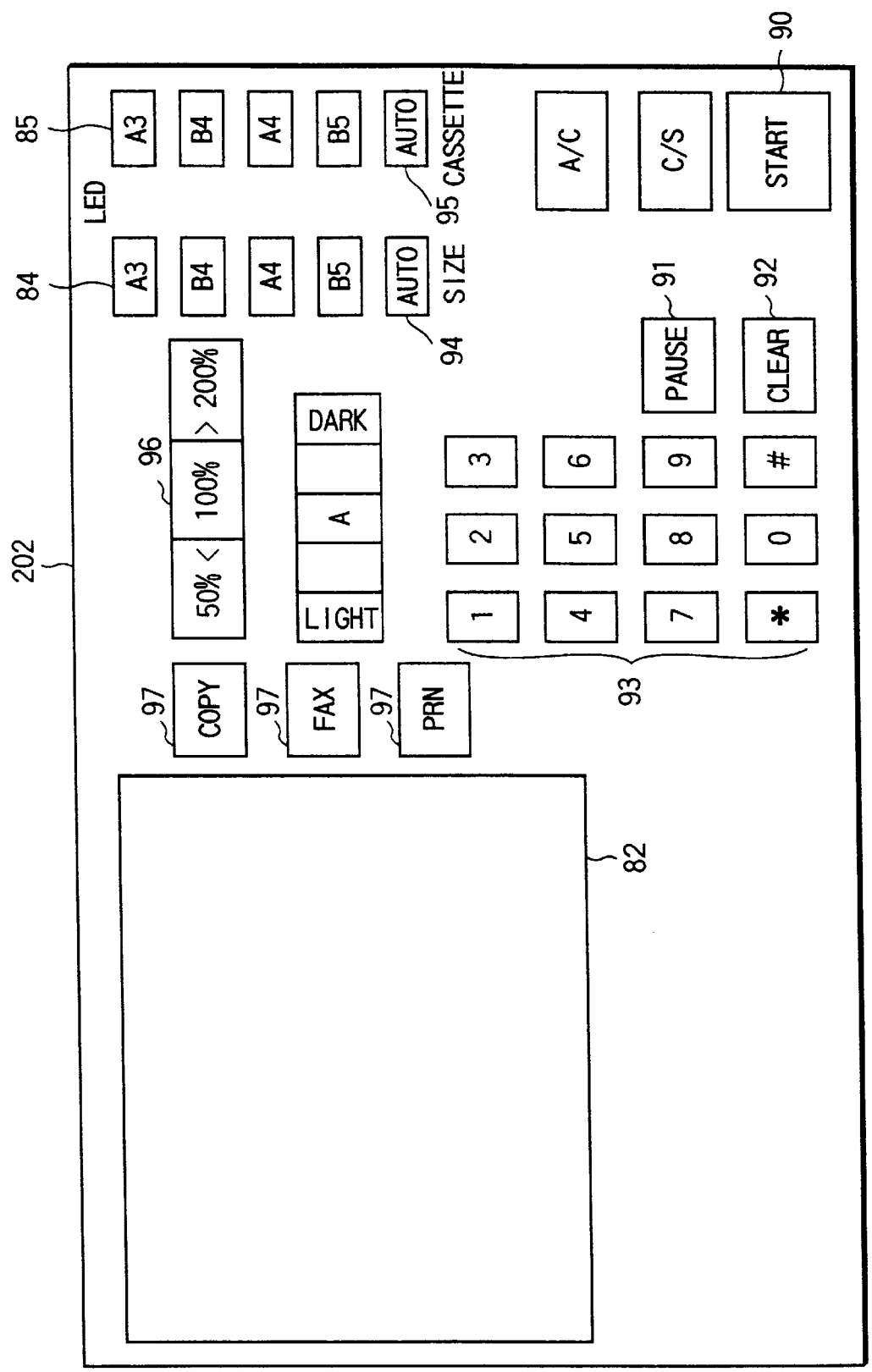
FIG. 5 is a schematic plan view of a control panel.

As shown in FIG. 5, the control panel 202 has a touch panel display 82, start key 90, pause key 91, clear key 92, ten-key pad 93, size key 94, cassette key 95, LEDs 84 and 85, copy magnification setting keys 96, and image mode selection keys 97. The ten-key pad 93 accepts inputs of the copy count and telephone number. For this reason, this ten-key pad 93 has the same layout as that of a telephone. Note that the above-mentioned keys 90 to 97 will be generally called hard keys hereinafter.

Figure 6:
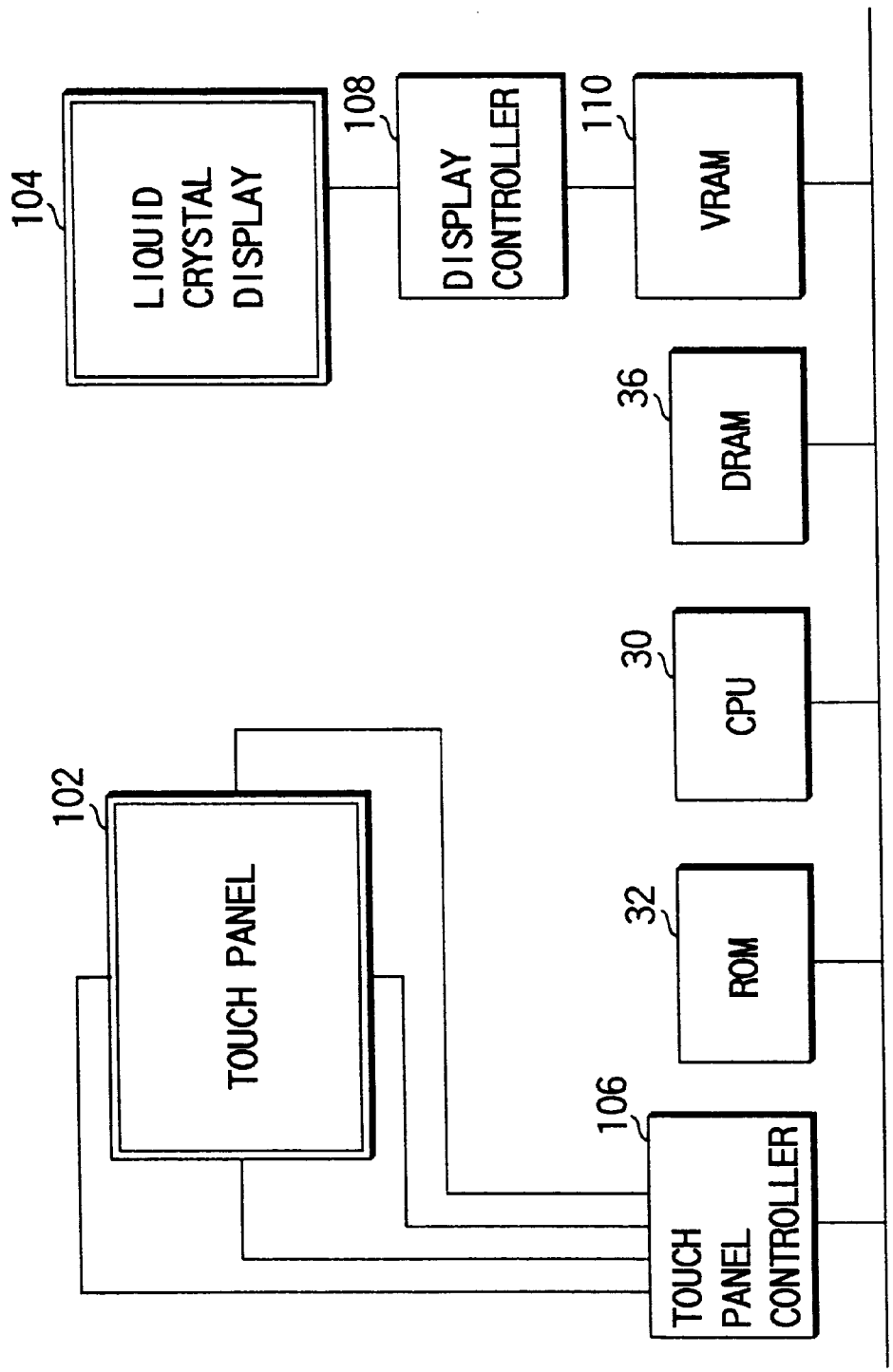
FIG. 6 is a schematic block diagram of a touch panel display.

The schematic arrangement of the touch panel display 82 will be explained below with reference to FIG. 6.

The touch panel display 82 is constituted by stacking a touch panel 102 on a liquid crystal display 104. The touch panel display 82 displays information such as operation procedures by means of illustrations, characters, and the like. The touch panel display 82 also displays keys for accepting various instruction inputs. When a displayed key is pressed, the touch panel 102 detects it, and outputs a corresponding signal to a touch panel controller 106. The touch panel controller 106 analyzes a predetermined key input on the basis of the signal output from the touch panel 102. The liquid crystal display 104 is connected to a display controller 108 and a VRAM 110 for storing display data in units of display pixels.

A G3 facsimile communication protocol will be explained below with reference to FIGS. 7 to 9. The following description will exemplify a non-error correction mode, but the same basically applies to an error correction mode.

Figure 7:
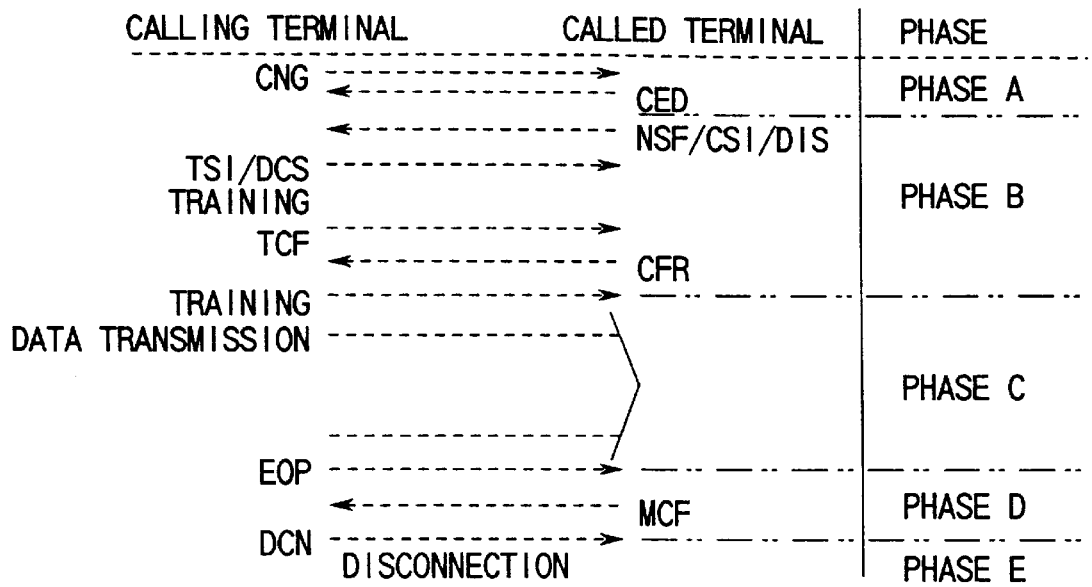
FIG. 7 is a diagram showing the flow of a G3 facsimile communication protocol upon transmitting data for only one page.

FIG. 7 is a view for explaining the flow of the communication protocol upon transmitting image data corresponding to a single page (the absence of the following page). As shown in FIG. 7, the FAX communication protocol is divided into five phases A to E, i.e., phase A: call setup, phase B: initial acknowledgement, phase C: data transmission, phase D: transmitted data acknowledgement, and phase E: disconnection.

Figure 8:
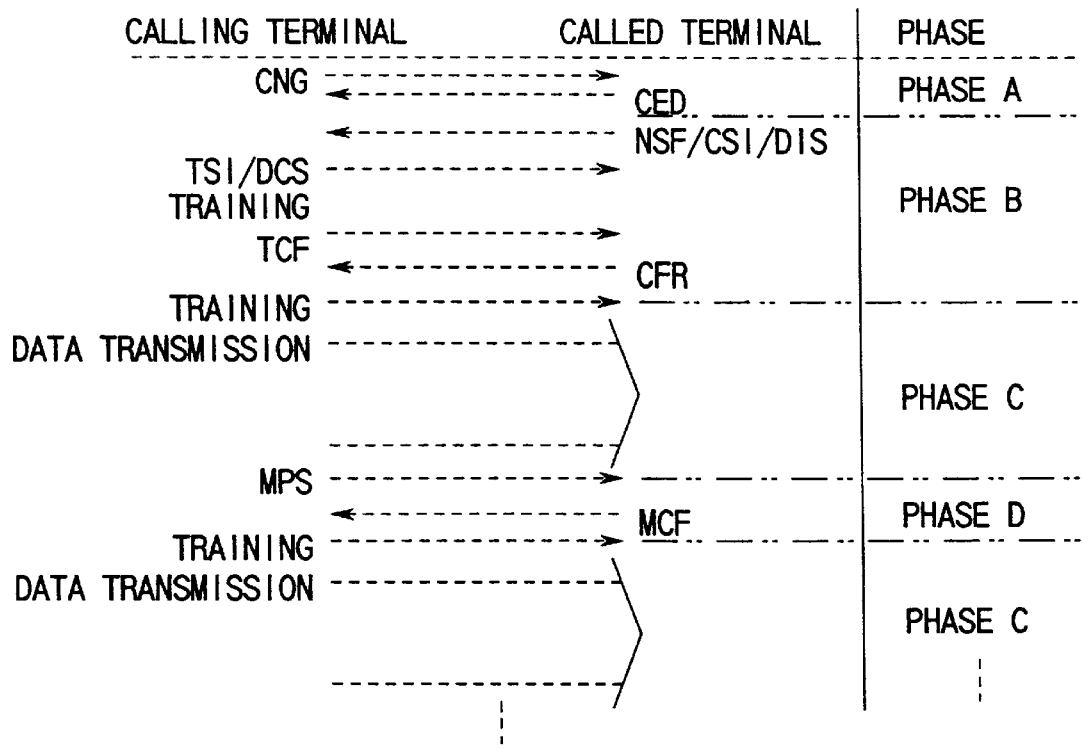
FIG. 8 is a diagram showing the flow of the G3 facsimile communication protocol upon transmitting data for a plurality of pages without changing the transmission condition.

FIG. 8 is a view for explaining the flow of the communication protocol upon transmitting image data corresponding to a plurality of pages (the presence of the following page). In case of FIG. 8, the called terminal is informed of multi-page transmission in phase D (MPS), and thereafter, phase C and the subsequent phases are repeated.

Figure 9:
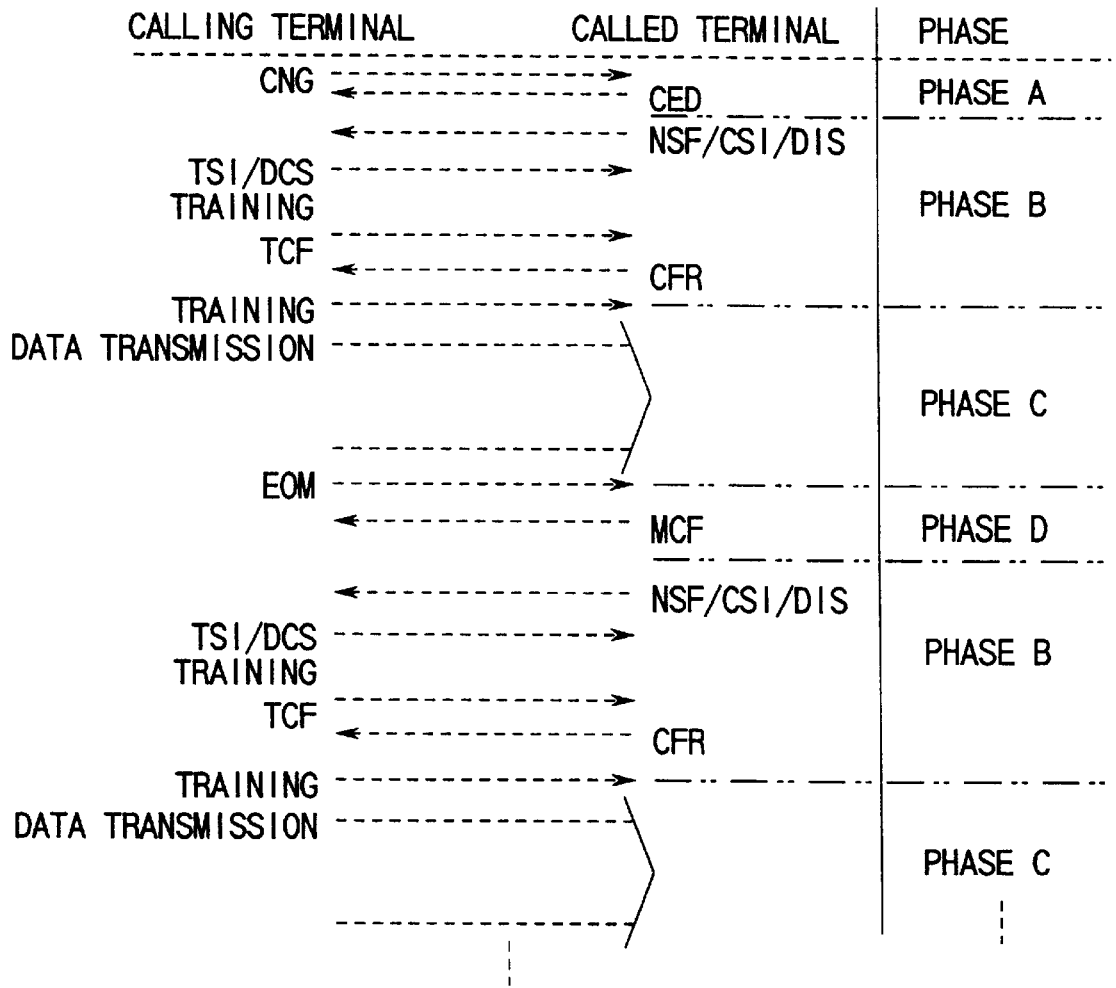
FIG. 9 is a diagram showing the flow of the G3 facsimile communication protocol upon transmitting data for a plurality of pages while changing the transmission condition.

FIG. 9 is a view for explaining the flow of the communication protocol upon transmitting image data corresponding to a plurality of pages (the presence of the following page) while changing the transmission conditions. In case of FIG. 9, the called terminal is informed of changes in communication conditions in phase D (EOM), and thereafter, phase B and the subsequent phases are repeated.

In phase B (initial acknowledgement) of each communication procedure, the called terminal (receiving terminal) initially transmits a Not standard facsimile signal. This Not standard facsimile signal presents a country code and manufacturer code.

Network communications in the image forming apparatus 200 will be described below.

Upon executing network communications, a network transmission mode is set at the control panel 202, and destination information (network address, user ID, and the like) is set. The set destination information is set under the control of the main CPU 30. Channel connection and disconnection are done under the control of the FAX CPU 78. After all the target image data are transmitted, a channel is disconnected.

Facsimile transmission in the image forming apparatus 200 will be described below.

The contents displayed on the touch panel display 82 are switched to a FAX menu to set a facsimile transmission mode. Alternatively, the facsimile transmission mode is set by a terminal apparatus such as a personal computer or the like via the network.

Image data to be transmitted is acquired by the scanner unit 50. The acquired image data to be transmitted is subjected to predetermined image processing by the IPU 42. The processed image data to be transmitted is mapped as binary data on the I/O buffer. Furthermore, the image data to be transmitted, mapped as binary data, is subjected to coding and compression by the CODEC 66. Also, the image data is subjected to rotation and resolution conversion as needed. The image data to be transmitted, which has been subjected to various kinds of processing, is stored in the file memory 68. The image data to be transmitted, stored in the file memory 68, is subjected to resolution conversion and size conversion corresponding to the receiving performance of the receiving terminal by the CODEC 72, and is then transmitted to the receiving terminal.

The overall arrangement of the image forming apparatus will be described below with reference to FIG. 10.

Figure 10:
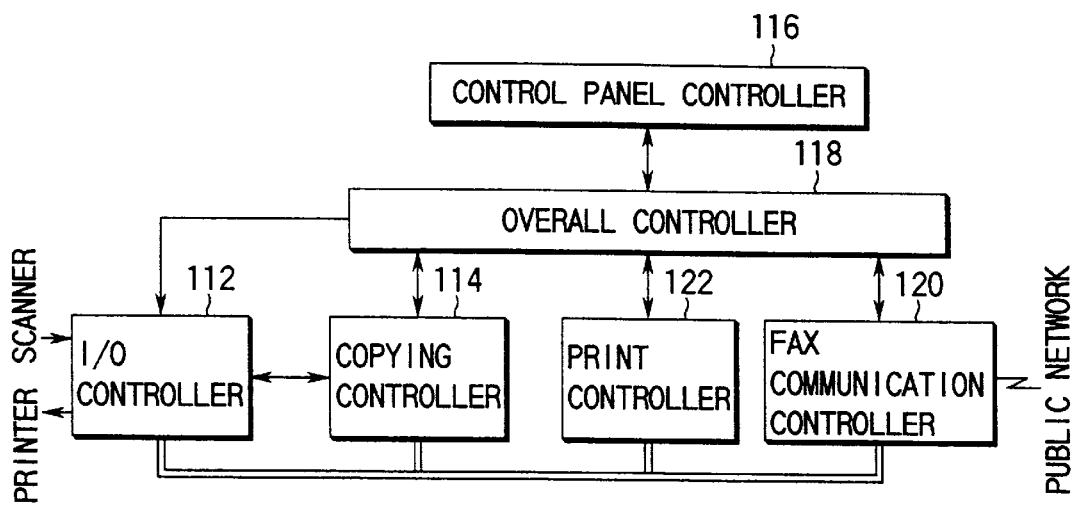
FIG. 10 is a schematic block diagram showing the arrangement of the overall image forming apparatus.

An I/O controller 112 shown in FIG. 10 executes scanner driving control, ADF control, printer control, paper feed control, resolution conversion, size conversion, image quality improvement, image rotation, image overlay, page division, and the like.

A copying controller 114 controls the copying function. A print controller 122 controls printout of image data. A FAX communication controller 120 controls facsimile communications. A control panel controller 116 controls the control panel 202. An overall controller 118 controls the overall image forming apparatus 200. More specifically, the overall controller 118 performs monitoring of the remaining memory capacity and operation states, exclusive control of resources shared by a plurality of functions, various kinds of priority control, and the like.

Figure 12:
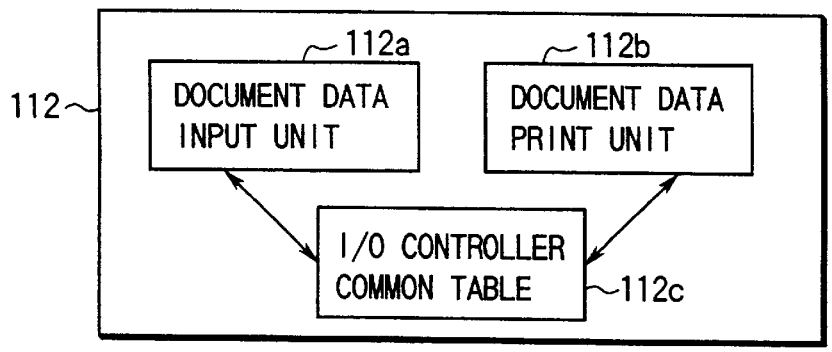
FIG. 12 is a schematic block diagram of an I/O controller.

The I/O controller 112 will be described below with reference to FIG. 12.

The I/O controller 112 comprises a document data input unit 112a, an image data print unit 112b, and an I/O controller common table 112c.

The document data input unit 112a executes input control upon acquiring image data by the scanner unit 50. That is, the document data input unit 112a controls the scanner unit 50 to acquire image data. The acquired image data is supplied to the IPU 42. Furthermore, the image data output from the IPU 42 is mapped on the QNT/PM 46 or I/O buffer 80. The mapped image data is coded and compressed, and thereafter, is stored in the QNT/PM 46 or HDD 37.

The document data print unit 112b controls the printer unit 52 to print image data. For this purpose, the image data print unit 112b reads out and maps image data stored in the QNT/PM 46 or HDD 37, and transfers the mapped image data to the printer unit 52.

The document data input unit 112a and document data print unit 112b receive an instruction from the overall controller 118, and return a predetermined message to the overall controller 118 upon completion of the processing corresponding to the received instruction.

Figure 16:
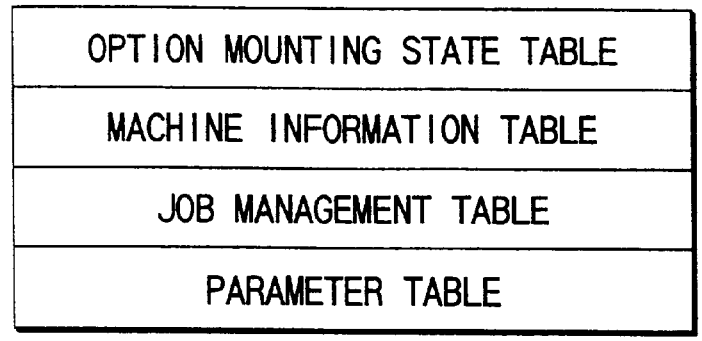
FIG. 16 shows a job parameter table for holding parameters associated with control of various jobs in an overall controller, I/O controller, copying controller, print controller, and FAX communication controller.

The I/O controller common table 112c stores a job parameter table which records parameters of various jobs shown in FIG. 16. The job parameter table is shared by the overall controller 118, I/O controller 112, copying controller 114, print controller 122, and FAX communication controller 120.

Document input processing executed by the document data input unit 112a will be explained below with reference to the flow chart shown in FIG. 13.

When the overall controller 118 receives a start instruction message of the document input processing (ST52, YES), the document input processing is started. On the other hand, when the overall controller 118 receives an end instruction message of the document input processing (ST52, NO), the document input processing ends (ST54). When the overall controller 118 receives an interrupt instruction message of the document input processing (ST52, NO), the document input processing is interrupted (ST56).

Upon receiving the start instruction message of the document input processing (ST52, YES), a job message received together with that message is analyzed (ST58), and the document input processing is started.

The document input processing is classified into two processes depending on whether or not the ADF 207 is used. Whether or not the ADF 207 is used is determined by checking if documents are set on the ADF 207. When documents to be read are set on the ADF 207 (ST60), the ADF 207 is driven (ST62).

When a reduction coupling function (to be described later) is designated (ST64, YES), documents are read and the read image data are mapped in correspondence with the reduction coupling function (ST66). That is, the calculation of the read position, driving of the scanner in accordance with the calculation result, the calculation of the write position onto the page memory, and image mapping onto the page memory in accordance with the calculation result are executed. Thereafter, documents are read. Upon completion of reading of documents for data coupling (ST70, YES), the control advances to the next processing.

For example, if overlay processing is designated (ST72, YES), the overlay processing is executed (ST74). Furthermore, coding and compression are executed (ST76), and file information is updated (ST78).

On the other hand, if the reduction coupling function is not designated (ST64, NO), documents are read and the read image data are mapped irrespective of the reduction coupling function (ST68). That is, the calculation of the read position, driving of the scanner in accordance with the calculation result, the calculation of the write position onto the page memory, and image mapping onto the page memory in accordance with the calculation result are executed. Thereafter, the flow advances to step ST72 and the subsequent steps.

Print processing executed by the document data print unit 112b will be explained below with reference to the flow charts in FIGS. 14 and 15.

When the overall controller 118 receives a start instruction message of the print processing (ST102, YES), the print processing is started. When the overall controller 118 receives an interrupt, suspend, or end instruction message (ST102, NO), interrupt, suspend, or end processing is executed (ST104).

Upon receiving the start instruction message of the print processing (ST102, YES), a job message received together with that message is analyzed (ST106). Whether or not the paper feed source can be switched is determined in accordance with the analysis result (ST108). Subsequently, a mapping page is determined in accordance with the analysis result (ST110). When the mapping page is determined, the paper feed source is checked (ST112).

If paper discharge alone is instructed (ST114, YES), paper discharge from the ADD 270 is instructed (ST116), and a paper sheet in the ADD 270 is discharged (ST118). On the other hand, if paper discharge alone is not instructed (ST114, NO), reduction coupling processing is done as needed (ST120 to ST130). If mapping other than the last page of the reduction coupling processing is complete, or if the reduction coupling processing is not required, paper feeding is started (ST132). Furthermore, the write position of the page memory is calculated (ST134). Moreover, data is decoded/ expanded, and is mapped on the page memory. Upon completion of paper feeding (ST138, YES) and mapping of image data (ST140, YES), an image transfer range and rotation angle are calculated (ST142, ST144).

Thereafter, stapling and shift setup are done as needed (ST146). Furthermore, the processing branches depending on whether or not a binding margin is set (ST148 to ST154).

Memory edit processing will be described below.

The transfer direction of image data obtained by the copying function, facsimile function, and printer function will be described below with reference to FIGS. 17 to 20.

Figure 17:
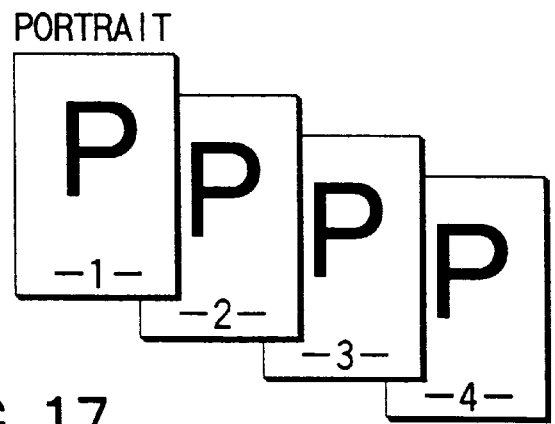
FIG. 17 shows images of portrait documents (vertically elongated documents)
Figure 18:
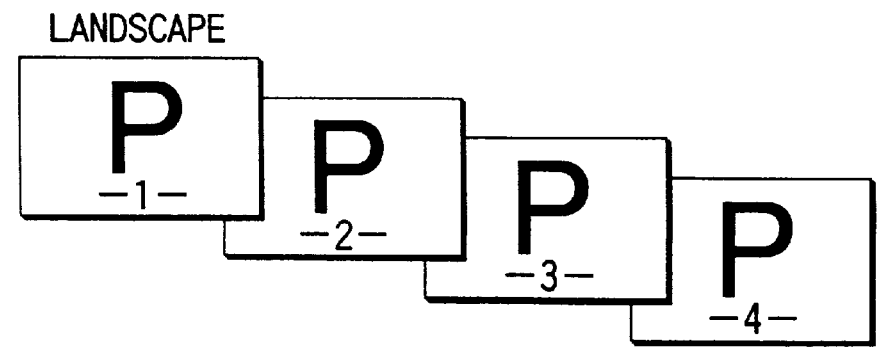
FIG. 18 shows images of landscape documents (horizontally elongated documents)

FIG. 17 shows portrait documents (vertically elongated documents). FIG. 18 shows landscape documents (horizontally elongated documents). FIG. 19 shows the transfer directions and mapping states of image data in correspondence with the copying function, facsimile function, and printer function. For the sake of simplicity, a case will be exemplified below wherein image data is read from a single-sided document on one surface of which an image is formed.

First, the case of the copying function will be explained below (ST1-1 to ST1-4). The following explanation will be given under the assumption that the document to be copied is a portrait document, but the same applies to a landscape document.

In case of the copying function, upon inputting a document image, a document is set on the platen 212 using the ADF 207 or is directly set on the platen 212. When the ADF 207 is used, the document is set so that the printed surface of the document faces up (face-up state), and the left side of the document points to the leading side in the feed direction of the ADF 207. That is, in the state wherein the operator who sets a document on the ADF 207 can observe the printed surface of the document, the document is set so that the right side of the document points to the right-hand side of the operator, the left side of the document points to the left-hand side of the operator, and the bottom side of the document points to the front direction of the operator (ST1-1).

The document set in this state is fed by the ADF 207 onto the platen 212. In this case, the document is reversed, and is set on the platen 212 so that the printed surface of the document contacts the platen 212. When the document is directly set on the platen 212 without using the ADF 207, the document is set in such state (ST1-2).

When the document is set on the platen 212, the set document is read. At this time, the document begins to be read from the right side of its printed surface, with the up-and-down direction of the document agreeing with the main scanning direction, and the right-and-left direction agreeing with the sub-scanning direction (ST1-3).

The read image data of the document is transferred to the QNT/PM 46 in units of lines, and is mapped on the page memory 44. At this time, the image data is mapped on the page memory 44, as shown in ST1-4. That is, image data in the left-side direction is mapped in turn from image data in the right-side direction of the document image.

Figure 20:
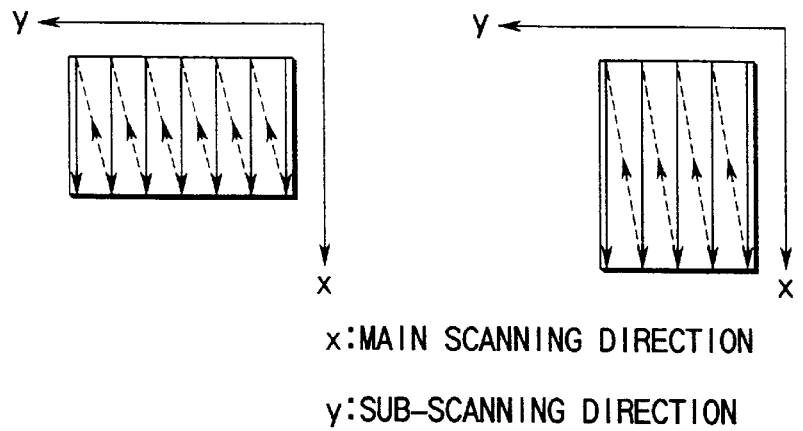
FIG. 20 is a view for explaining the image write direction in a QNT/PM.

Note that the QNT/PM 46 has a built-in mechanism for managing the memory using two-dimensional addresses. For this reason, the processing in the I/O controller 112 is done so that the transferred image is written from the x-axis direction, as shown in FIG. 20. When an image is transferred from the QNT/PM 46 to the printer unit 52, HDD 37, or the like, the image is read out from the x-axis direction on the coordinate system of the QNT/PM 46.

Second, the case of the facsimile function will be explained below (ST2-1 to ST2-4). The following explanation will be given under the assumption that documents to be facsimile transmitted and received are portrait documents, but the same applies to the landscape documents.

In case of document transmission by the facsimile function, upon inputting a document image, a document is set on the platen 212 using the ADF 207 or is directly set on the platen 212. When the ADF 207 is used, the document is set, so that the printed surface of the document faces up (face-up state), and the bottom side of the document points in the feed direction of the ADF 207. That is, in the state wherein the operator who sets a document on the ADF 207 can observe the printed surface of the document, the document is set so that the top side of the document points to the right-hand side of the operator, the bottom side of the document points to the left-hand side of the operator, and the right side of the document points to the front direction of the operator (ST2-1).

The document set in this state is fed by the ADF 207 onto the platen 212. In this case, the document is reversed, and is set on the platen 212 so that the printed surface of the document contacts the platen 212. When the document is directly set on the platen 212 without using the ADF 207, the document is set in such state (ST2-2).

When the document is set on the platen 212, the set document is read. At this time, the document begins to be read from the top side of its printed surface, with the right-and-left direction of the document agreeing with the main scanning direction, and the up-and-down direction agreeing with the sub-scanning direction (ST2-3).

The read image data of the document is transferred to the CODEC 66 in units of lines, and is mapped on the file memory 68. At this time, the image data is mapped on the file memory 68, as shown in ST2-4. That is, image data in the bottom-side direction is mapped in turn from image data in the top-side direction of the document image.

In case of document reception by the facsimile function, a document image is received in the order of ST2-3 and ST2-4 described above.

Third, the case of the printer function will be explained below (ST3-2 to ST3-4. ST4-2 to ST4-4). The following explanation will be given in correspondence with portrait and landscape images as the objects to be printed.

When the object to be printed is a portrait image (ST3-2), the image begins to be received from image data corresponding to the top side of the document image toward its bottom side. At this time, the right-and-left direction of the document agrees with the main scanning direction, and the up-and-down direction agrees with the sub-scanning direction (ST3-3).

The received image data is transferred to the QNT/PM 46 in units of lines, and is mapped on the page memory 44. At this time, the image data is mapped on the page memory 44, as shown in ST3-4. That is, image data in the bottom-side direction is mapped in turn from image data in the top-side direction of the document image.

When the object to be printed is a landscape image (ST4-2), the image begins to be received from image data corresponding to the right side of the document image toward its left side. At this time, the up-and-down direction of the document agrees with the main scanning direction, and the right-and-left direction agrees with the sub-scanning direction (ST4-3).

The received image data is transferred to the QNT/PM 46 in units of lines, and is mapped on the page memory 44. At this time, the image data is mapped on the page memory 44, as shown in ST4-4. That is, image data in the left-side direction is mapped in turn from image data in the right-side direction of the document image.

As described above, in case of the printer function, an image is transferred on the page memory 44 while its widthwise direction agrees with the main scanning direction.

The first embodiment of the present invention will be described below. The contents of the first embodiment are associated with the print order in the copying, facsimile, and printer functions.

The print order includes two different orders, i.e., the ascending order for printing data from its first page to the last page, and the descending order for printing data from its last page to the first page. In order to make the page relationship of documents match with that of the print results, the paper discharge method differs as follows in correspondence with the ascending and descending print orders. Assume that paper sheets are discharged to be stacked on the discharge tray 362. Also, one surface of a paper sheet will be referred to as a first surface hereinafter, and the other surface thereof will be referred to as a second surface hereinafter. That is, the first and second surfaces respectively correspond to the front and back surfaces of a paper sheet.

Single-sided printing in the ascending order will be explained below. In this case, the first page is printed on the first surface of the first paper sheet. The first paper sheet printed with the first page is discharged after it is reversed via the ADD 270. That is, the first paper sheet is discharged, so that its first surface faces the discharge tray 362.

Subsequently, the second page is printed on the first surface of the second paper sheet. The second paper sheet printed with the second page is discharged after it is reversed via the ADD 270. Namely, the second paper sheet is discharged, so that its first surface faces the second surface of the first paper sheet.

The third page is printed on the first surface of the third paper sheet. The third paper sheet printed with the third page is discharged after it is reversed via the ADD 270. That is, the third paper sheet is discharged, so that its first surface faces the second surface of the second paper sheet.

Figure 21:
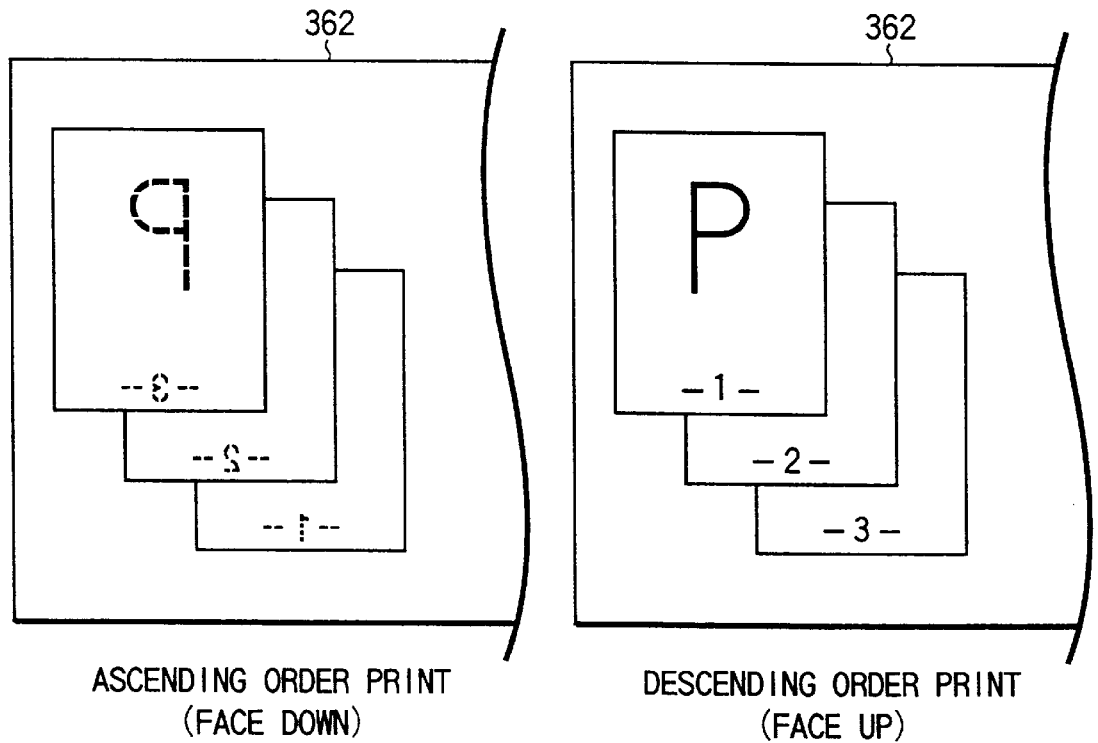
FIG. 21 shows images obtained by face-down discharging executed in the ascending print mode, and those obtained by face-up discharging executed in the descending print mode.

In this manner, in case of single-sided printing in the ascending order, the printed paper sheets are discharged facing down. FIG. 21 shows this state.

Double-sided printing in the ascending order will be explained below. In this case, the first page is printed on the first surface of the first paper sheet. The first paper sheet printed with the first page is reversed via the ADD 270. Furthermore, the second page is printed on the second surface of the reversed first paper sheet. The first paper sheet printed with the second page is discharged. That is, the first paper sheet is discharged, so that its first surface faces the discharge tray 362.

Next, the third page is printed on the first surface of the second paper sheet. The second paper sheet printed with the third page is reversed via the ADD 270. Furthermore, the fourth page is printed on the second surface of the reversed second paper sheet. The second paper sheet printed with the fourth page is discharged. Namely, the second paper sheet is discharged, so that its first surface faces the second surface of the first paper sheet.

Single-sided printing in the descending order will be explained below. In this case, the last page (N) is printed on the first surface of the first paper sheet. The first paper sheet printed with the last page is directly discharged. That is, the first paper sheet is discharged, so that its second surface faces the discharge tray 362.

Subsequently, the (N−1)-th page is printed on the first surface of the second paper sheet. The second paper sheet printed with the (N−1)-th page is directly discharged. In other words, the second paper sheet is discharged, so that its second surface faces the first surface of the first paper sheet.

The (N−2)-th page is printed on the first surface of the third paper sheet. The third paper sheet printed with the (N−2)-th page is directly discharged. More specifically, the third paper sheet is discharged, so that its second surface faces the first surface of the second paper sheet.

In this manner, in case of single-sided printing in the descending order, the printed paper sheets are discharged facing up. FIG. 21 shows this state.

Double-sided printing in the descending order will be explained below. In this case, the last page (N) is printed on the first surface of the first paper sheet. The first paper sheet printed with the last page (N) is reversed via the ADD 270. Furthermore, the (N–1)-th page is printed on the second surface of the reversed first paper sheet. The first paper sheet printed with the (N–1)-th page is reversed via the ADD 270, and is then discharged. That is, the first paper sheet is discharged, so that its second surface faces the discharge tray 362.

Subsequently, the (N–2)-th page is printed on the first surface of the second paper sheet. The second paper sheet printed with the (N–2)-th page is reversed via the ADD 270. The (N–3)-th page is printed on the second surface of the reversed second paper sheet. The second paper sheet printed with the (N–3)-th page is reversed again via the ADD 270, and is then discharged. Namely, the second paper sheet is discharged, so that its second surface faces the first surface of the first paper sheet.

In the image forming apparatus 200, image data is acquired as follows. Upon executing the copying function, the image data to be printed is acquired by the scanner unit 50 as an acquisition means. Upon executing the facsimile function, the image data to be transmitted is acquired by the scanner unit 50 as an acquisition means. On the other hand, the image data to be received is acquired via the FAXC 58 as an acquisition means. Upon executing the printer function, the image data to be printed is acquired by the LANC 54 as an acquisition means.

The image data to be printed read upon executing the copying function is coded/compressed in the QNT/PM 46, and is then stored in the page memory 44 or HDD 37 as a storage means. The image data to be transmitted read upon executing the facsimile function is coded/compressed by the CODEC 66, and is stored in the file memory 68 as a storage means. The image data to be printed received upon executing the facsimile function is also stored in the file memory 68 as a storage means. The image data to be printed received upon executing the printer function is coded/compressed in the QNT/PM 46, and is stored in the page memory 44 or HDD 37 as a storage means. Note that the storage means such as the page memory 44, HDD 37, file memory 68, and the like for storing image data will be generally called a storage unit hereinafter.

The job parameter table shown in FIG. 16 records information associated with an image data file consisting of image data acquired by the acquisition means. For example, attribute data for one page is additionally recorded in the information associated with the image data file every time image data for one document page is stored in the storage unit. In the image data file, page numbers (1, 2, . . . , n) are assigned to image data. Whether the image data file is read out in turn from the first or last page is determined by the overall controller 118. That is, the printer unit 52 executes image forming processing in accordance with the read order of the image data file determined by the overall controller 118. Note that a mode for executing image forming processing in turn from the first page will be referred to as a first image forming processing mode hereinafter, and a mode for executing image forming processing in turn from the last page as a second image forming processing mode hereinafter. These modes are executed by the printer unit 52 as an image forming means.

Recently, most copying machines adopt a system of inputting document images to be copied in the descending order and outputting them in the descending order. In this case, output images are discharged facing up so that the page sequence of the document images matches that of the output images. Also, most printers adopt a system of receiving the image data to be printed in the ascending order and outputting them in the ascending order. This is because the transmission order from a PC or the like as the transmission source of image data is normally the ascending order. In this case, output images are discharged facing down to maintain the page sequence. Of course, when the transmission order from a PC or the like as the transmission source of image data is the descending order, a system for outputting images in the descending order is exploited, and in this case, the output images are discharged facing up to maintain the page sequence. Furthermore, in a facsimile apparatus, image data are normally transmitted in the ascending order. That is, the image data are received by the facsimile apparatus in the ascending order, and are output in the ascending order. In this case, the output images are discharged facing down to maintain the page sequence.

In the present invention, the image forming apparatus having a plurality of functions such as the copying function, facsimile function, printer function, and the like can produce outputs corresponding to the features of the individual functions. A face-up output is suitable for the image forming apparatus of the present invention in terms of its mechanism (the face-up output can shorten the time required for printing as compared to a face-down output), as shown in FIG. 2. In order to obtain a face-up output, images must be printed in the descending order. However, in order to print image data, which are input in the ascending order, in the descending order, an image data file corresponding to all the pages of the documents to be printed must be temporarily stored, and printing must be started in turn from the finally stored page (last page). However, the page memory 44, HDD 37, or the like that stores the image data file has a limited storage capacity, and cannot store the entire image data file depending on its size.

Figure 22:
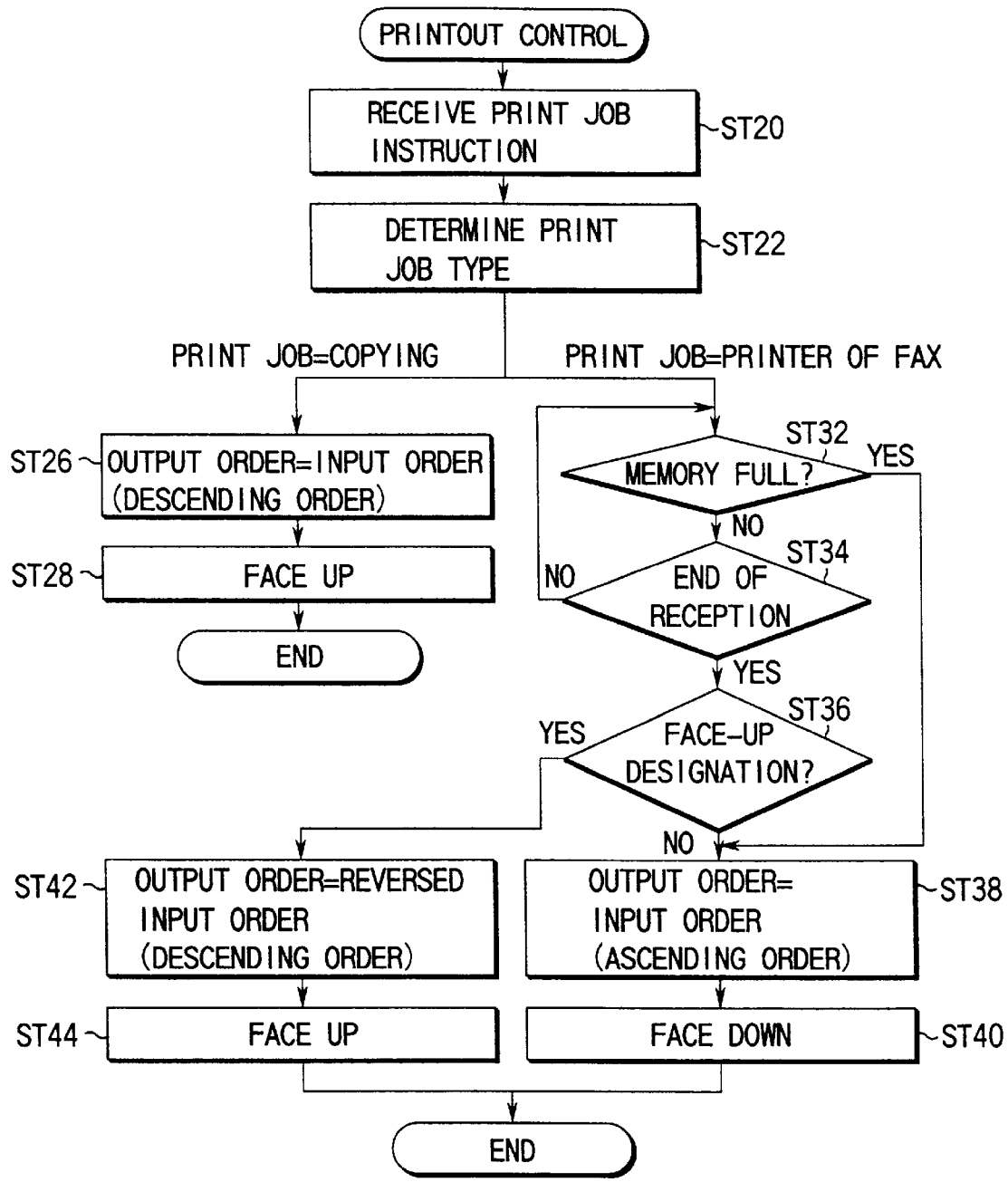
FIG. 22 is a flow chart showing the print-out control executed in the first embodiment.

To solve this problem, in this invention, print processing is controlled by a method shown in the flow chart shown in FIG. 22. The print processing is started when the overall controller 118 accepts a print job output from the copying controller 114, a print job output from the FAX communication controller 120, or a print job output from the print controller 122 (ST20). The overall controller 118 checks the type of print job (ST22). That is, the source of the print job, i.e., the copying, facsimile, or printer function, is determined.

If the print job is issued by the copying function (ST24), the output order is determined to succeed the input order, i.e., the descending order (ST26), and paper sheets are discharged onto the discharge tray 362 facing up (ST28). More specifically, when the print job is issued by the copying function, the first image forming processing mode is executed, and printed paper sheets are discharged onto the discharge tray 362 facing up. In the printer function, if the data transmission order from a PC is the descending order, printed sheets are discharged facing up in the first image forming processing mode. When paper sheets are discharged on the discharge tray 362 facing up, the paper sheets subjected to the image forming processing are directly discharged into the discharge tray 362 without going through the ADD 270.

If the print job is issued by the facsimile function or printer function (ST30), whether or not the storage unit reaches a memory full state is monitored while the image data to be printed are stored in the storage unit (ST32). The memory full state is determined in accordance with the remaining storage capacity of the storage unit. In other words, when the remaining storage capacity of the storage unit becomes equal to or smaller than a predetermined value, the memory full state is determined. If the memory full state is detected (ST32, YES), the output order is determined to obey the input order, i.e., the ascending order (ST38), and paper sheets are discharged onto the discharge tray 362 facing down (ST40). In the printer function, if the data transmission order from a PC is the descending order, the descending output order is used, and paper sheets are discharged facing up. That is, when the print job is issued by the facsimile function or printer function, and the memory full state is detected, the second image forming processing mode is executed, and printed paper sheets are discharged on the discharge tray 362 facing down. When paper sheets are discharged onto the discharge tray 362 facing down, the paper sheets subjected to the image forming processing are reversed via the ADD 270, and are then discharged onto the discharge tray 362.

If a series of all image data to be printed are received (ST34, YES) while no memory full state is detected (ST32, NO), it is checked if a face-up mode is designated (ST36). The face-up mode is designated in advance by the user at the control panel 202. If the face-up mode is designated (ST36, YES), the image data stored in the storage unit are read out in the descending order, the output order is determined to succeed the descending order (ST44), and paper sheets are discharged onto the discharge tray 362 facing up (ST44). That is, when no memory full state is detected, and the face-up mode is designated, the first image forming processing mode is executed, and printed paper sheets are discharged onto the discharge tray 362 facing up.

If the face-up mode is not designated (ST36, NO), the image data stored in the storage unit are read out in the ascending order, the output order is determined to follow the input order, i.e., the ascending order (ST38), and paper sheets are discharged onto the discharge tray 36 facing down (ST40). That is, if no memory full state is detected, and the face-up mode is not designated, the second image forming processing mode is executed, and printed paper sheets are discharged onto the discharge tray 362 facing down.

By controlling printout in this manner, the following effects are expected. Upon executing the copying function, since printed paper sheets are output in the descending order facing up, the same print results as in the conventional copying machine can be obtained. With this function, the user can naturally use the copying function. Upon executing the facsimile or printer function, face-up descending output or face-down ascending output is selected in accordance with the remaining memory capacity and the presence/absence of designation of the face-up mode. With this function, errors caused by the memory full state can be precluded. Furthermore, outputs required by the user can be obtained.

The second embodiment of the present invention will be described below. The contents of the second embodiment are associated with centering processing and cornering processing in the copying, facsimile, and printer functions.

Figure 23:
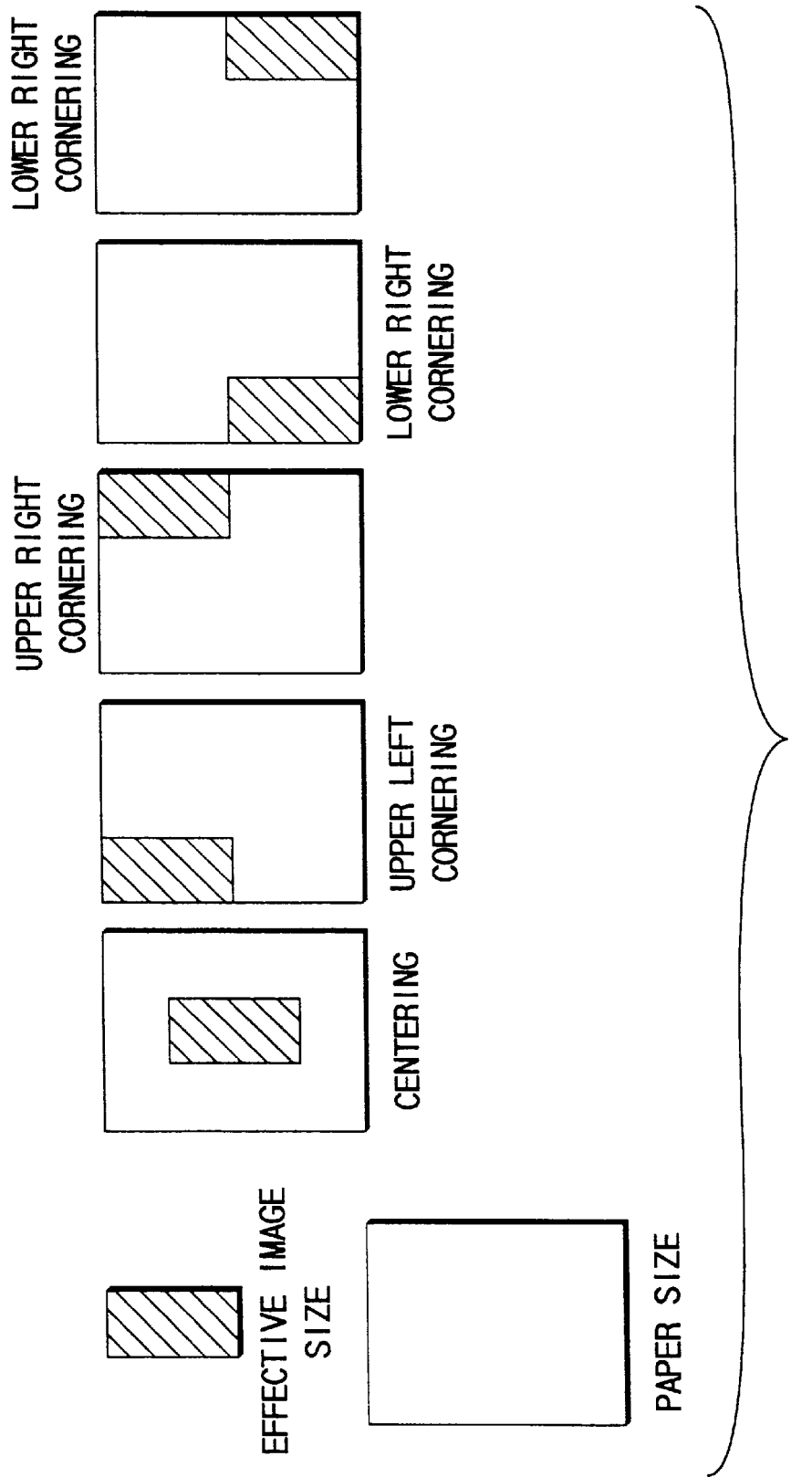
FIG. 23 shows images obtained as a result of centering processing and cornering processing.

The centering processing and cornering processing will be described below with reference to FIG. 23. When the image to be output has a size different from that of a paper sheet as the output destination of that image, processing for printing the image so that the center of the paper sheet matches that of the image is called centering processing. On the other hand, processing for printing an image while offsetting it to a certain corner of a paper sheet is called cornering processing. Note that the cornering processing includes upper left cornering processing for forming an image while offsetting it to the upper left corner of a paper sheet, upper right cornering processing for forming an image while offsetting it to the upper right corner of a paper sheet, lower left cornering processing for forming an image while offsetting it to the lower left corner of a paper sheet, and lower right cornering processing for forming an image while off-setting it to the lower right corner of a paper sheet, as shown in FIG. 23.

The centering processing and cornering processing are executed as follows. The image processing ASIC included in the QNT/PM 46 calculates the mapping position of an image on the page memory having a size corresponding to the paper sheet used on the basis of image size data included in image data, and paper size data. The image is mapped at the predetermined position on the page memory in accordance with the calculation result. The calculation of the mapping position of an image on the page memory is done in a portion of "calculation of write position of page buffer" in the flow charts shown in FIGS. 14 and 15. The "calculation of write position of page buffer" will be described in detail later with reference to the flow charts shown in FIGS. 24 and 25. The image forming apparatus of the present invention executes the cornering processing so that the cornering direction matches the direction of an image in consideration of different directions of image data depending on job types shown in FIG. 19. This will be explained in detail later.

When a binding margin is enabled, the designated centering/cornering mode is temporarily canceled, and processing for offsetting an image toward the binding margin is added. This is to minimize the image loss amount by centering/cornering since the binding margin is formed by shifting an image when data on the page memory is transferred to the printer. When the binding margin is enabled, centering/cornering is done on the basis of a cornering position conversion table for a binding margin shown in FIG. 27. Note that the cornering position conversion table for a binding margin is stored in the NVRAM 34.

Furthermore, when the centering/cornering mode is set by the user's initial setup, if the job type is "copying" or "printer", centering/cornering is done as it is designated. However, a facsimile apparatus that adopts roll paper transmits (standard paper width×length) data. For this reason, if centering/cornering is done as it is designated, the communication time often becomes longer than that required normally. Hence, in case of FAX, setting of centering/cornering associated with the sub-scanning direction is disabled.

The present invention allows desired cornering processing and binding margin processing in an image forming apparatus with a plurality of functions such as a copying function, facsimile function, printer, function and the like. That is, as has been described above with the aid of FIG. 19, since image data have different mapping states on the memory depending on the functions, the cornering processing and binding margin processing are executed in consideration of such different mapping states.

The cornering processing is executed based on an upper right, upper left, lower right, or lower left cornering instruction. However, since actual cornering processing is done for an image on the page memory, the designated cornering position is converted into a position on the page memory. This conversion is attained in accordance with a cornering processing position conversion table shown in FIG. 28. Note that this cornering processing position conversion table is stored in the NVRAM 34.

Conversion of the cornering processing position will be explained below with reference to FIG. 28. Upon executing the copying function, the cornering position designated by the user becomes the same as that converted using the cornering processing position conversion table. That is, when the cornering position designated by the user is the upper right, lower right, upper left, or lower left cornering position, the converted cornering position becomes the upper right, lower right, upper left, or lower left cornering position.

Upon executing the facsimile function, if the cornering position designated by the user is the upper right, lower right, upper left, or lower left cornering position, the converted cornering position becomes the lower right, lower left, upper right, or upper left cornering position.

Upon executing the printer function, when the object to be printed is a landscape image, if the cornering position designated by the user is the upper right, lower right, upper left, or lower left cornering position, the converted cornering position becomes the upper right, lower right, upper left, or lower left cornering position.

Upon executing the printer function, when the object to be printed is a portrait image, if the cornering position designated by the user is the upper right, lower right, upper left, or lower left cornering position, the converted cornering position becomes the lower right, lower left, upper right, or upper left cornering position.

In this manner, since the cornering position designated by the user is converted into a position on the page memory in consideration of different mapping states on the page memory in the individual functions, the cornering processing can be done at the cornering position designated by the user.

On the other hand, the binding margin processing is executed on the basis of a longitudinal left binding, longitudinal right binding, widthwise left binding, or widthwise right binding instruction. However, since actual binding margin processing is also done for an image on the page memory, the designated binding margin position must be converted into a position on the page memory. This conversion is done in accordance with binding margin position conversion processing tables shown in FIGS. 29 and 30.

Figure 31:
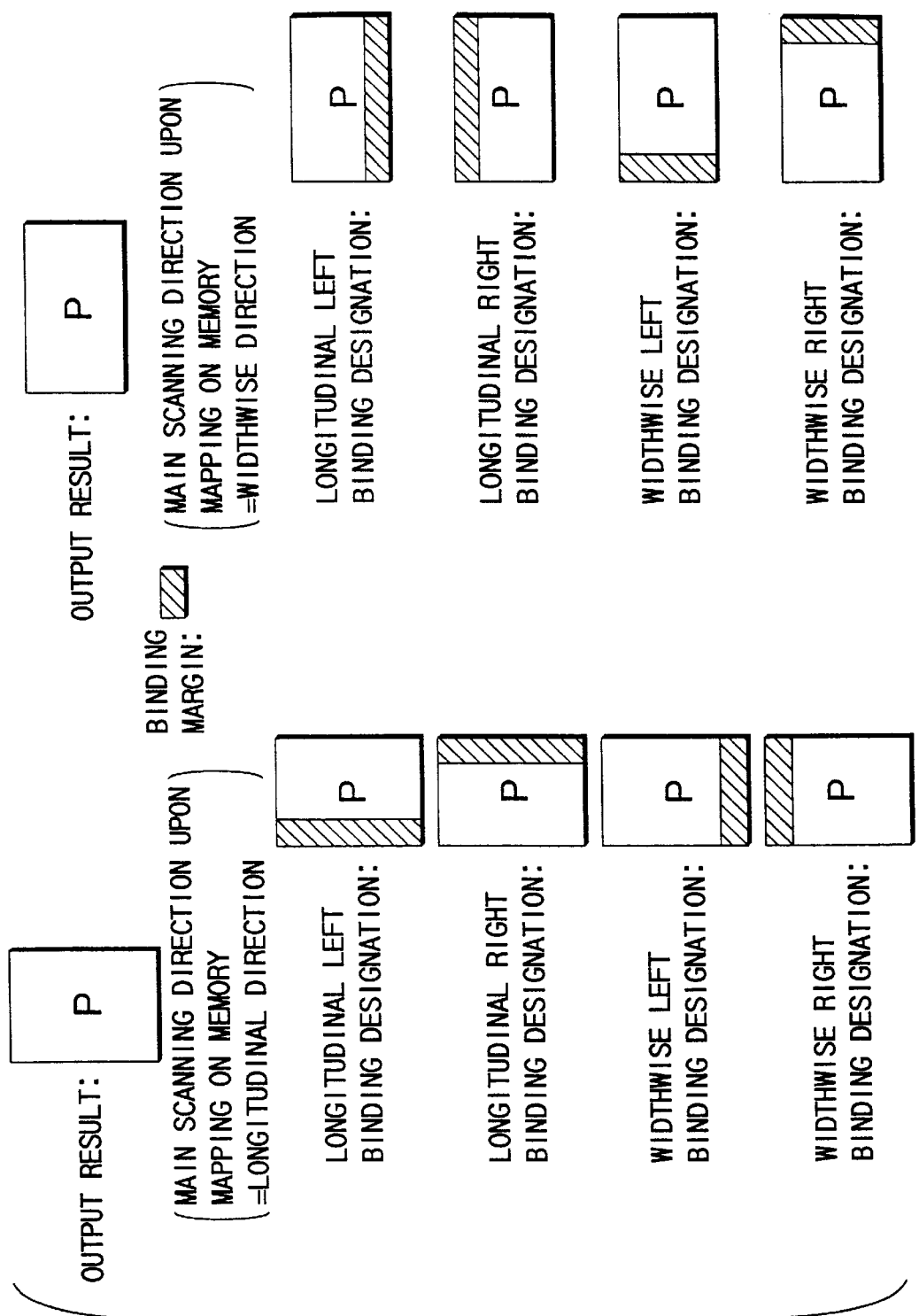
FIG. 31 is a view for explaining the premise of the binding margin processing.

Conversion of the binding margin position will be explained below with reference to FIGS. 29 and 30, and FIGS. 31 to 34. The premise of the binding margin processing is as shown in FIG. 31. More specifically, when the output result is a portrait image (main scanning direction upon memory mapping=longitudinal direction), the binding margin position for longitudinal left binding, longitudinal right binding, widthwise left binding, or widthwise right binding designation is converted to the right, left, bottom, or top side of an image. When the output result is a landscape image (main scanning direction upon memory mapping= widthwise direction), the binding margin position for longitudinal left binding, longitudinal right binding, widthwise left binding, or widthwise right binding designation is converted to the bottom, top, left, or right side of an image.

Figure 32:
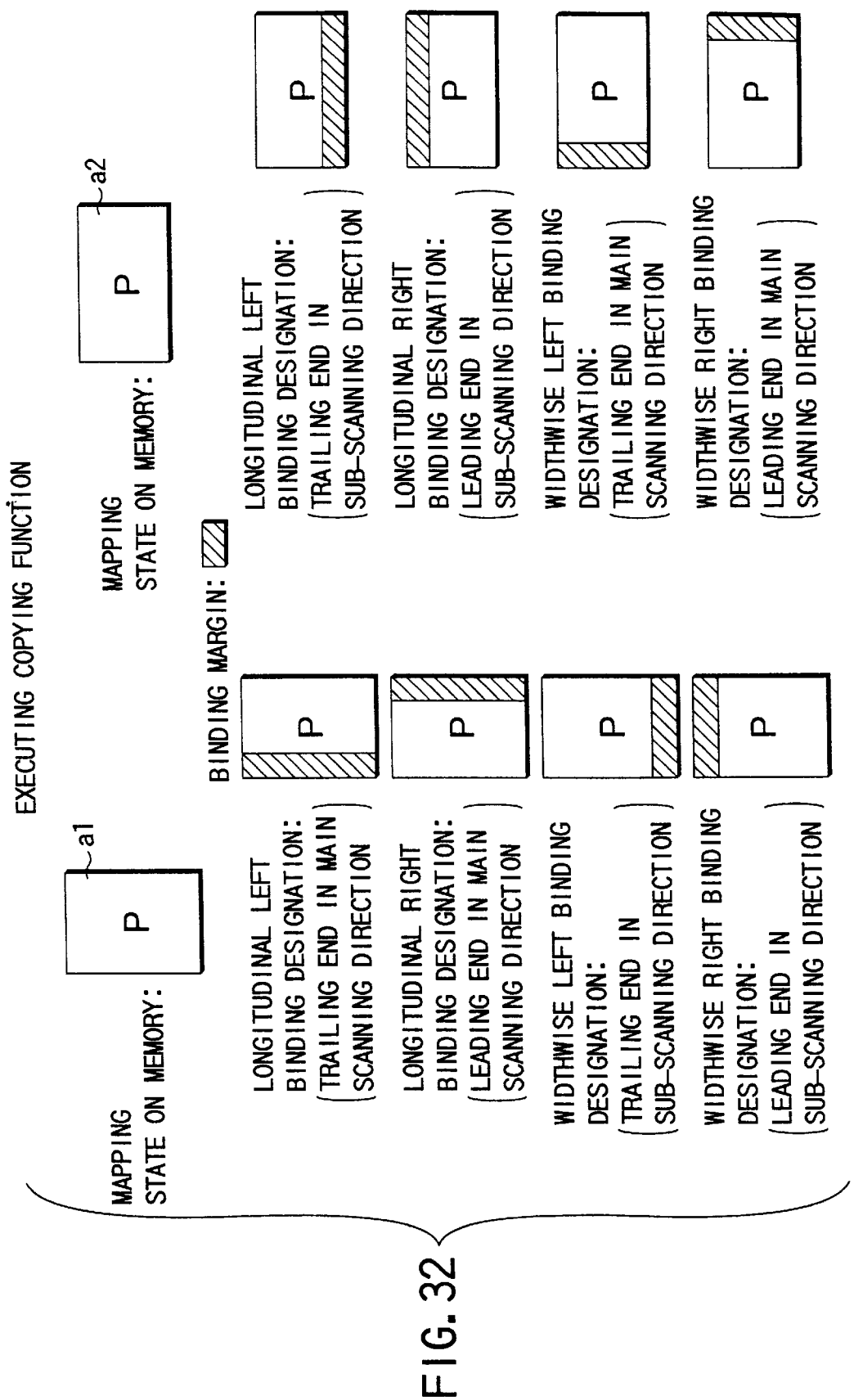
FIG. 32 is a view for explaining the binding margin processing upon execution of the copying function.

On such premise, upon executing the copying function, the designated binding margin is added to an image on the memory, as shown in FIG. 32. That is, in case of mapping state a1 on the memory, the binding margin position for longitudinal left binding, longitudinal right binding, widthwise left binding, or widthwise right binding designation is the trailing end in the main scanning direction, the leading end in the main scanning direction, the trailing end in the sub-scanning direction, or the leading end in the sub-scanning direction (see the column of memory copying in FIG. 29). In case of mapping state a2 on the memory, the binding margin position for longitudinal left binding, longitudinal right binding, widthwise left binding, or widthwise right binding designation is converted to the trailing end in the sub-scanning direction, the leading end in the sub-scanning direction, the trailing end in the main scanning direction, or the leading end in the main scanning direction (see the column of memory copying in FIG. 30).

Figure 33:
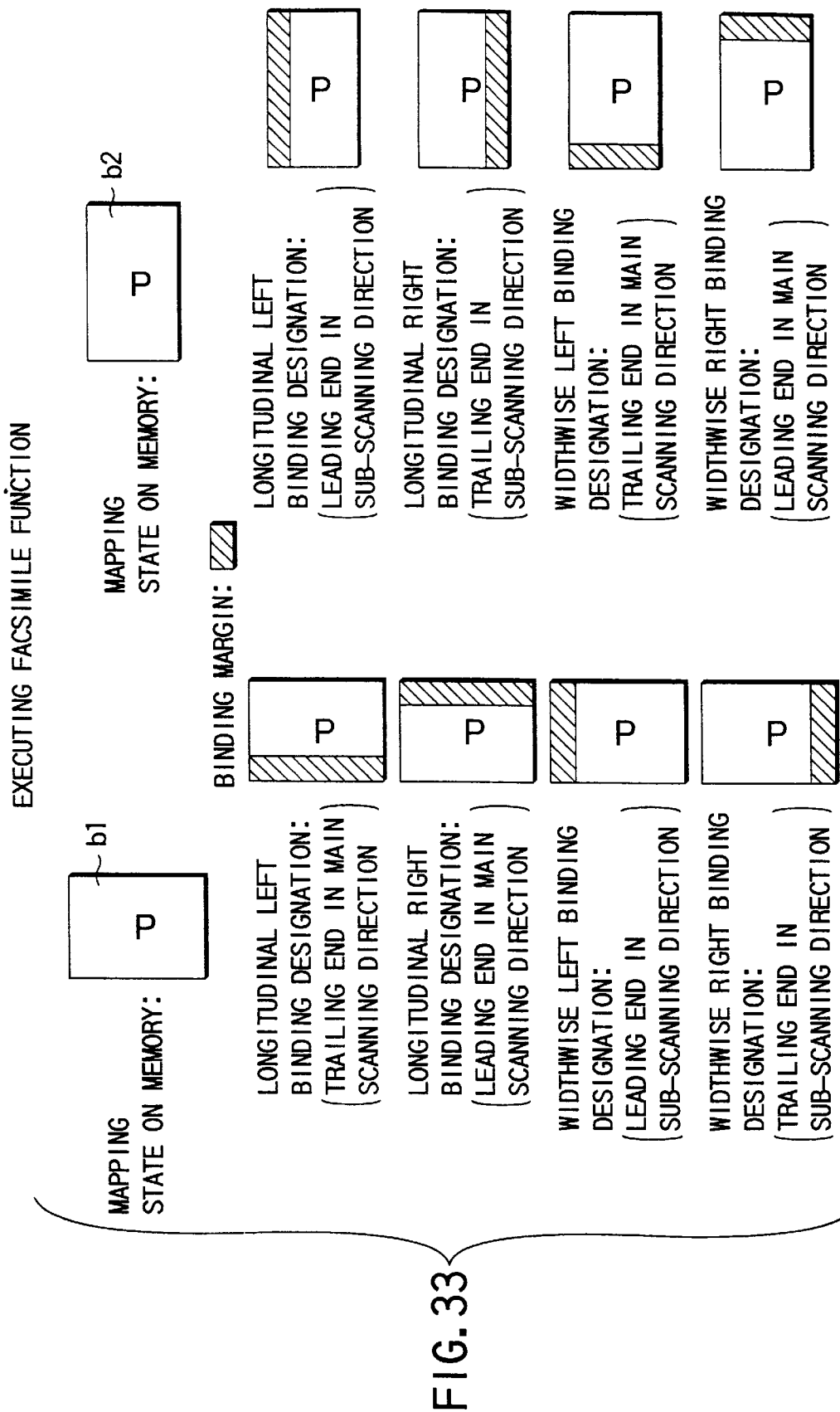
FIG. 33 is a view for explaining the binding margin processing upon execution of the facsimile function.

Upon executing the facsimile function, the designated binding margin is added to an image on the memory, as shown in FIG. 33. That is, in case of mapping state b1 on the memory, the binding margin position for longitudinal left binding, longitudinal right binding, widthwise left binding, or widthwise right binding designation is converted to the trailing end in the main scanning direction, the leading end in the main scanning direction, the leading end in the sub-scanning direction, or the trailing end in the sub-scanning direction (see the column of FAX in FIG. 29). In case of memory mapping state b2 on the memory, the binding margin position for longitudinal left binding, longitudinal right binding, widthwise left binding, or widthwise right binding designation is converted to the leading end in the sub-scanning direction, the trailing end in the sub-scanning direction, the trailing end in the main scanning direction, or the leading end in the main scanning direction (see the column of FAX in FIG. 30).

Figure 34:
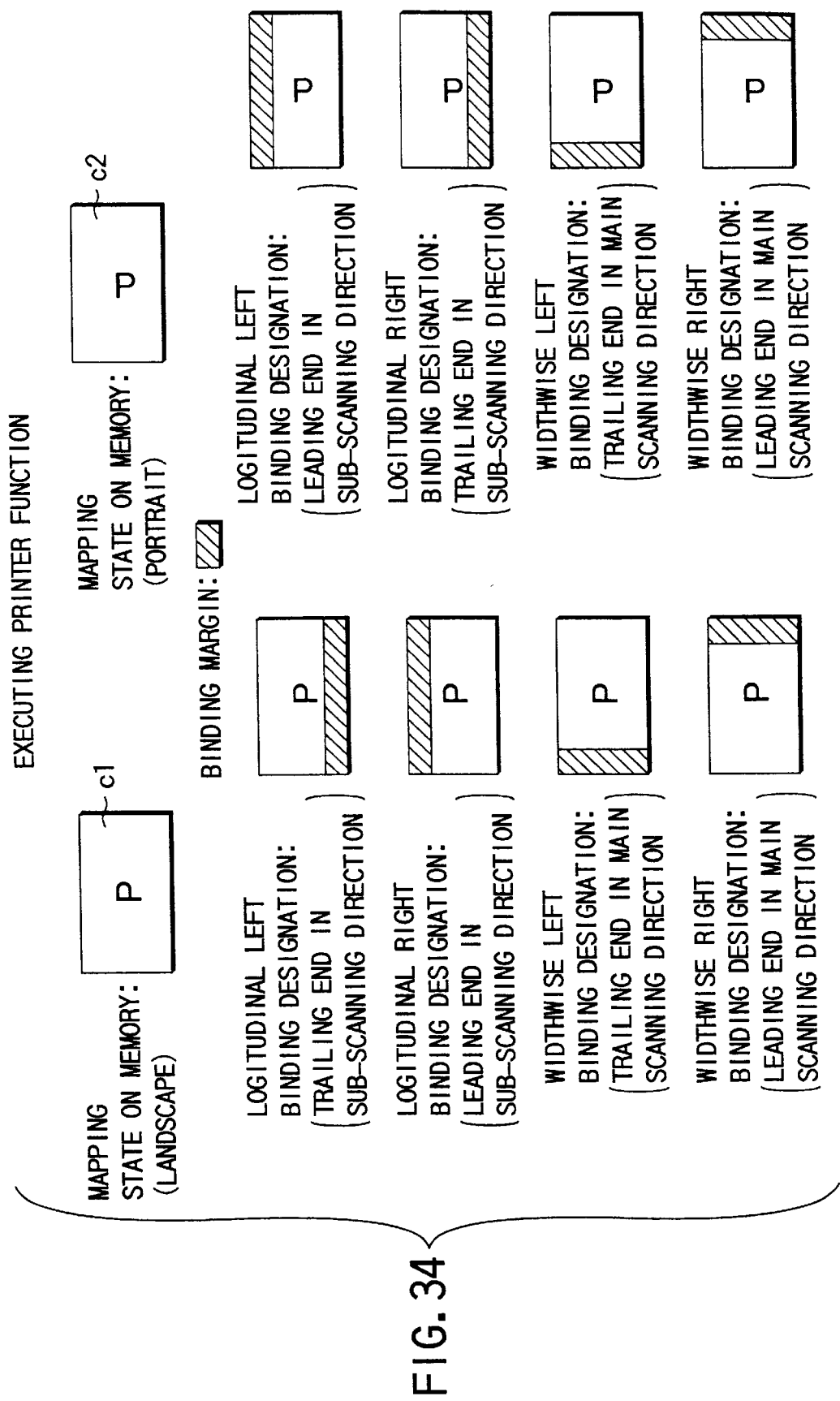
FIG. 34 is a view for explaining the binding margin processing upon execution of the printer function.

Upon executing the printer function, the designated binding margin is added to an image on the memory, as shown in FIG. 34. That is, in case of mapping state c1 (landscape) on the memory, the binding margin position for longitudinal left binding, longitudinal right binding, widthwise left binding, or widthwise right binding designation is converted to the trailing end in the sub-scanning direction, the leading end in the sub-scanning direction, the trailing end in the main scanning direction, or the leading end in the main scanning direction (see the column of printer landscape in FIG. 30). In case of memory mapping state c2 on the memory, the binding margin position for longitudinal left binding, longitudinal right binding, widthwise left binding, or widthwise right binding designation is converted to the leading end in the sub-scanning direction, the trailing end in the sub-scanning direction, the trailing end in the main scanning direction, or the leading end in the main scanning direction (see the column of printer portrait in FIG. 30).

In this way, since the binding margin processing position designated by the user is converted into a position on the page memory in consideration of different mapping states on the page memory in the individual functions, the binding margin processing can be done at the binding margin position designated by the user.

Figure 24:
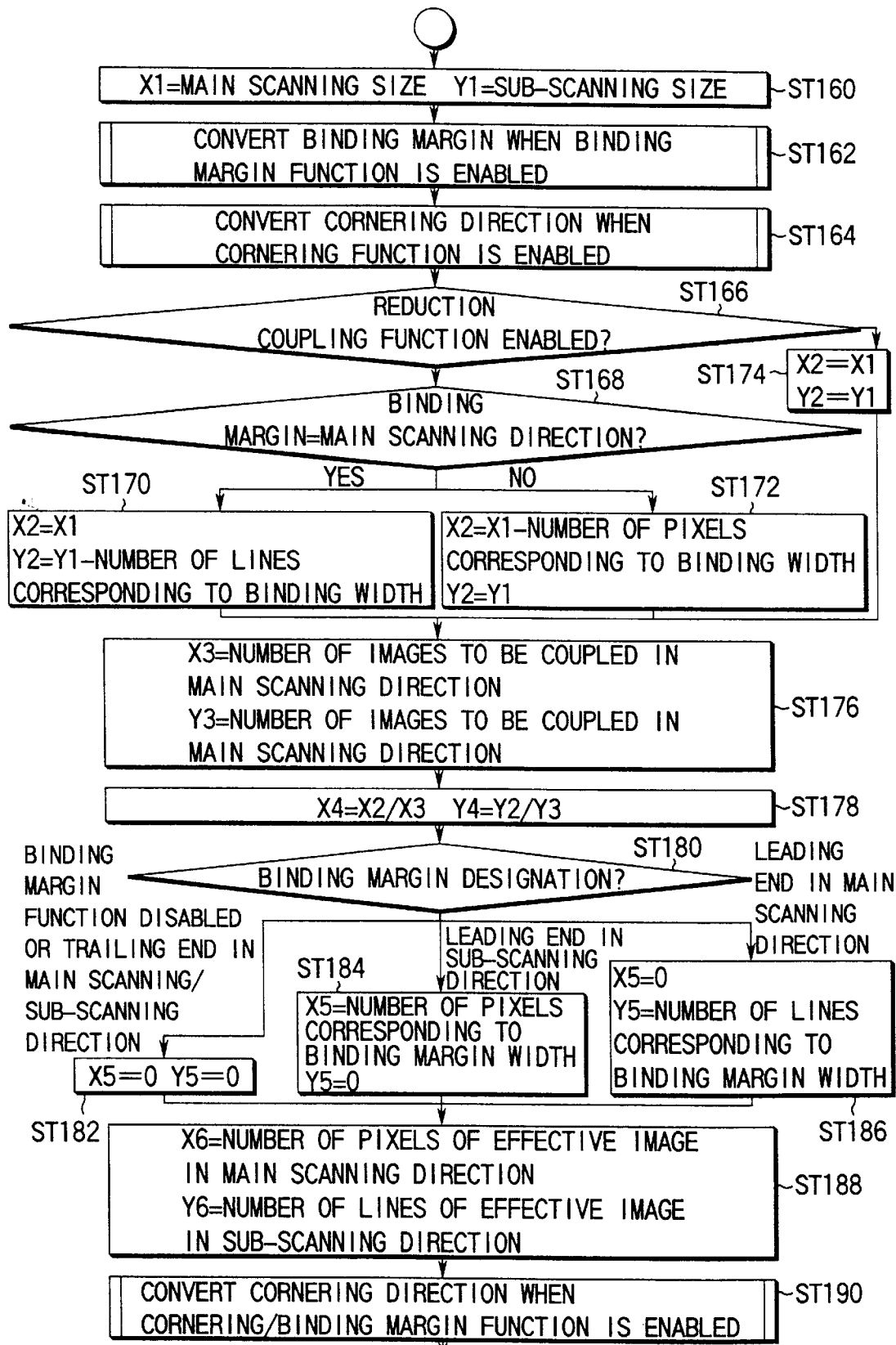
FIG. 24 is a flow chart for explaining the write position calculation processing of a page memory in the flow charts shown in FIGS. 14 and 15 in detail.
Figure 25:
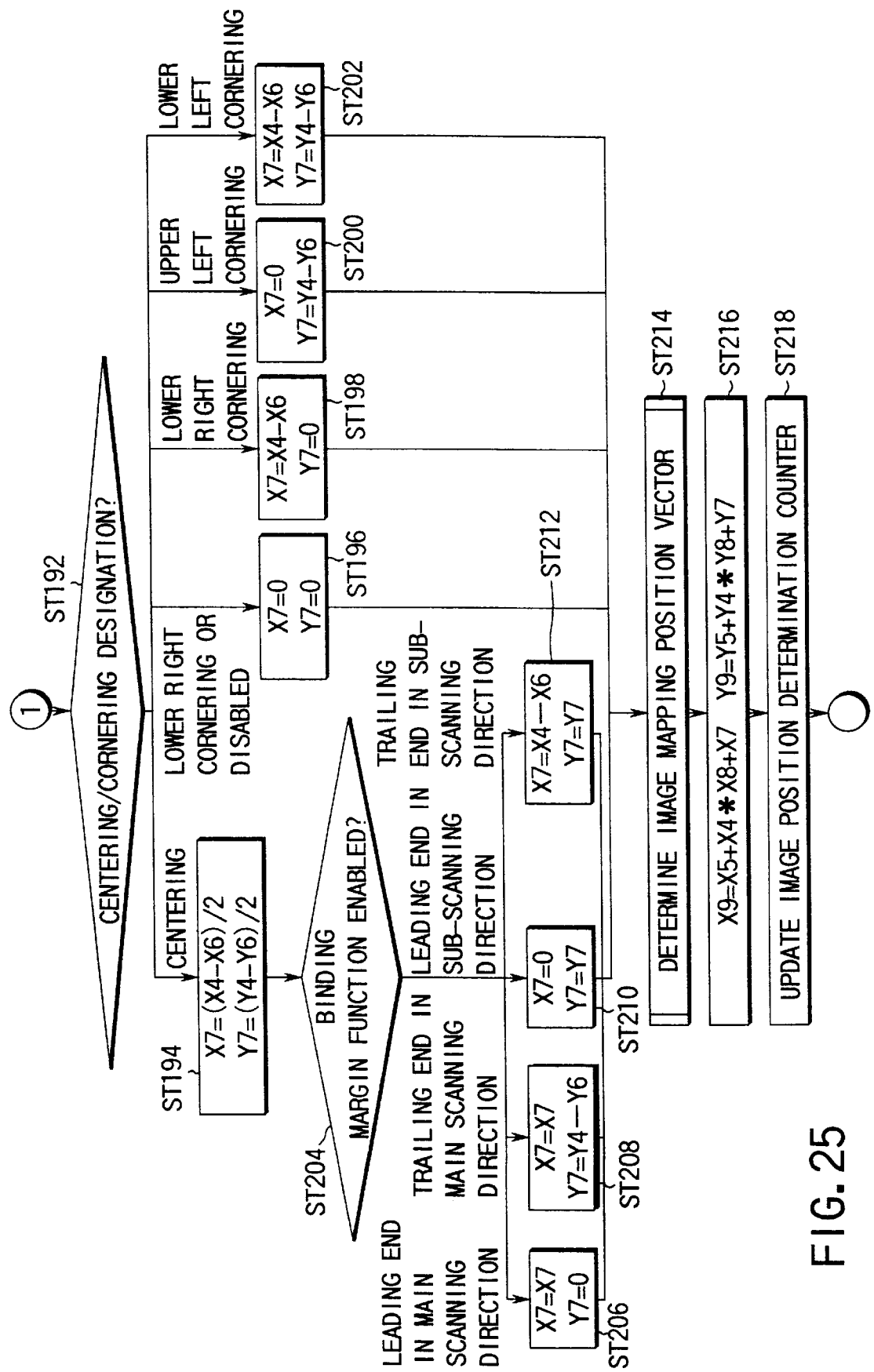
FIG. 25 is a flow chart for explaining the write position calculation processing of the page memory in the flow charts shown in FIGS. 14 and 15 in detail.

The flow charts in FIGS. 24 and 25 will be explained below. A page memory size required for mapping an image is obtained based on the resolution and paper size selected (ST160). In this case, X1 represents the number of main scanning pixels (the size in the main scanning direction) and Y1 represents the number of sub-scanning lines (the size in the sub-scanning direction). If the binding margin processing is designated, the designated binding margin position is converted into a position on the page memory (ST162). If the cornering processing is designated, the designated cornering position is converted into a position on the page memory (ST164).

The centering/cornering processing, and binding margin processing include the following two types of processing. In one processing, upon transferring data from the page memory to the printer, blank data is added to form a binding margin (ST174). In the other processing, an area for a binding margin is assured in advance on the page memory, and image data is mapped in the remaining region (ST168 to ST172). If a reduction coupling mode is disabled (ST166, NO), the former processing is adopted; otherwise (ST166, YES), the latter processing is adopted. Hence, if the reduction coupling mode is enabled (ST166, YES), a write denied portion is excluded from the page memory. That is, an effective image write range is calculated (ST170, ST172). This calculation is made depending on whether the binding margin is formed in the main scanning direction or sub-scanning direction (ST168).

Subsequently, in accordance with the numbers of images to be coupled in the main scanning direction and sub-scanning direction (ST176), the effective image write range per image is calculated (ST178). Furthermore, in accordance with binding margin designation (ST180), corrected origin calculation processing for moving the origin is done for the sake of processing (ST182 to ST186). The numbers of effective image main scanning and sub-scanning pixels are set (ST188). Furthermore, in accordance with centering/cornering designation (ST192), centering processing and cornering processing are done (ST194 to ST212). That is, the image shift vector upon centering and that upon cornering are calculated. Thereafter, the image mapping position vector is determined (ST214), and image mapping is done (ST216 to ST218).

Figure 26:
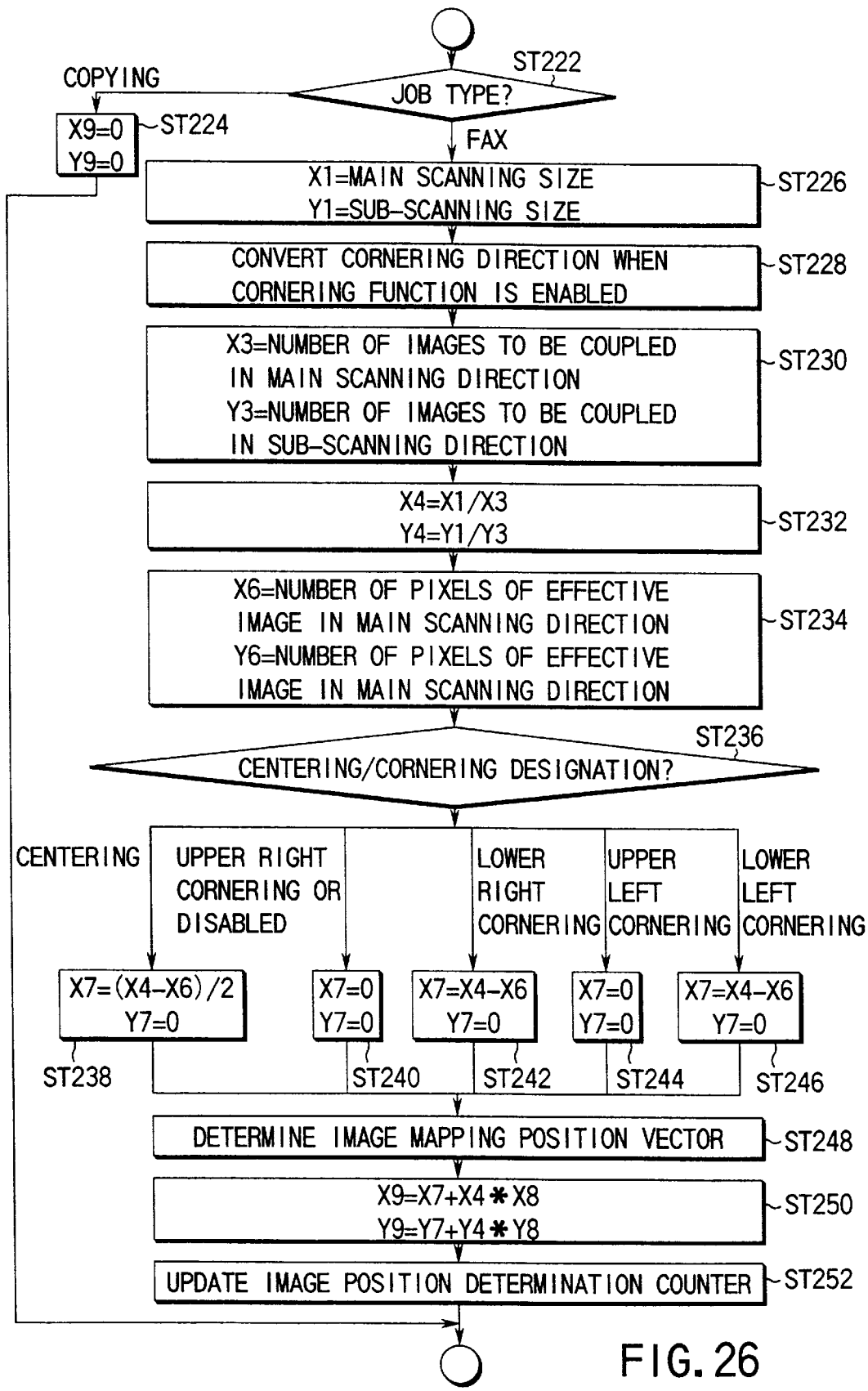
FIG. 26 is a flow chart for explaining the image write processing for the page memory.

The flow chart shown in FIG. 26 will be described below. If the job type is "copying" (ST222), no paste position control is required upon inputting an image, and image data need only be mapped from the origin of the page memory (ST224). If the job type is "FAX" (ST222), the control enters an image data mapping position determination routine (ST226 to ST250).

In this routine, X1 represents the number of main scanning pixels (the size in the main scanning direction) and Y1 represents the number of sub-scanning lines (the size in the sub-scanning direction) (ST226). If cornering is enabled, cornering direction conversion is done (ST228). Subsequently, in accordance with the numbers of images to be coupled in the main scanning direction and sub-scanning direction (ST230), the effective image write range per image is calculated (ST232). Furthermore, in accordance with centering/cornering designation (ST236), centering processing and cornering processing are done (ST238 to ST246). That is, the image shift vector upon centering and that upon cornering are calculated. Thereafter, the image mapping position vector is determined (ST248), and image mapping is done (ST250 to ST252).

The third embodiment of the present invention will be described below. The contents of the third embodiment are associated with reduction coupling processing in the copying, facsimile, and printer functions.

As has been described above, the reduction coupling processing outputs image data for a plurality of pages (two or four pages) in a single document. The reduction coupling processing is implemented by mapping image data for a plurality of pages on the page memory for one page. Hence, the reduction coupling processing can be executed at either the image data acquisition timing or image data output timing. However, the image forming apparatus of the present invention is premised on that documents are input in the descending order upon executing the copying function. In this case, the reduction coupling processing cannot be executed until the total number of documents is detected. That is, in such case, the reduction coupling processing is executed upon outputting image data.

The reduction coupling processing will be described in detail below with reference to FIGS. 35 and 36. FIG. 35 shows an image of the reduction coupling processing of portrait documents. For example, assume that portrait documents are the objects to be subjected to the reduction coupling processing. That is, assume that document 1 (first page), document 2, document 3, and document 4 (last page) are the objects to be subjected to the reduction coupling processing. In this case, the reduction coupling processing for a horizontal writing 4-in-1, vertical writing 4-in-1, horizontal writing 2-in-1, or vertical writing 2-in-1 layout obtains the processing result shown in FIG. 35.

FIG. 36 shows an image of the reduction coupling processing of landscape documents. For example, assume that landscape documents are the objects to be subjected to the reduction coupling processing. That is, assume that document 1 (first page), document 2, document 3, and document 4 (last page) are the objects to be subjected to the reduction coupling processing. In this case, the reduction coupling processing for a horizontal writing 4-in-1, vertical writing 4-in-1, horizontal writing 2-in-1, or vertical writing 2-in-1 layout obtains the processing result shown in FIG. 36.

Since the image forming apparatus of the present invention supports a plurality of functions, images mapped on the page memory have various directions, as described above with the aid of FIG. 19. Hence, the image forming apparatus of the present invention must execute the reduction coupling processing in consideration of different directions of image data depending on the job types. Such reduction coupling processing is executed on the basis of reduction coupling processing/standard-size division processing tables shown in FIGS. 37 to 42. Note that these reduction coupling processing/standard-size division processing tables are stored in the NVRAM 34.

Figure 13:
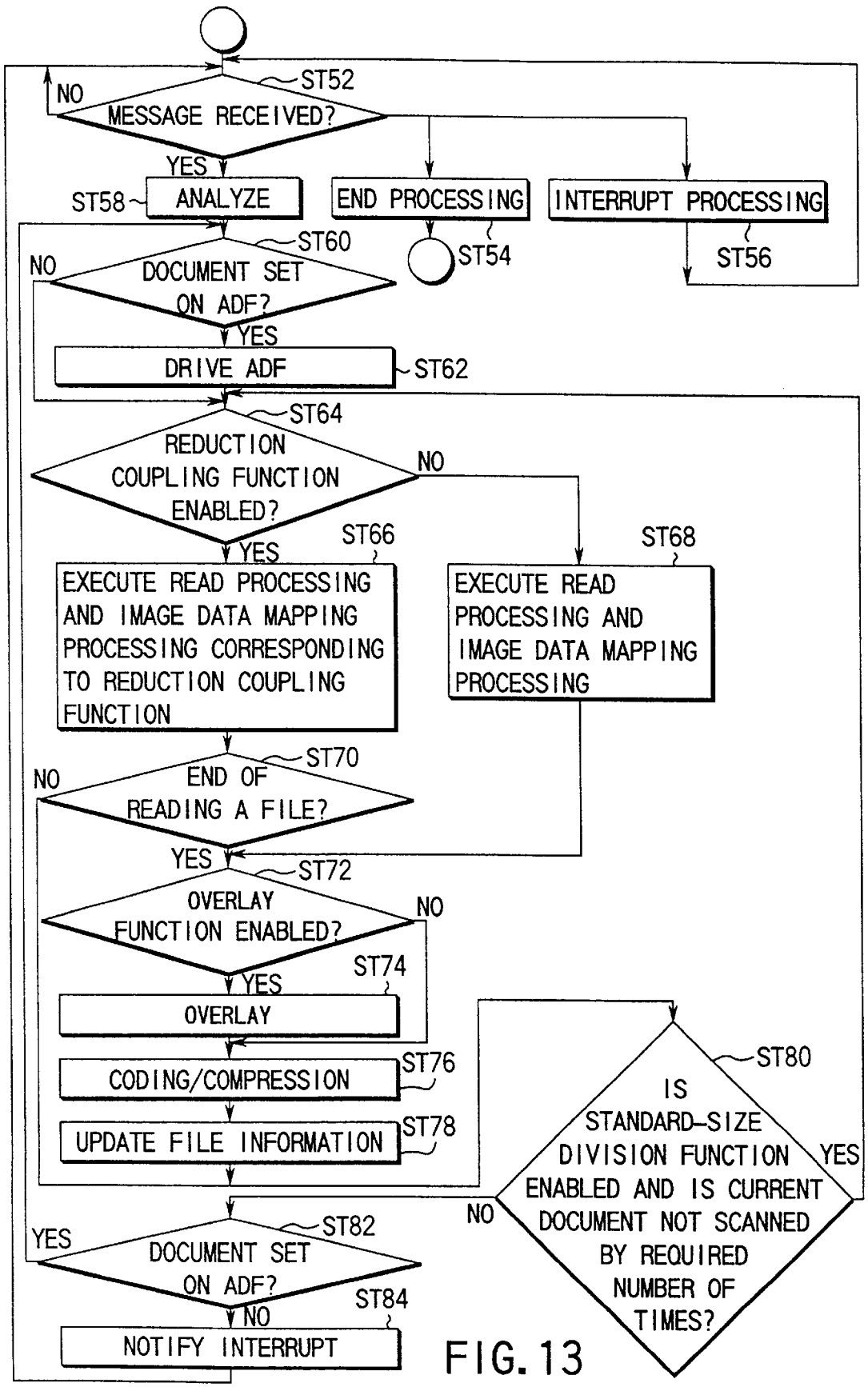
FIG. 13 is a flow chart showing the document input processing.
Figure 14:
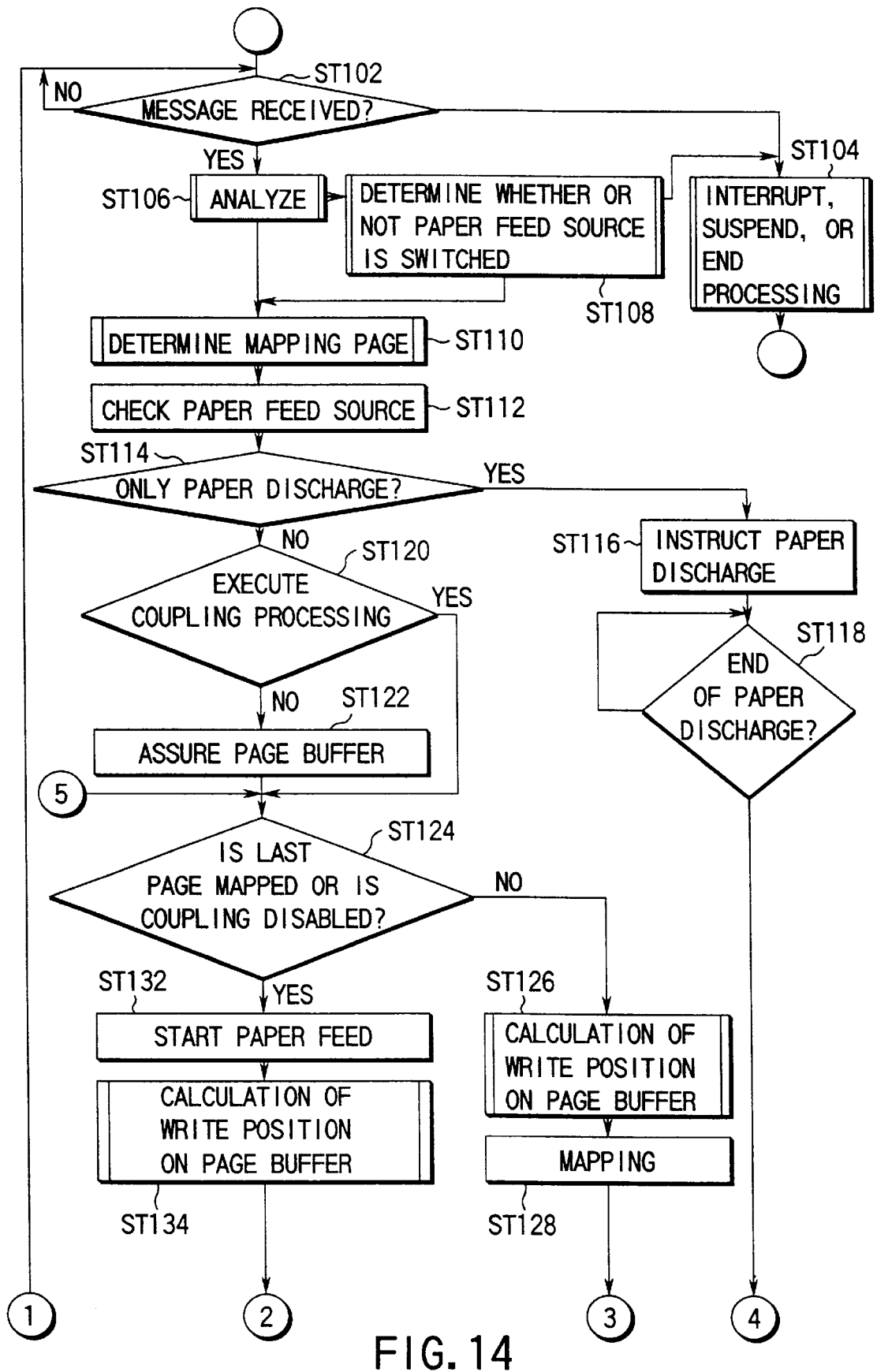
FIG. 14 is a flow chart showing the print processing.
Figure 15:
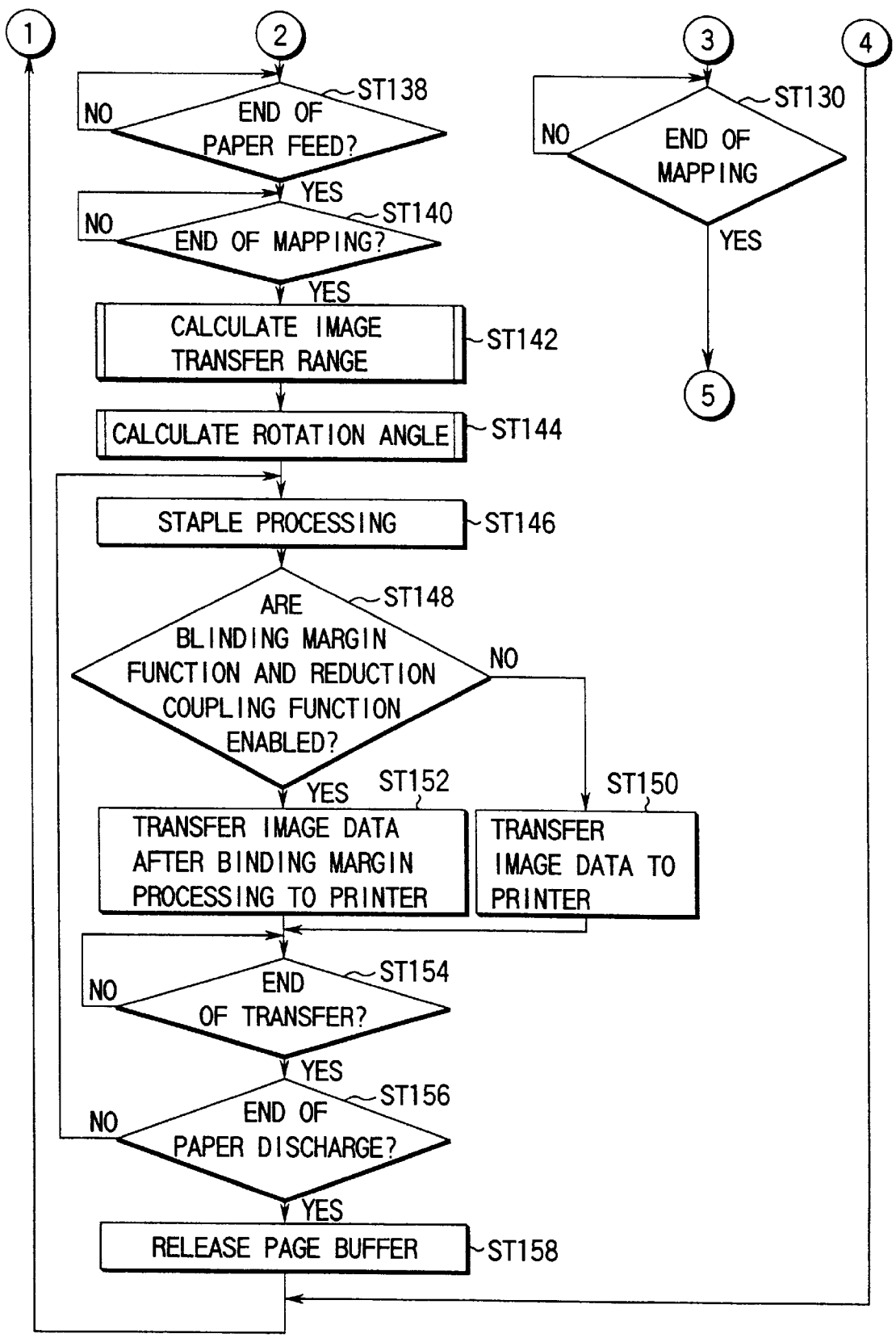
FIG. 15 is a flow chart showing the print processing.

The reduction coupling processing upon outputting an image is executed, as shown in the flow charts shown in FIGS. 14 and 15. A coupling pattern is selected in the portion "calculation of write position on page memory" in these flow charts. The reduction coupling processing upon inputting an image is executed, as shown in the flow chart in FIG. 13. A coupling pattern is selected in the portion "calculation of write position on page memory" in this flow chart.

The image forming apparatus of the present invention has, as a default, a mode for always outputting FAX reception data in a 2-in-1 layout for the purpose of paper savings. However, reduced images may become hard to read depending on the resolution of received image data. To avoid such problem, in job analysis processing (ST106) shown in the flow charts in FIGS. 14 and 15, processing for enabling or disabling reduction coupling destination in correspondence with the resolution of FAX is executed. For example, if the resolution of the received image data is equal to or lower than a predetermined resolution, the reduction coupling processing (2-in-1) is disabled.

Figure 43:
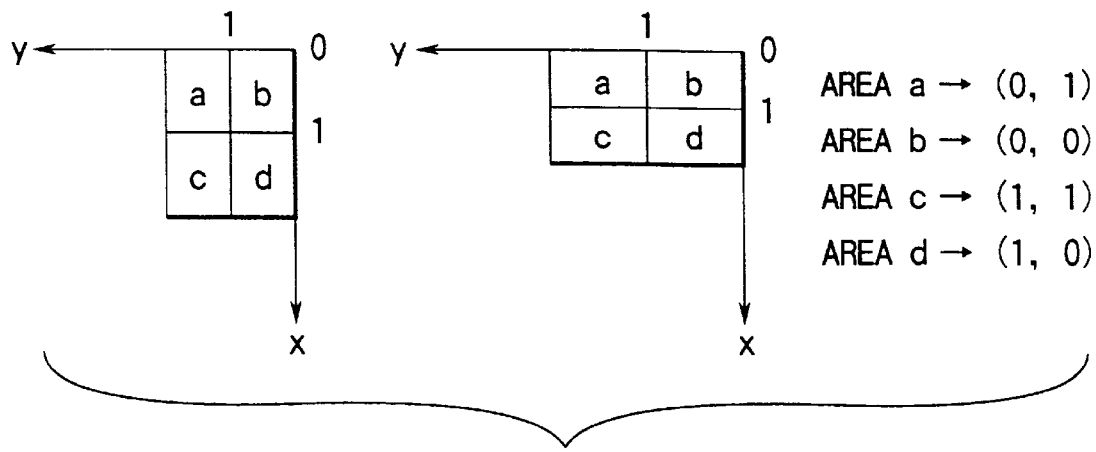
FIG. 43 shows the relationship between the coordinates and region on the page memory.

The reduction coupling processing executed based on the reduction coupling processing/standard-size division processing tables shown in FIGS. 37 to 42 will be described below. Assume that the relationship between the coordinate system and areas on the page memory as a premise is as shown in FIG. 43, that is, area a: (0, 1), area b: (0, 0), area c: (1, 1), and area d: (1, 0). A counter in the reduction coupling processing/standard-size division table is a variable prepared for setting the paste order of 0, 1, 2, and 3 from the first page to a finished document irrespective of the ascending or descending order. That is, in the ascending order, the counter counts like 0, 1, 2, and 3; in the descending order, the counter counts like 3, 2, 1, and 0. If documents shown in FIG. 35 are filed in the order of document 4 (last page)→document 3→document 2→document 1 (first page), the counter counts in the order of 3, 2, 1, and 0. Conversely, if the documents are filed in the order of document 1 (first page)→document 2→document 3→document 4 (last page), the counter counts in the order of 0, 1, 2, and 3.

On such premise, horizontal writing 4-in-1 reduction coupling processing based on the table shown in FIG. 37, vertical writing 4-in-1 reduction coupling processing based on the table shown in FIG. 38, horizontal writing 2-in-1 reduction coupling processing (main scanning direction= widthwise direction of document/main scanning direction= longitudinal direction of page memory) based on the table shown in FIG. 39, horizontal writing 2-in-1 reduction coupling processing (main scanning direction=longitudinal direction of document/main scanning direction=widthwise direction of page memory) based on the table shown in FIG. 40, vertical writing 2-in-1 reduction coupling processing (main scanning direction=widthwise direction of document/ main scanning direction=longitudinal direction of page memory) based on the table shown in FIG. 41, and vertical writing 2-in-1 reduction coupling processing (main scanning direction=longitudinal direction of document/main scanning direction=widthwise direction of page memory) based on the table shown in FIG. 42 are executed. In this manner, the reduction coupling processing can be done in consideration of different mapping states on the page memory depending on the functions.

The fourth embodiment of the present invention will be described below. The contents of the fourth embodiment are associated with standard-size division processing in the copying and facsimile functions.

Figure 44:
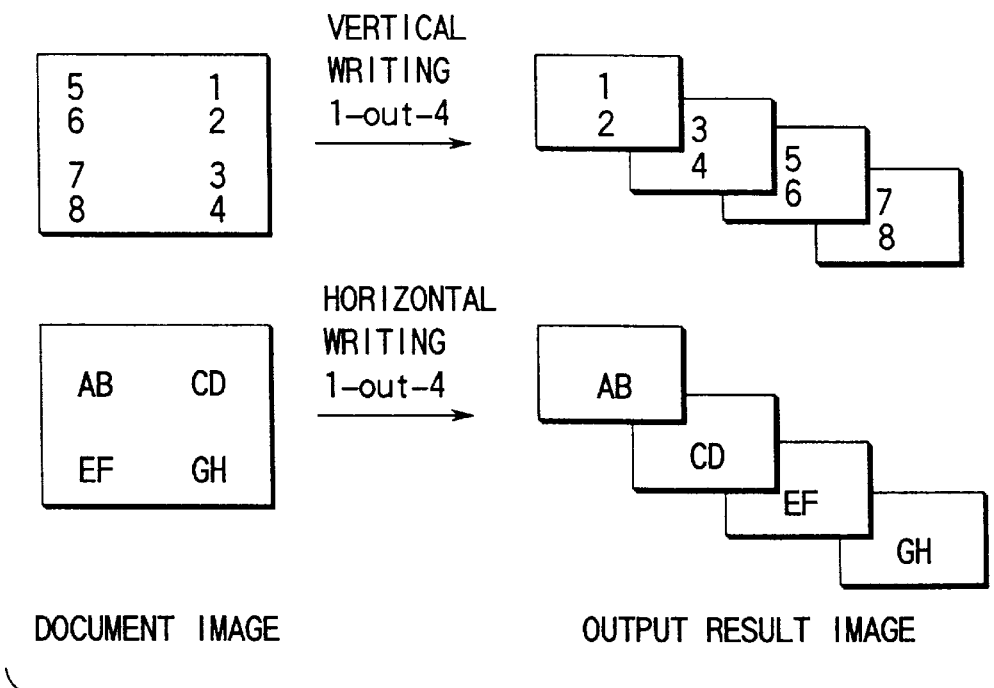
FIG. 44 is a view for explaining the premise of the standard-size division processing.

The standard-size division processing will be described below. The standard-size division processing divisionally captures a single document as two or four image data, files them, and prints or FAX-transmits the filed data. FIG. 44 shows an image of the standard-size division processing. The standard-size division processing can be considered as reverse processing of the reduction coupling processing. If so considered, FIGS. 35 and 36 help image the standard-size division processing. The image forming apparatus of the present invention implements the processing by scanning only portions (sub-scanning direction) within the ranges to be captured of a single document the same number of times as the number of pages to be divided, extracting the required portions (main scanning direction), mapping them on the page memory, and filing the mapped image data.

Since the image forming apparatus of the present invention supports a plurality of functions, images mapped on the page memory have various directions, as described above with the aid of FIG. 19. Therefore, the image forming apparatus of the present invention must execute the standard-size division processing in consideration of different directions of image data depending on the job types. Such standard-size division processing is executed on the basis of the reduction coupling processing/standard-size division processing tables shown in FIGS. 37 to 42. Note that these reduction coupling processing/standard-size division processing tables are stored in the NVRAM 34.

Figure 45:
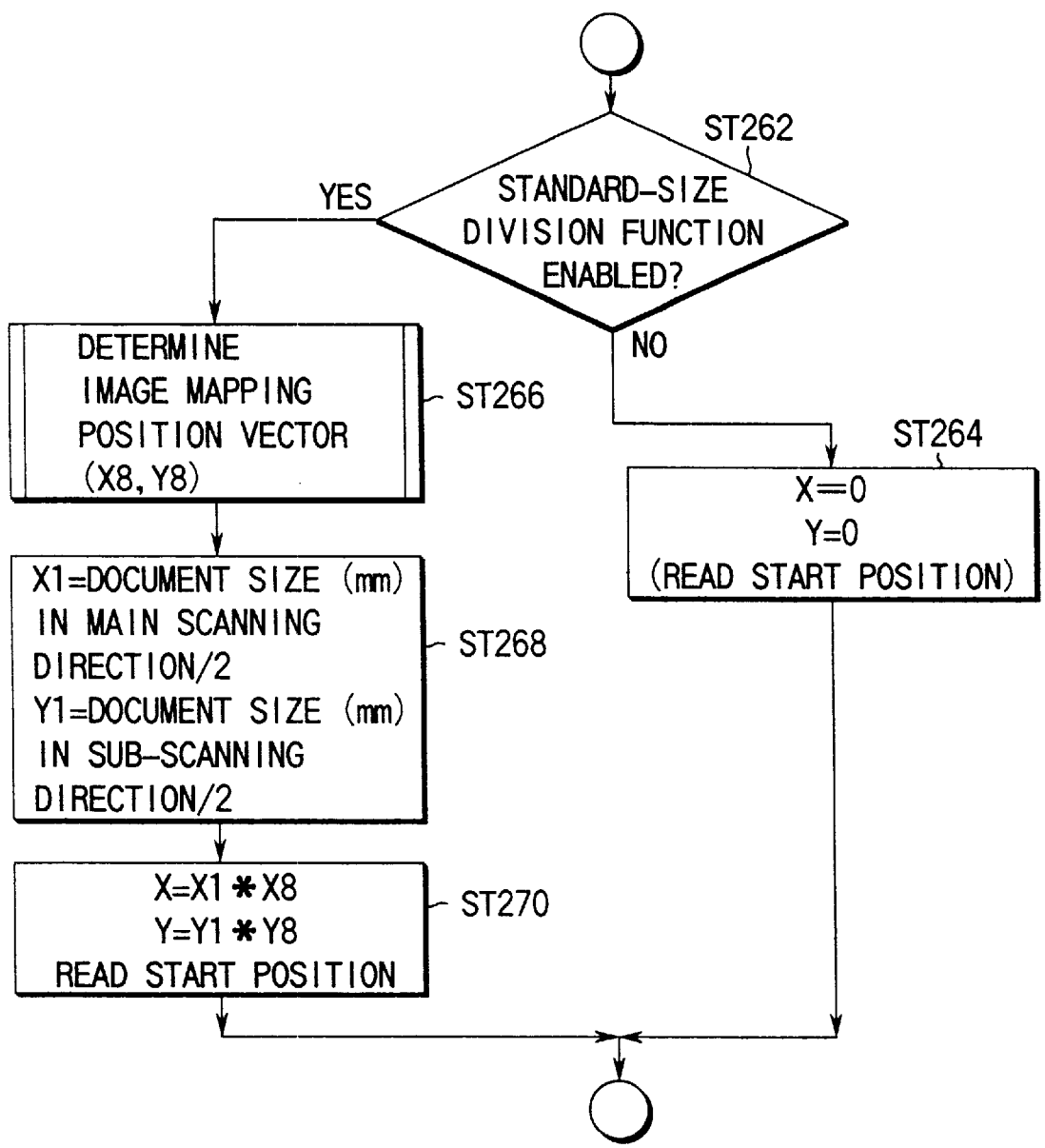
FIG. 45 is a flow chart showing the read position calculation processing in the flow chart shown in FIG. 13 in detail.

In the image forming apparatus of the present invention, the image extraction range is determined in the portion "read position calculation processing" shown in the flow chart of FIG. 13. The method of determining the image extraction range will be described below with reference to the flow chart in FIG. 45. If the standard-size division processing is not enabled (ST262, NO), a normal read start position is set (ST264), and a read starts from the set read start position. If the standard-size division processing is enabled (ST262, YES), the image mapping position vector on the page memory is determined in accordance with FIGS. 37 to 42 (ST266), the read start position is set based on the determined vector (ST268, ST270), and a read starts from the set read start position.

Horizontal writing 1-out-4 standard-size division processing based on the table shown in FIG. 37, vertical writing 1-out-4 standard-size division processing based on the table shown in FIG. 38, horizontal writing 1-out-2 standard-size division processing (main scanning direction=widthwise direction of document/main scanning direction=longitudinal direction of page memory) based on the table shown in FIG. 39, horizontal writing 1-out-2 standard-size division processing (main scanning direction=longitudinal direction of document/main scanning direction=widthwise direction of page memory) based on the table shown in FIG. 40, vertical writing 1-out-2 standard-size division processing (main scanning direction widthwise direction of document/main scanning direction=longitudinal direction of page memory) based on the table shown in FIG. 41, and vertical writing 1-out-2 standard-size division processing (main scanning direction=longitudinal direction of document/main scanning direction=widthwise direction of page memory) based on the table shown in FIG. 42 are executed. In this manner, the standard-size division processing can be done in consideration of different mapping states on the page memory depending on the functions.

The fifth embodiment of the present invention will be described below. The contents of the fifth embodiment are associated with double-sided print processing in the copying, facsimile, and printer functions.

Figure 46:
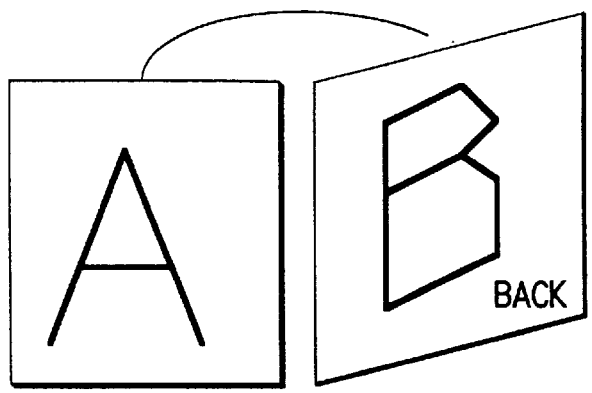
FIG. 46 shows an image of the double-sided print processing having the main scanning direction as a coupling axis.
Figure 47:
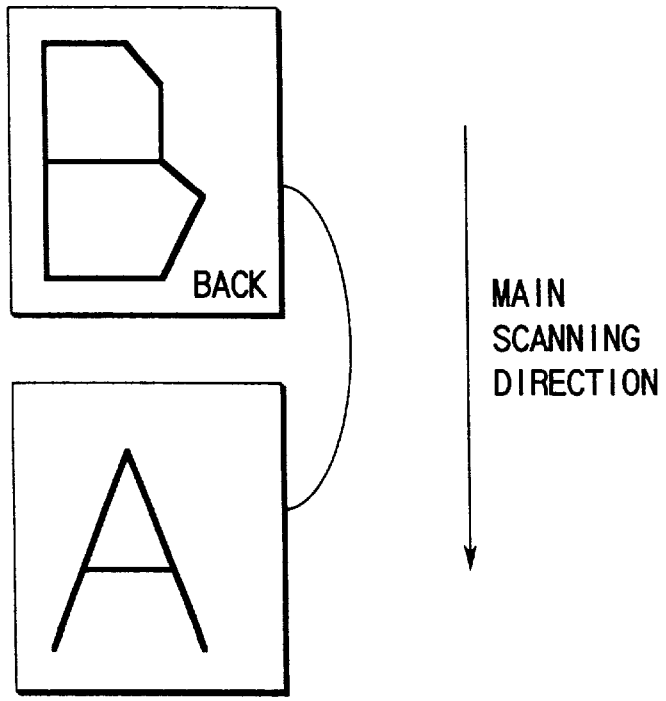
FIG. 47 shows an image of the double-sided print processing having the sub-scanning direction as a coupling axis.

The image forming apparatus 200 of the present invention executes the double-sided print processing by the method already mentioned above. In this processing, in terms of the nature of the mechanism of the ADD 270, a paper sheet is reversed about the main scanning direction as an axis after its front surface (first surface) is subjected to printing, and the back surface (second surface) is then subjected to printing. That is, the main scanning direction serves as a coupling axis for double-sided printing. This feature is suitable for double-sided print processing having the main scanning direction as a coupling axis, as shown in FIG. 46. Furthermore, the image forming apparatus 200 of the present invention reads out data on the memory while rotating it 180°, and transfers it to the printer, thus realizing the double-sided print processing having the sub-scanning direction as a coupling axis, as shown in FIG. 47.

The image forming apparatus 200 of the present invention executes double-sided printing to have the main scanning direction or sub-scanning direction as a coupling axis in correspondence with the following situations. For example, when the binding margin processing is designated upon executing the copying or printer function, double-sided printing is done to have the binding margin direction as a coupling axis. That is, when the binding margin direction agrees with the main scanning direction, double-sided printing is done to have the main scanning direction as a coupling axis; when the binding margin direction agrees with the sub-scanning direction, double-sided printing is done to have the sub-scanning direction as a coupling axis. On the other hand, when the binding margin processing is not designated upon executing the copying or printer function, double-sided printing is done to have the main scanning direction as a coupling axis. Furthermore, upon executing the facsimile function, double-sided printing is done to have the sub-scanning direction as a coupling axis. In this manner, the direction of the axis need not be set every time double-sided printing is done.

Such double-sided printing is executed in accordance with the rotation angle calculated in the portion "rotation angle calculation processing" shown in the flow charts in FIGS. 14 and 15. In the rotation angle calculation processing portion, the rotation. angle for matching the direction of the document with that of image data mapped on the memory is calculated in consideration of different mapping states on the page memory depending on the copying, facsimile, and printer functions. Furthermore, when the sub-scanning direction is used as the coupling axis of double-sided printing, 180° are added to the calculated rotation angle to obtain a final rotation angle.

The rotation angle calculation processing will be explained below with reference to FIG. 48. Rotation angles (rotation angles 1 and 2) for matching the direction of a document with that of image data mapped on the page memory and stapling at the binding margin side are calculated in consideration of different mapping states on the page memory depending on the copying, facsimile, and printer functions (ST282 to ST292). When the second surface is to be printed from then on by double-sided printing (ST294, YES), it is checked based on the job type if the coupling axis of double-sided printing agrees with the main scanning direction or sub-scanning direction (ST296 to ST310). If it is determined that the coupling axis of double-sided printing agrees with the sub-scanning direction (ST310, YES), a final rotation angle is calculated by adding 180° to the rotation angle for matching the direction of the document with that of image data mapped on the page memory (ST312 to ST314). On the other hand, if it is determined that the coupling axis of double-sided printing agrees with the main scanning direction (ST310, NO), the rotation angle for matching the direction of the document with that of image data mapped on the page memory is calculated as a final rotation angle (ST314).

The sixth embodiment of the present invention will be described below. The contents of the sixth embodiment are associated with double-sided document input processing in the copying and facsimile functions.

The image forming apparatus 200 of the present invention can realize input of images on the two surfaces of a document using the ADF 207. The document is read while being reversed in the main scanning direction, in terms of the nature of the mechanism of the ADF 207. Hence, when the coupling axis of a double-sided document agrees with the main scanning direction, the document is set on the platen 212 to have the same document directions on the front surface (first surface) and back surface (second surface).

Upon executing the copying function, it is a common practice to set a double-sided document on the ADF 207 so that its coupling axis agrees with the main scanning direction. However, upon executing the facsimile function, it is a common practice to set a double-sided document on the ADF 207 so that its coupling axis agrees with the sub-scanning direction. In this case, document images on the front and back surfaces have opposite directions on the platen 212.

To solve this problem, in the image forming apparatus of the present invention, when images on the two surfaces of a document are input upon executing the facsimile function, 180° rotation is added to image editing upon inputting an image on the back surface. Such rotation is done in the portion "coding/compression" shown in the flow chart shown in FIG. 13.

The seventh embodiment of the present invention will be described below. The contents of the seventh embodiment are associated with stapling processing in the copying, facsimile, and printer functions.

Figure 49:
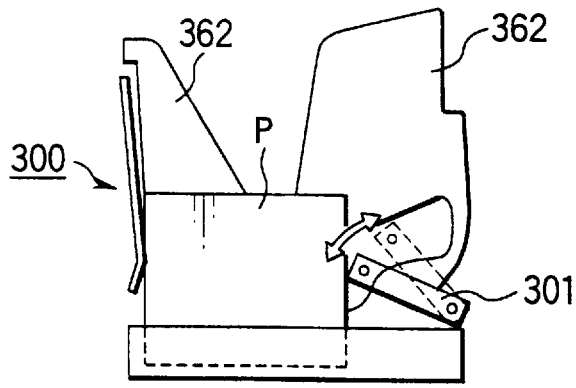
FIG. 49 is a view for explaining stapling by a finisher.
Figure 50:
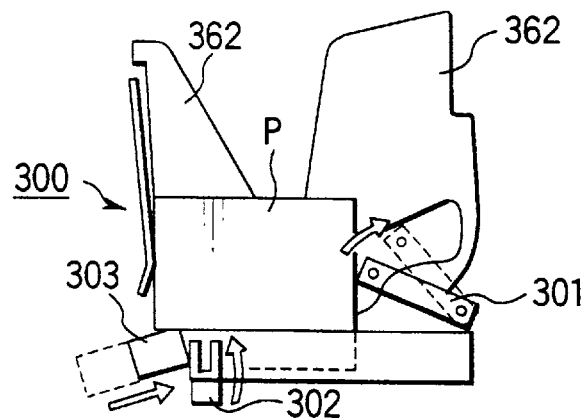
FIG. 50 is a view for explaining stapling by the finisher.
Figure 51:
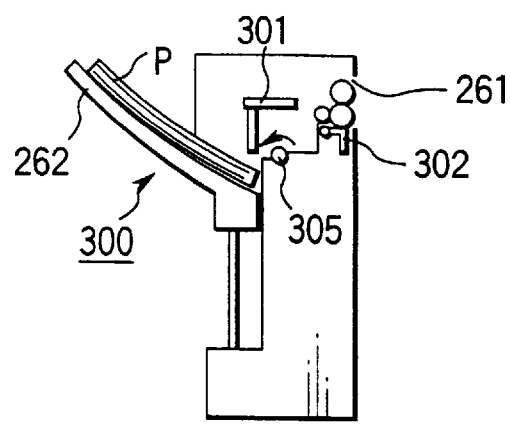
FIG. 51 is a view for explaining stapling by the finisher.

The image forming apparatus of the present invention executes stapling processing using the finisher 300 shown in FIG. 2. The finisher 300 shown in FIG. 2 will be described below with reference to FIGS. 49 to 51. The finisher 300 staples a series of discharged copies in units of sets of sheets, and stocks the stapled sets. As shown in FIG. 49, every time a copy paper sheet P to be stapled is discharged from the discharge port 261, that copy paper sheet P is moved to the side to be stapled by a guide bar 301. Upon completion of discharging, a paper pressing arm 302 presses a bundle (set) of copy paper sheets P, and a stapler unit 303 staples them. Thereafter, the guide bar 301 moves downward to a position indicated by the broken line in FIG. 50, and the stapled copy paper sheets P are discharged onto the discharge tray 362 by a finisher discharge roller 305 in units of sets of sheets. The downward moving amount of the discharge tray 362 is determined to some extent in correspondence with the number of copy paper sheets P to be discharged, and the tray 362 moves downward every time a set of paper sheets are discharged.

In the above description, as an example of the finisher, the stapling position is fixed at the front side in the direction of the image forming apparatus 200. However, a finisher which can be set as an option of the image forming apparatus 200 of the present invention can designate the stapling position at either the front or back side in the direction of the image forming apparatus 200. When both the binding margin processing and stapling processing are designated, the image forming apparatus 200 of the present invention staples sheets at the side of the binding margin. When the stapling processing alone is designated, the apparatus staples sheets at the upper left side of an image.

However, the stapling position is limited. That is, the discharged paper sheets can only be stapled at the front side in the direction of the image forming apparatus 200. For this reason, image data is rotated as needed, and an image is formed on the basis of the rotated image data. With this processing, stapling can be done at an appropriate position.

Figure 48:
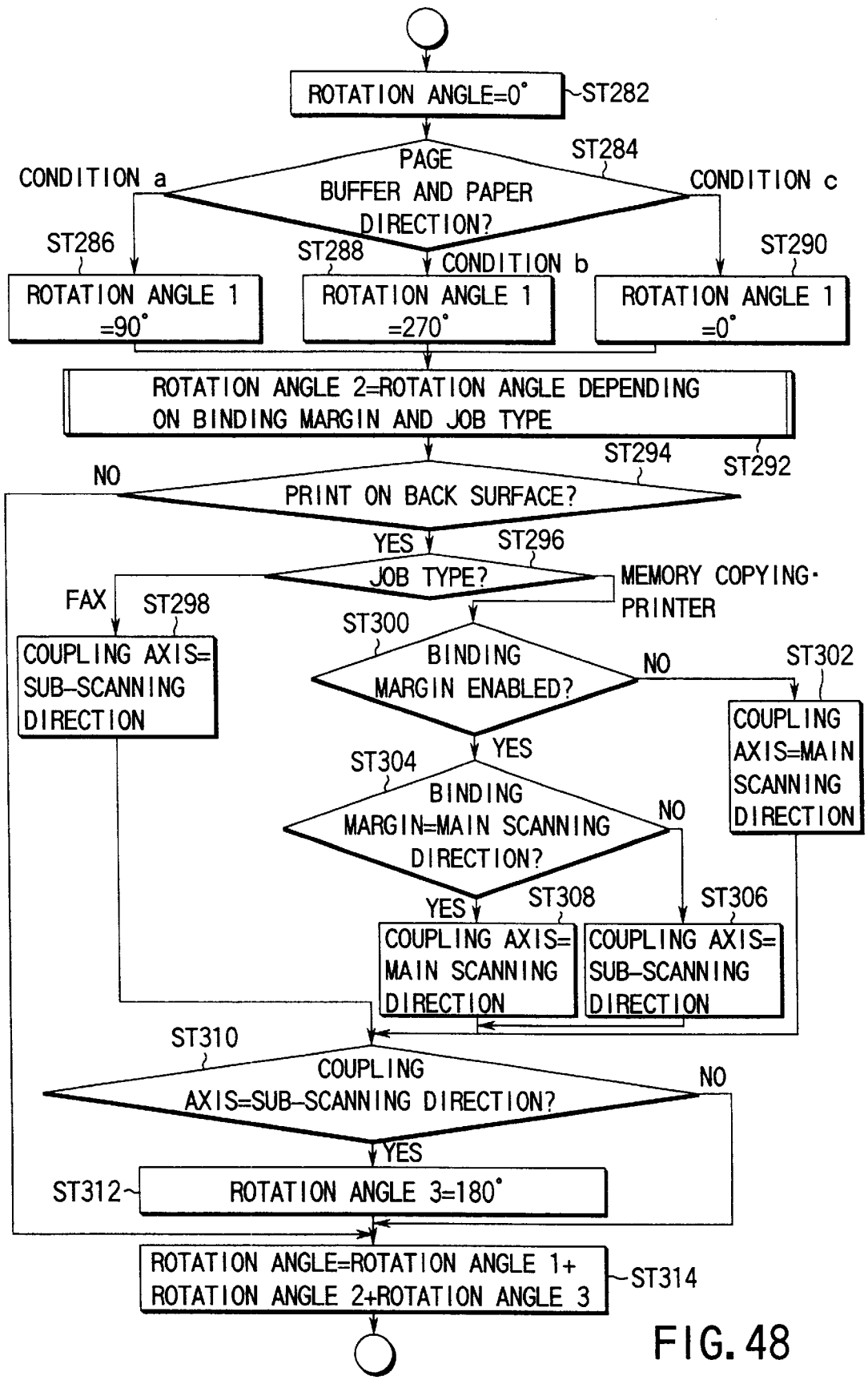
FIG. 48 is a flow chart showing the rotation angle calculation processing in the flow charts shown in FIGS. 14 and 15 in detail.

The rotation processing of image data for the stapling processing is done in the flow chart shown in FIG. 48 in accordance with tables shown in FIGS. 52 and 53. The rotation angle of image data and stapling position are determined in accordance with the table shown in FIG. 52 when the direction of a paper sheet can be changed, or the table shown in FIG. 53 when the direction of a paper sheet cannot be changed. Note that the tables shown in FIGS. 52 and 53 are stored in the NVRAM 34. The upper column in each of the tables shown in FIGS. 52 and 53 indicate the rotation angle of image data and staple position when the stapling position can be set at both the front and back sides of the image forming apparatus 200, and the lower column indicates the rotation angle and staple position when the stapling position cannot be designated. Also, "back 0°" and "back 180°" mean that stapling cannot be normally done when the finisher whose stapling position is fixed at the side of the image forming apparatus 200 is used. Hence, in this case, the stapling processing is canceled, or paper sheets are reversed and discharged facing down using the double-sided printing, and thereafter, stapling is done.

The eighth embodiment of the present invention will be described below. The contents of the eighth embodiment are associated with a measure against an out-of-paper state.

In a conventional copying machine having a copying function alone, when an out-of-paper state has occurred during printing, the following processing is executed. When a rotation printing function is available, printing is done on paper sheets corresponding to rotation printing. On the other hand, when no rotation printing function is available, i.e., when paper sheets corresponding to rotation printing are not obtained, printing is interrupted.

However, in case of an image forming apparatus having a plurality of functions, i.e., a copying function, facsimile function, printer function, and the like, the above-mentioned processing is insufficient. This will be briefly explained below. When facsimile data is received by the facsimile function of the image forming apparatus 200, printing is started on the basis of the received facsimile data. The facsimile data includes image data, and size information of an image forming medium on which the image is to be formed. When image forming media having a size indicated by the received size information (i.e., a paper sheet of the target size) are available, an image based on the received image data is formed on the image forming medium. However, when no image forming medium having a size indicated by the received size information is available, i.e., when an image forming medium having a size indicated by the received size information is used up, different types of processing are executed depending on whether or not all the received image data can be stored. When all the received image data can be stored, the received image data are stored, and printing is not executed. When all the received image data cannot be stored, reception of the facsimile data itself is interrupted.

Figures 54, 55:
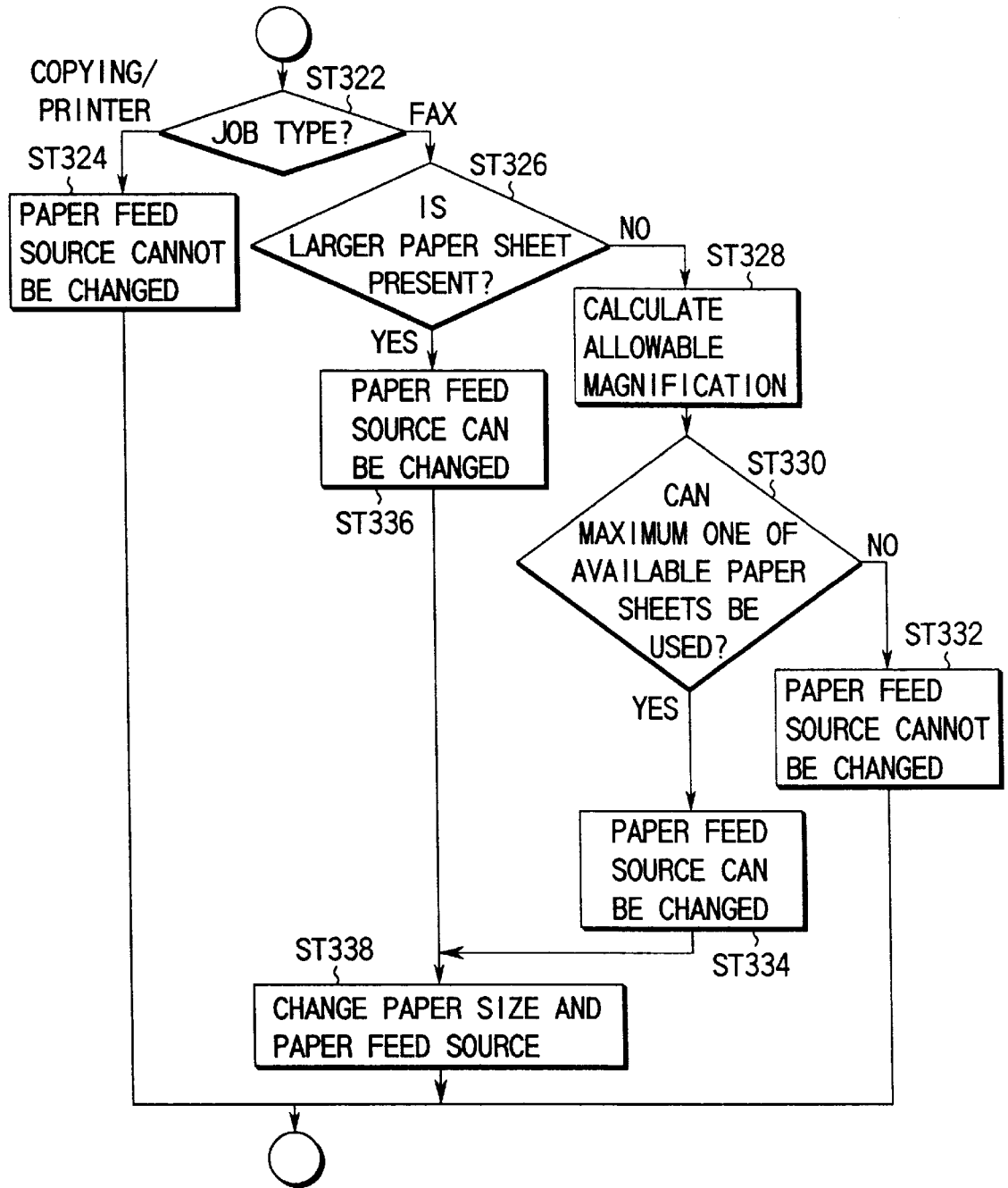
FIG. 54 is a flow chart showing the paper feed source switching determination processing in the flow charts shown in FIGS. 14 and 15 in detail.
FIG. 55 is a table showing the allowable magnification with respect to the resolution of image data received by the facsimile function.

Under this circumstance, in the image forming apparatus of the present invention, when paper sheets of a target size are used up, printing continues on other paper sheets as long as such paper sheets are available. The processing for continuing printing using other paper sheets when paper sheets of a target size are used up will be explained below with reference to the flow chart shown in FIG. 54. Note that processing shown in the flow chart of FIG. 54 is executed by the main CPU 30.

When copying is to be executed by the copying function of the image forming apparatus 200, image data to be copied is acquired by the scanner 50. The size information of an image forming medium on which an image based on the image data of an object to be copied is to be formed is acquired from the main CPU 30.

When facsimile reception printing is to be executed by the facsimile function of the image forming apparatus 200, facsimile data is received by the FAXC 58. The facsimile data includes image data, and the size information of the image forming medium on which an image based on this image data is to be formed.

When the printout is to be executed by the printer function of the image forming apparatus 200, print data is received by the SCSI 56. The print data includes image data, and the size information of the image forming medium on which the image based on this image data is to be formed.

The main CPU 30 determines whether a paper sheet having the target size runs out. When the paper sheet having the target size runs out, printing is switched between execution of the copying or printer function and execution of the facsimile function. This switching is performed by the main CPU 30.

If the job type indicates a copying job by the copying function or print job by the printer function (ST322, copying/printer), it is determined that the paper feed source cannot be changed (ST324). In this case, when paper sheets of the target size are used up, printing is interrupted.

On the other hand, if the job type indicates a FAX job by the facsimile function (ST322, FAX), the branch differs depending on whether paper sheets having a larger than the target size are available. If paper sheets having a size larger than the target size are available (ST326, YES), it is determined that the paper feed source can be changed (ST336). When paper sheets of the target size are used up, the paper feed source is switched to that of paper sheets having a size larger than the target size (ST338). Thereafter, images based on the received image data are printed on paper sheets fed from the switched paper feed source, i.e., paper sheets having a size larger than the target size.

If paper sheets having a size larger than the target size are not available (ST326, NO), the processing branches depending on whether or not paper sheets having a size smaller than the target size are available. If paper sheets having a size smaller than the target size are not available, it is determined that the paper feed source cannot be switched. In this case, when paper sheets of the target size are used up, printing is interrupted. On the other hand, if paper sheets having a size smaller than the target size are available (ST326, NO), it is determined that the paper feed source can be switched. When paper sheets of the target size are used up, the paper feed source is switched to that of paper sheets having a size smaller than the target size. Thereafter, images based on the received image data are printed on paper sheets fed from the switched paper feed source, i.e., paper sheets having a size smaller than the target size.

When paper sheets having a size smaller than the target size are available (ST326, NO), the processing may branch as follows. That is, the allowable variable magnification is calculated using a table showing the relationship between the resolution and allowable variable magnification shown in FIG. 55 (ST328). If an image can be printed on a paper sheet having a size smaller than the target size by reducing the image in accordance with the allowable variable magnification (ST330, YES), it is determined that the paper feed source can be switched (ST334). In this case, an image based on the received image data is printed on a paper sheet fed from the switched paper feed source, i.e., a paper sheet having a size smaller than the target size. On the other hand, if an image cannot be printed on a paper sheet having a size smaller than the target size by reducing the image in accordance with the allowable variable magnification (ST330, NO), it is determined that the paper feed source cannot be switched (ST332). In this case, when paper sheets of the target size are used up, printing is interrupted.

The effects of the first to eighth embodiments described above will be summarized below.

According to the first embodiment, the print order (ascending or descending) is determined in correspondence with the job types such as the copying function, facsimile function, printer function, and the like, and the discharge method (face-up or face-down) is determined in correspondence with the determined print order. For this reason, image forming processing can be done without impairing the features of the copying, facsimile, and printer functions. Furthermore, since the print order is switched in correspondence with the remaining storage capacity of a storage device that stores image data, errors caused by memory-full states can be avoided.

According to the second to seventh embodiments, the direction of image data to be mapped on the page memory is determined on the basis of the feature upon acquiring image data, which differs depending on the job types such as the copying function, facsimile function, printer function, and the like. For this reason, various kinds of processing (cornering processing, reduction coupling processing, standard-size division processing, binding margin processing, double-sided print processing, double-sided document input processing, stapling processing) can be accurately executed in consideration of different mapping states of image data depending on the functions.

According to the second embodiment, processing is executed paying attention to the fact that some of the job types such as the copying function, facsimile function, printer function, and the like place an importance on the image mapping position, and others place an importance on other faces (communication time and the like). For example, upon executing the facsimile function, centering processing and cornering processing are locally canceled in the sub-scanning direction, thus removing any wasteful communication time.

When both the centering or cornering processing and binding margin processing are designated, a function of canceling the centering and cornering processing in a direction perpendicular to the binding margin is provided, thereby minimizing image data lost by the binding margin processing.

According to the third embodiment, when the reduction coupling processing is designated upon executing the facsimile function, if image data having a resolution lower than a predetermined resolution is received, the reduction coupling processing is disabled. In this manner, the reduction coupling processing as a result of which the contents of a document received by the facsimile function cannot be confirmed can be avoided.

According to the fifth embodiment, when the binding margin is designated in the double-sided print processing by the copying and printer functions, the coupling axis of images formed on the first surface (front surface) and second surface (back surface) of a paper sheet is determined in the binding margin direction. When no binding margin is designated in the double-sided print processing by the copying and printer functions, the coupling axis of images formed on the first and second surfaces of a paper sheet is determined in the main scanning direction. In the double-sided print processing by the facsimile function, the coupling axis of images formed on the first and second surfaces of a paper sheet is determined in the sub-scanning direction. In this manner, the user can execute double-sided printing irrespective of the job types.

According to the sixth embodiment, upon inputting images on the two surfaces of a document by the copying function, input image data are rotated by an angle required in editing and are filed. Upon inputting images on the two surfaces of a document by the facsimile function, input image data corresponding to the first surface of a document is rotated by an angle required in editing and is filed, and input image data corresponding to the second surface is rotated by a sum of the angle required in editing and 180° and is filed. In this manner, image data can be filed while adjusting their directions, and printing can be done independently of information indicating a single- or double-sided document upon executing the copying function. Upon executing the facsimile function, print results with adjusted image directions can be obtained even when the receiver is not informed of information indicating a single- or double-sided document.

According to the seventh embodiment, when two different options, i.e., a finisher which can change the stapling position and one which cannot change it, are available, stapling can be done by sufficiently using the features of the individual finishers.

According to the eighth embodiment, when paper sheets of the target size are used up, an optimal measure is taken in correspondence with the job types, i.e., the copying function, facsimile function, printer function, and the like.

As described above, according to the present invention, an image forming apparatus which can solve problems posed due to the presence of a plurality of functions, and can fully use the individual functions an be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An image forming apparatus having at least one of a copying and printer functions, and a facsimile function, comprising:

means for inputting image data and size information of an image forming medium on which an image based on the image data is to be formed;

means for accommodating image forming media having different sizes, respectively;

means for forming an image, based on the image data input from said input means, on each of the image forming media accommodated in said accommodation means;

means for detecting sizes of image forming media stored in said accommodation means; and means for switching, on the basis of a detection result of said detection means, between an image forming operation of said image forming means in the facsimile function and an image forming operation of said image forming means in the copying or printer function;

wherein said switching means comprises:

control means for, when the detection result of said detection means indicates that an image forming medium of a target size is not accommodated in said accommodation means, interrupting the image forming operation of said image forming means in the copying or printer function and continuing the image forming operation of said image forming means in the facsimile function by using an image forming medium having a size different from the target size, wherein said control means comprises:

first control means for continuing the image forming operation of said image forming means in the facsimile function by using a first image forming medium as a medium on which an image is to be formed when the detection result of said detection means indicates that the image forming medium having the target size is not accommodated in said accommodation means, and the first image forming medium larger than that of the target size is accommodated in said accommodation means; and second control means for continuing the image forming operation of said image forming means in the facsimile function by using a second image forming medium as a medium on which an image is to be formed when the detection result of said detection means indicates that the image forming medium having the target size and the first image forming medium are not accommodated in said accommodation means, and the second image forming medium smaller than that of the target size is accommodated in said accommodation means.

2. An apparatus according to claim 1, wherein said second control means comprises:

third control means for reducing an image based on the image data having a resolution higher than a predetermined resolution and input from said input means, and continuing the image forming operation using the second image forming medium as a medium on which an image is to be formed.

3. An image forming apparatus, which has at least one of copying, printer, and facsimile functions, and forms an image on an image forming medium having first and second surfaces, comprising:

means for acquiring first image data corresponding to a first page and second image data corresponding to a second page which follows the first page to provide the first and second image data;

means for storing the first and second image data;

means for forming an image of the first page based on the first image data on a first surface of a first image forming medium to provide a first image-bearing medium on the first surface of which the image is formed, and forming an image of the second page based on the second image data on a first surface of a second image forming medium to provide a second image-bearing medium on the first surface of which the image is formed; and means for arranging the first and second image bearing media to overlap each other so that a second surface of the first image-bearing medium faces the first surface of the second image-bearing medium when one of the copying function, the facsimile function, and the printer function is selected and image formation is executed by said image forming means, wherein said acquisition means includes:

first acquisition means for acquiring the second image data after the first image data to provide the second image data after the first image data; and second acquisition means for acquiring the first image data after the second image data to provide the first image data after the second image data;

wherein said acquisition means includes:

first acquisition means for acquiring the second image data after the first image data via a communication channel to provide the second image data after the first image data in order to execute the facsimile or printer function; and second acquisition means for optically reading a plurality of document images and acquiring the first image data after the second image data to provide the first image data after the second image data in order to execute the copying function;

wherein said image forming means includes:

first image forming means for forming the image of the first page based on the first image data on a first surface of a first image forming medium to provide a first image-bearing medium on the first surface of which the image is formed, and thereafter, forming the image of the second page based on the second image data on a first surface of a second image forming medium to provide a second image forming medium on the first surface of which the image is formed; and second image forming means for forming the image of the second page based on the second image data on a first surface of a first image forming medium to provide a first image-bearing medium on the first surface of which the image is formed, and thereafter, forming the image of the first page based on the first image data on a first surface of a second image forming medium to provide a second image-bearing medium on the first surface of which the image is formed.

4. An apparatus according to claim 3, wherein said arranging means includes:

means for reversing the first and second image-bearing media provided from said first image forming means to provide first and second reversed media;

first discharge means for discharging the second reversed medium to be stacked on the first reversed medium; and second discharge means for discharging the second image-bearing medium provided from said second image-forming means, to be stacked on the first image-bearing medium provided from said second image forming means.

5. An apparatus according to claim 3, wherein said image forming means includes:

control means for, when the first and second image data provided from said first acquisition means can be stored in said storage means, controlling said second image forming means to form an image, for, when the first and second image data cannot be stored in said storage means, controlling said first image forming means to form an image, and for, when images are formed on the basis of the first and second image data provided from said second acquisition means, controlling said second image forming means to form an image.

6. An image forming apparatus, which has at least one of copying, printer, and facsimile functions, and forms images on first and second surfaces of an image forming medium having the first and second surfaces, comprising:

means for acquiring first image data corresponding to a first page, second image data corresponding to a second page that follows the first page, third image data corresponding to a third page that follows the second page, and fourth image data corresponding to a fourth page that follows the third page to provide the first, second, third, and fourth image data;

means for storing the first, second, third, and fourth image data, means for forming an image of the first page based on the first image data on a first surface of a first image forming medium and forming an image of the second page based on the second image data on a second surface of the first image forming medium to provide a first image-bearing medium on the first and second surfaces of which the images are formed, and for forming an image of the third image based on the third image data on a first surface of a second image forming medium and forming an image of the fourth page based on the fourth image data on a second surface of the second image forming medium to provide a second image-bearing medium on the first and second surfaces of which the images are formed; and means for arranging the first and second image-bearing media to overlap each other so that the second surface of the first image-bearing medium faces the first surface of the second image-bearing medium, wherein said acquisition means includes:

first acquisition means for acquiring the second, third, and fourth image data in turn after the first image data to provide the second, third, and fourth image data in turn after the first image data in order to execute the facsimile or printer function; and second acquisition means for acquiring the third, second, and first image data in turn after the fourth image data to provide the third, second, and first image data in turn after the fourth image data in order to execute the copying function, wherein said image forming means includes:

first image forming means for forming the image of the first page based on the first image data on a first surface of a first image forming medium, reversing the first image forming medium, and forming the image of the second page based on the second image data on a second surface of the first image forming medium to provide a first image-bearing medium on the first and second surfaces of which the images are formed, and for, thereafter, forming the image of the third page based on the third image data on a first surface of a second image forming medium, reversing the second image forming medium, and forming the image of the fourth page based on the fourth image data on a second surface of the second image forming medium to provide a second image-bearing medium on the first and second surfaces of which the images are formed; and second image forming means for forming the image of the fourth page based on the fourth image data on a first surface of a first image forming medium, reversing the first image forming medium, and forming the image of the third page based on the third image data on a second surface of the first image forming medium to provide a first image-bearing medium on the first and second surfaces of which the images are formed, and for, thereafter, forming the image of the second page based on the second image data on a first surface of a second image forming medium, reversing the second image forming medium, and forming the image of the first page based on the first image data on a second surface of the second image forming medium to provide a second image-bearing medium on the first and second surfaces of which the images are formed.

7. An apparatus according to claim 6, wherein said arranging means includes:

means for reversing the first and second image-bearing media provided from said second image forming means to provide first and second reversed media;

first discharge means for discharging the second reversed medium to be stacked on the first reversed medium; and second discharge means for discharging the second image-bearing medium provided from said first image forming means to be stacked on the first image-bearing medium provided from said first image forming means.

8. An apparatus according to claim 6, wherein said image forming means includes:

control means for, when the first, second, third, and fourth image data provided from said first acquisition means can be stored in said storage means, controlling said second image forming means to form an image, for, when the first, second, third, and fourth image data provided from said first acquisition means cannot be stored in said storage means, controlling said first image forming means to form an image, and for, when images are formed on the basis of the first, second, third, and fourth image data provided from said second acquisition means, controlling said second image forming means to form an image.

9. An image forming apparatus having at least one of a copying function of acquiring image data to be copied and forming an image based on the image data to be copied, a facsimile function of acquiring facsimile image data via a communication channel and forming an image on the basis of the facsimile image data, and a printer function of acquiring image data to be printed via a communication channel and forming an image on the basis of the image data to be printed, comprising:

means for acquiring image to provide the acquired image data;

means for storing the image data;

means for processing the image data stored in said storage means on the basis of a feature upon acquiring image data, which feature differs depending on the functions, to provide processed image data; and means for forming an image on the basis of the processed imaged;

wherein said storage means includes:

means for designating a predetermined corner so as to position the image based on said image data in one of upper-right, lower-right, upper-left and lower left corners of the image forming medium;

means for, when one of the upper-right, lower-right, upper-left and lower-left corners is designated by the designating means to position the image data acquired by said copying function, designating the corner designated by the designating means on said image data storage area; when one of the upper-right, lower-right, upper-left and lower-left corners is designated by the designating means to position the image data acquired by said facsimile function, converting the designed corner to a corresponding one of lower-right, lower-left, upper-right and upper-left corners, and designating the convened corner on said image data storage area;

when one of the upper-right, lower-right, upper-left and lower-left corners is designated by the designating means to position the image data in landscape orientation which has been acquired by said printer function, designating the corner designated by the designating means on said image data storage area; and when one of the upper-right, lower-right, upper-left and lower-left corners is designated by the designating means for the image data in portrait orientation which has been acquired by said printer function, converting the designated corner to a corresponding one of the lower-right, lower-left, upper-right, and upper-left corners, and designating the converted corner on said image data storage area; and means for mapping the image data by positioning the image data in the corner designated onto the image data storage area and providing the mapped image data; and said image forming means includes:

means for forming an image on the basis of the mapped image data.

10. An image forming apparatus having at least one of a copying function of acquiring image data to be copied and forming an image based on the image data to be copied, a facsimile function of acquiring facsimile image data via a communication channel and forming an image on the basis of the facsimile image data, and a printer function of acquiring image data to be printed via a communication channel and forming an image on the basis of the image data to be printed, comprising:

means for acquiring image data to provide the acquired image data;

means for storing the image data;

means for processing the image data stored in said storage means on the basis of a feature upon acquiring image data, which feature differs depending on the functions, to provide processed image data; and means for forming an image on the basis of the processed image data; and means for controlling an image forming operation by controlling an order to image formation by said image forming means on the basis of a characteristic of each of the functions, wherein the image data is acquired in a descending order by said copying function, in an ascending order by said facsimile function, and in either one of the ascending and descending directions by said printer function, and also by controlling an image forming medium to be discharged face up when forming the image in the descending order and to be discharged face down when forming the image in the ascending order, wherein said storage means includes:
an image data storage area on which the image data is mapped, said processing means includes:
means for designating a predetermined area on an image forming medium so as to form an image while leaving a blank on the predetermined area on the image forming medium;
means for converting the predetermined area on the image forming medium designated by said designation means to a predetermined area on said image data storage area on the basis of a feature upon acquiring the image data, which feature differs depending on the functions; and
means for mapping the image data on an area other than the predetermined area on said image data storage area, which area is converted by said conversion means, to provide mapped image data, and said image forming means includes:
means for forming an image on the basis of the mapped image data.

11. An apparatus according to claim 10, wherein said storage means includes:
an data storage area on which the image data is mapped,
said processing means includes:
first designation means for designating a predetermined corner on an image forming medium so as to form an image based on the image data to be offset to the predetermined corner on the image forming medium;
first conversion means for converting the predetermined corner on the image forming medium designated by said first designation means to a predetermined corner on said image data storage area on the basis of a feature upon acquiring the image data, which feature differs depending on the functions;
first mapping means for mapping the image data to be offset to the predetermined corner on said image data storage area, which corner is converted by said first conversion means, to provide first mapped image data;
second designation means for designating a predetermined area on an image forming medium so as to form an image while leaving a blank as a binding margin on the predetermined area on the image forming medium;
second conversion means for converting the predetermined area on the image forming medium designated by said second designation means to a predetermined area on said image data storage area on the basis of a feature upon acquiring the image data, which feature differs depending on the functions;
second mapping means for mapping the image data on an area other than the predetermined area on said image data storage area, which area is converted by said second conversion means, to provide second mapped image data, and
third designation means for designating centering to form an image based on the image data on an image forming medium while centering the image; and
third mapping means for centering and mapping the image data on said image data storage area in accordance with the centering designated by said third designation means to provide third mapped image data, and said image forming means includes:
first image forming means for forming an image on the basis of the first mapped image data;
second image forming means for forming an image on the basis of the second mapped image data; and
third image forming means for forming an image on the basis of the third mapped image data.

12. An apparatus according to claim 11, further comprising:
control means for, when both the predetermined corner and predetermined area are designated by said first and second designation means, and the predetermined corner designated by said first designation means is included in the predetermined area designated by said second designation means, disabling designation of the predetermined corner by said first designation means.

13. An apparatus according to claim 11, further comprising:
control means for, when both the centering and the predetermined area are designated by said third and second designation means, disabling the centering in a direction of the predetermined area designated by said second designation means.

14. An image forming apparatus having at least one of a copying function of acquiring image data to be copied and forming an image based on the image data to be copied, a facsimile function of acquiring facsimile image data via a communication channel and forming an image on the basis of the facsimile image data, and a printer function of acquiring image data to be printed via a communication channel and forming an image on the basis of the image data to be printed, comprising:

means for acquiring image data to provide the acquired image data;

means for storing the image data;

means for processing the image data stored in said storage means on the basis of a feature upon acquiring image data, which feature differs depending on the functions, to provide processed image data, and means for forming an image on the basis of the processed image data;

wherein said storage means includes:

means for acquiring image data defined by a main scanning direction and sub-scanning direction to provide the acquired image data, said processing means includes:

means for, when images are formed on the basis of the image data on first and second surfaces of the image forming medium, determining either one of the main scanning direction and sub-scanning direction as a coupling axis for coupling the images formed on the first and second surfaces, on the basis of a characteristic of each of the functions where by use of the copying function, the image forming medium is inverted around an axis extending in the main scanning direction which corresponds to a longitudinal direction of the images and, by use of the facsimile function, the image forming medium is inverted around an axis extending in the main scanning direction which corresponds to a widthwise direction of the images; and means for mapping the image data to be formed on the first and second surfaces of the image forming medium so that the images to be formed on the first and second surfaces are coupled via the coupling axis in the main scanning direction or sub-scanning direction determined by said determination means, to provide mapped image data, and said image forming means includes:

means for forming an image on the basis of the mapped image data.

15. An image forming apparatus having at least one of a copying function of acquiring image data to be copied and forming an image based on the image data to be copied, a facsimile function of acquiring facsimile image data via a communication channel and forming an image on the basis of the facsimile image data, and a printer function of acquiring image data to be printed via a communication channel and forming an image on the basis of the image data to be printed, comprising:

means for acquiring image data to provide the acquired image data;

means for storing the image data;

means for processing the image data stored in said storage means on the basis of a feature upon acquiring image data, which feature differs depending on the functions, to provide processed image data; and means for forming an image on the basis of the processed image data;

wherein said storage means includes:

means for acquiring image data defined by a main scanning direction and sub-scanning direction to provide the acquired image data, said processing means includes:

means for, when images based on the image data are formed on first and second surfaces of an image forming medium on which a binding margin is designated, determining a coupling axis of the images to be formed on the first and second surfaces in a direction of the binding margin; and means for mapping the image data to be formed on the first and second surfaces of the image forming medium so that the images to be formed on the first and second surfaces are coupled via the coupling axis in the direction of the binding margin determined by said determination means, to provide mapped image data, and said image forming means includes:

means for forming an image on the basis of the mapped image data.

16. An image forming apparatus having at least one of a copying function of acquiring image data to be copied and forming an image based on the image data to be copied, a facsimile function of acquiring facsimile image data via a communication channel and forming an image on the basis of the facsimile image data, and a printer function of acquiring image data to be printed via a communication channel and forming an image on the basis of the image data to be printed, comprising:

means for acquiring image data to provide the acquired image data;

means for storing the image data;

means for processing the image data stored in said storage means on the basis of a feature upon acquiring image data, which feature differs depending on the functions, to provide processed image data; and means for forming an image on the basis of the processed image data;

wherein said storage means includes:

means for acquiring image data defined by a main scanning direction and sub-scanning direction to provide the acquired image data, said processing mans includes:

means for, when images based on the image data acquired by the copying and printer functions are to be formed on first and second surfaces of an image forming medium, determining a coupling axis of the images to be formed on the first and second surfaces in a main scanning direction, and for, when images based on the image data acquired by the facsimile function are to be formed on first and second surfaces of an image forming medium, determining a coupling axis of the images to be formed on the first and second surfaces in a sub-scanning direction; and means for mapping the image data to be formed on the first and second surfaces of the image forming medium so that the images to be formed on the first and second surfaces are coupled via the coupling axis in the main scanning direction or sub-scanning direction determined by said determination means, to provide mapped image data, and said image forming means includes:

means for forming an image on the basis of the mapped image data.

17. An image forming apparatus having at least one of a copying function of acquiring image data to be copied and forming an image based on the image data to be copied, a facimile function of acquiring facsimile image data via a communication channel and forming an image on the basis of the facsimile image data, and a printer function of acquiring image data to be printed via a communication channel and forming an image on the basis of the image data to be printed, comprising:

means for acquiring image data to provide the acquired image data;

means for storing the image data;

means for processing the image data stored in said storage means on the basis of a feature upon acquiring image data, which feature differs depending on the functions, to provide processed image data; and means for forming an image on the basis of the processed image data;

wherein:

said storage means includes:
an image data storage area constituted of a plurality of divisions, said processing means includes:
means for storing first allocation data that is used for the copying function to indicate which division of the image data storage area the image data corresponding to one page is allocated to, when the image data acquired by the copying function and corresponding to a plurality of pages is reduced so as to form an image on a single image forming medium; second allocation data that is used for the facsimile function to indicate which division of the image data storage area the image data corresponding to one page is allocated to, when the image data acquired by the facsimile function and corresponding to a plurality of pages is reduced; third allocation data that is used for the printer function to indicate which division of the image data storage area the image data corresponding to one page is allocated to, when the image data acquired by the printer function and corresponding to a plurality of pages in landscape orientation is reduced; and fourth allocation data that is used for the printer function to indicate which division of the image data storage area the image data corresponding to one page is allocated to, when the image data acquired by the printer f action and corresponding to a plurality of pages in portrait orientation is reduced; and means for reducing the image data corresponding to said plurality of pages in accordance with the allocation data stored in the allocation data storing means, mapping the reduced image data onto the image data storage area, and providing the mapped image data, and said image forming means includes:
means for forming the image based on the mapped image data on the single image forming medium.

18. An apparatus according to claim 17, further comprising:

control means for, when image formation is done by the facsimile function and a resolution of facsimile image data is lower than a predetermined resolution, inhibiting processing for forming an image corresponding to image data for a plurality of pages on a single image forming medium.

19. An image forming apparatus having at least one of a copying function of acquiring image data to be copied and forming an image based on the image data to be copied, a facsimile function of acquiring facsimile image data via a communication channel and forming an image on the basis of the facsimile image data, and a printer function of acquiring image data to be printed via a communication channel and forming an image on the basis of the image data to be printed, comprising:

means for acquiring image data to provide the acquired image data;

means for storing the image data;

means for processing the image data stored in said storage means on the basis of a feature upon acquiring image data, which feature differs depending on the functions, to provide processed image data; and means for forming an image on the basis of the processed image data;

wherein:

said storage means includes:
an image data storage area constituted of two divisions, said processing means includes:
means for storing first allocation data that is used for the copying function to indicate which division of the image data storage area the image data corresponding to each of two pages is allocated to, when the image data acquired by the copying function and corresponding to two pages is reduced so as to form an image on a single image forming medium; second allocation data that is used for the facsimile function to indicate which division of the image data storage area the image data corresponding to each of two pages is allocated to, when the image data acquired by the facsimile function and corresponding to two pages is reduced; third allocation data that is used for the printer function to indicate which division of the image data storage area the image data corresponding to each of two pages is allocated to, when the image data acquired by the printer function and corresponding to two pages in landscape orientation is reduced; and fourth allocation data that is used for the printer function to indicate which division of the image data storage area the image data corresponding to each of two pages is allocated to, when the image data acquired by the printer function and corresponding to two pages in portrait orientation is reduced; and means for reducing the image data corresponding to said two pages in accordance with the allocation data stored in the allocation data storing means, mapping the reduced image data onto the image data storage area, and providing the mapped image data, and said image forming means includes:
means for forming the image based on the mapped image data on he single image forming medium.

20. An image forming apparatus having at least one of a copying function of acquiring image data to be copied and forming an image based on the image data to be copied, a facsimile function of acquiring facsimile image data via a communication channel and forming am image on the basis of the facsimile image data, and a printer function of acquiring image data to be printed via a communication channel and forming an image on the basis of the image data to be printed, comprising:

means for acquiring image data to provide the acquired image data;

means for storing the image data;

means for processing the image data stored in said storage means on the basis of a feature upon acquiring image data, which feature differs depending on the functions, to provide processed image data; and means for forming an image on the basis of the processed image data;

wherein:

said storage means includes:
an image data storage area constituted of four divisions, said processing means includes:
means for storing first allocation data that is used for the copying function to indicate which division of the image data storage area the image data corresponding to each of four pages is allocated to, when the image data acquired by the copying function and corresponding to four pages is reduced so as to form an image on a single image forming medium; second allocation data that is used for the facsimile inaction to indicate which division of the image data storage area the image data corresponding to each of four pages is allocated to, when the image data acquired by the facsimile function and corresponding to four pages is reduced; third allocation data that is used for the printer function to indicate which division of the image data storage area the image data corresponding to each of four pages is allocated to, when the image data acquired by the printer function and corresponding to four pages in landscape orientation is reduced; and fourth allocation data that is used for the printer function to indicate which division of the image data storage area the image data corresponding to each of four pages is allocated to, when the image data acquired by the printer function and corresponding to four pages in portrait orientation is reduced; and means for reducing the image data corresponding to said four pages in accordance with the allocation data stored in the allocation data storing means, mapping the reduced image data onto the image data storage area, and providing the mapped image data, and said image forming means includes:
    means for forming the image based on the mapped image data on the single image forming medium.

21. An image forming apparatus having at least one of a copying function of acquiring image data to be copied and forming an image based on the image data to be copied, a facsimile function of acquiring facsimile image data via a communication channel and forming an image on the basis of the facsimile image data, and a printer function of acquiring image data to be printed via a communication channel and forming an image on the basis of the image data to be printed, comprising:

means for acquiring image data to provide the acquired image data;
    means for storing the image data;
    means for processing the image data stored in said storage means on the basis of a feature upon acquiring image data, which feature differs depending on the functions, to provide processed image data; and
    means for forming an image on the basis of the processed image data;

wherein:
said storage means includes:
    an image data storage area onto which the image data is mapped,
said processing means includes:
    means for storing first mapping order data that is used for the copying function to indicate in what order a plurality of image data items for a corresponding number of pages are mapped onto the image data storage area, when the image data acquired by the copying function and corresponding to one page is divided into said plurality of image data items so as to form images on a corresponding number of image forming mediums; second mapping order data that is used for the facsimile function to indicated in what order a plurality of image data items for a corresponding number of pages are mapped onto the image data storage area, when the image data acquired by the facsimile function and corresponding to one page is divided into said plurality of image data items; third mapping order data that is used for the printer function to indicate in what order a plurality of image data items for a corresponding number of pages are mapped onto the image data storage area, when the image data acquired by the printer function and corresponding to one page in landscape orientation is divided into said plurality of image data items; and fourth mapping order that is used for the printer function to indicate in what order a plurality of image data items for a corresponding number of pages are mapped onto the image data storage area, when the image data acquired by the printer function and corresponding to one page in portrait orientation is divided into said plurality of image data items; and
    means for dividing the image data corresponding to said one page into said plurality of image data items an the basis of the mapping order data stored in the mapping order data storing means, mapping each of the divided image data items onto the image data storage area, and proving the mapped image data, and said image forming means includes:
    means for forming the images based on the mapped image data on the corresponding number of image forming mediums.

22. An image forming apparatus having at least one of a copying function of acquiring image data to be copied and forming an image based on the image data be copied, a facsimile function of acquiring facsimile image data via a communication channel and forming an image on the basis of the facsimile image data, and a printer function of acquiring image data to be printed via a communication channel and forming an image on the basis of the image data to be printed, comprising:

means for acquiring image data to provide the acquired image data;
    means for storing the image data;
    means for processing the image data stored in said storage means on the basis of a feature upon acquiring image data, which feature differs depending on the functions, to provide processed image data; and
    means for forming an image on the basis of the processed image data;

wherein:
said storage means includes:
    an image data storage area onto which the image data is mapped,
said processing means includes:
    means for storing first mapping order data that is used for the copying function to indicate in what order two image data items corresponding to two pages are mapped onto the image data storage area, when the image data acquired by the copying function and corresponding to one page is divided into said two image data items so as to form images on two image forming mediums; second mapping order data that is used for the facsimile function to indicate in what order two image data items corresponding to two pages are mapped onto the image data storage area, when the image data acquired by the facsimile function and corresponding to one page is divided into said two image data items; third mapping order data that is used for the printer function to indicate in what order two image data items corresponding to two pages are mapped onto the image data storage area, when the image data acquirer by the printer function and corresponding to one page in landscape orientation is divided into said two image data items; and fourth mapping order data that is used for the printer function to indicate in what order two image data items corresponding to two pages are mapped onto the image data storage area, when the image data acquired by the printer function and corresponding to one page in portrait orientation is divided into said two image data items; and means for dividing the image data corresponding to said one page into said two image data items on the basis of the mapping order data stored in the mapping order data storing means, mapping each of the divided image data items onto the image data storage area, and proving the mapped image data, and said image forming means includes:
 means for forming the images based on the mapped image data on said two image forming mediums.

23. An image forming apparatus having at least one of a copying function of acquiring image data to be copied and forming an image based on the image data to be copied, a facsimile function of acquiring facsimile image data via a communication channel and forming an image on the basis of the facsimile image data, and a printer function of acquiring image data to be printed via a communication channel and forming an image on the basis of the image data to be printed, comprising:

means for acquiring image data to provide the acquired image data;

means for storing the image data;

means for processing the image data stored in said storage means on the basis of a feature upon acquiring image data, which feature differs depending on the functions, to provide processed image data; and means for forming an image on the basis of the processed image data;

wherein:

said storage means includes:
 an image data storage area onto which the image data is mapped, said processing means includes:
 means for storing first mapping order data that is used for the copying function to indicate in what order four image data items corresponding to four pages are mapped onto the image data storage area, when the image data acquired by the copying function and corresponding to one page is divided into said four image data items so as to form images on four image forming mediums; second mapping order data that is used for the facsimile function to indicate in what order four image data items corresponding to four pages are mapped onto the image data storage area, when the image data acquired by the facsimile function and corresponding to one page is divided into said four image data items; third mapping order data that is used for the printer function to indicate in what order four image data items corresponding to four pages are mapped onto the image data storage area, when the image data acquired by the printer function and corresponding to one page in landscape orientation is divided into said four image data items; and fourth mapping order data that is used for the printer function to indicate in what order four image data items corresponding to four pages are mapped onto the image data storage area, when the image data acquired by the printer function and corresponding to one page in portrait orientation is divided into said four image data items; and means for dividing the image data corresponding to said one page into said four image data items on the basis of the mapping order data stored in the mapping order data storing means, mapping each of the divided image data items onto the image data storage area, and proving the napped image data, and said image forming means includes:
 means for forming the images based on the mapped image data on said four image forming mediums.

24. An image forming apparatus having at least one of a copying function of acquiring image data to be copied and forming an image based on the data to be copied, a facsimile function of acquiring facsimile image data via a communication channel and forming an image on the basis of the facsimile image data, and a printer function of acquiring image data to be printed via a communication channel and forming an image on the basis of the image data to be printed, comprising:

means for acquiring image data to provide the acquired image data;

means for storing the image data;

means for processing the image data stored in said storage means on the basis of a features upon acquiring image data, which feature differs depending on the function, to provide processed image data; and means for forming an image on the basis of the processed image data;

wherein:

said processing means includes:
 means for, when images are formed on first and second surfaces of the image forming medium on the basis of the image data, calculating a rotation angle for rotating the image data in such a manner that the images to be formed on the first and second surfaces have a predetermined positional relationship, on the basis of a characteristic of each of the functions where by use of the copying function, the image forming medium is inverted around an axis extending in the main scanning direction which corresponds to a longitudinal direction of the images and, by use of the facsimile function, the image forming medium is inverted around an axis extending in the main scanning direction which corresponds to a widthwise direction of the images, executing a rotation process onto the image data in accordance with the calculated rotation angle, and providing the rotated image data, and said image forming means includes:
 means for forming the images on the basis of the rotated image data.

25. An image forming apparatus having at least one of a copying function of acquiring image data to be copied and forming an image based on the image data to be copied, a facsimile function of acquiring facsimile image data via communication channel and forming an image on the basis of the facsimile image data, and a printer function of acquiring image data to be printed via a communication channel and forming an image on the basis of the image data to be printed, comprising:

means for acquiring image data to provide the acquired image data;

means for storing the image data;

means for processing the image data stored in said storage means on the basis of a feature upon acquiring image data, which feature differs depending on the functions, to provide processed image data; and means for forming an image on the basis of the processed image data;

wherein said processing means includes:

means for, when images are formed on first and second surfaces of the image forming medium on the basis of the image data acquired by the facsimile function, calculating a rotation angle for rotating the image data in such a manner that the images to be formed on the first and second surfaces have a 180°-rotated positional relationship, on the basis of a characteristic of the facsimile function where the image forming medium is inverted around an axis extending in the main scanning direction which corresponds to a widthwise direction of the images, executing a rotation process onto the image data in accordance with the calculated rotation angle, and providing the rotated image data, and said image forming means includes:

means for forming the images on the basis of the rotated image data.

* * * * *